United States Patent [19]
Geiger

[11] Patent Number: 5,947,051
[45] Date of Patent: Sep. 7, 1999

[54] UNDERWATER SELF-PROPELLED SURFACE ADHERING ROBOTICALLY OPERATED VEHICLE

[76] Inventor: Michael B. Geiger, 1403 76th St., Houston, Tex. 77012

[21] Appl. No.: 08/868,819

[22] Filed: Jun. 4, 1997

[51] Int. Cl.⁶ .................................................. B63G 8/00
[52] U.S. Cl. ........................... 114/313; 114/337; 114/222
[58] Field of Search .................................. 114/312, 313, 114/337, 338, 222, 221 R

[56] References Cited

U.S. PATENT DOCUMENTS

| | | | |
|---|---|---|---|
| 4,252,467 | 2/1981 | Amrhein | 114/313 |
| 4,799,825 | 1/1989 | Meyerhoff et al. | 114/313 |
| 5,014,803 | 5/1991 | Urakami | 114/222 |
| 5,048,445 | 9/1991 | Lever et al. | 114/222 |
| 5,174,222 | 12/1992 | Rogers | 114/222 |
| 5,419,272 | 5/1995 | Bakstein et al. | 114/313 |

*Primary Examiner*—Stephen Avila
*Attorney, Agent, or Firm*—Kenneth A. Roddy

[57] ABSTRACT

An underwater self-propelled surface-adhering robotically operated vehicle capable of being navigated through a volume of water and of adhering itself to an underwater surface and traversing along the surface. The vehicle has a main body with an interior suction chamber and a motor driven impeller disposed in the chamber to draw water through the bottom end of the chamber and expel it at the top end and thereby create a negative pressure force at the bottom end to maintain the vehicle in contact with the underwater surface. Thrusters on the main body allow the vehicle to be driven through a volume of water before and after attachment to the underwater surface as well as to hold station in mid water for tasks and inspections. The vehicle may be provided with an evacuable enclosure to provide an environment for task accomplishment and with measurement and inspection devices and tools for underwater hull cleaning, welding, and other underwater tasks.

27 Claims, 59 Drawing Sheets

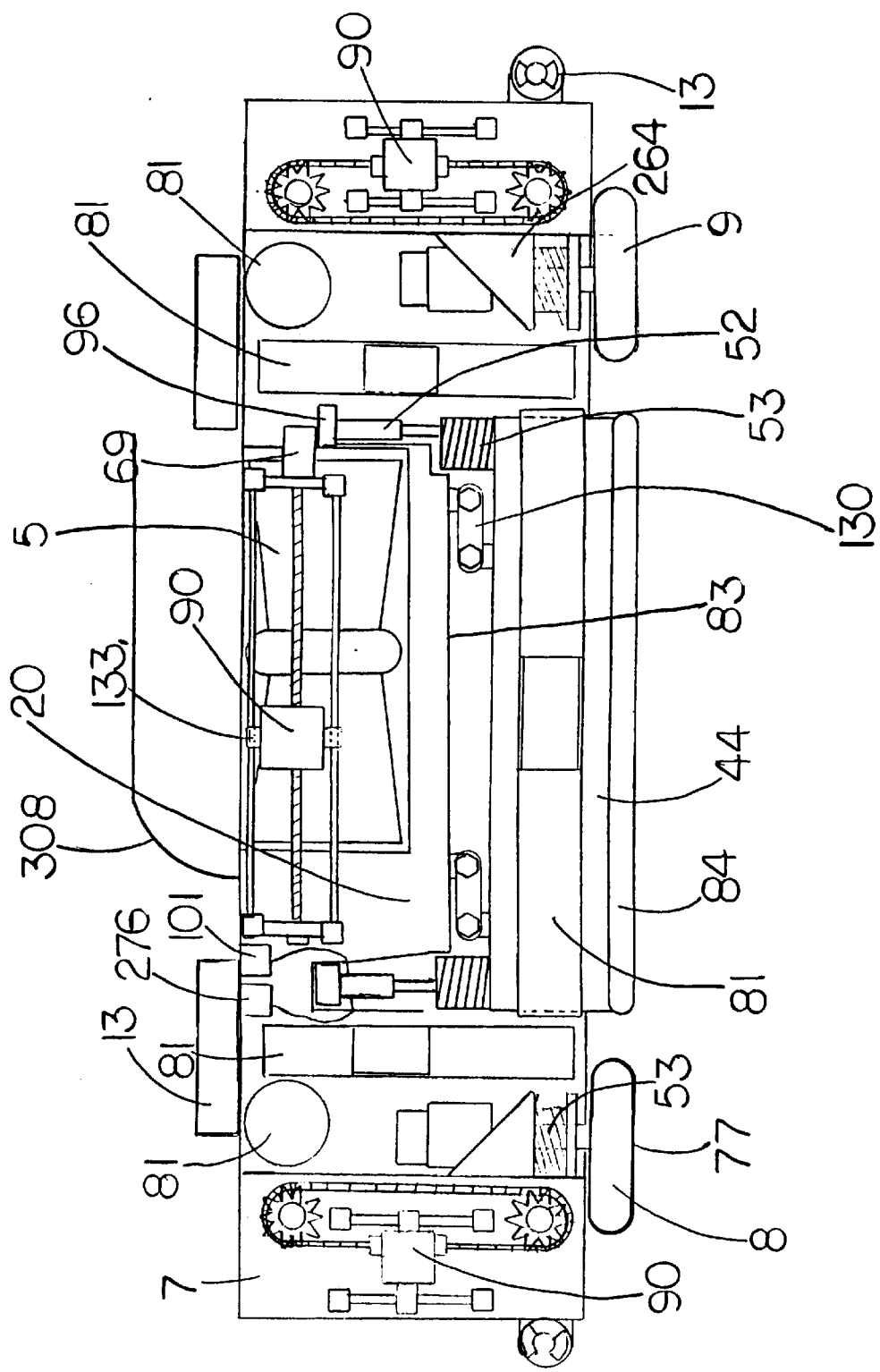
FIG. IA

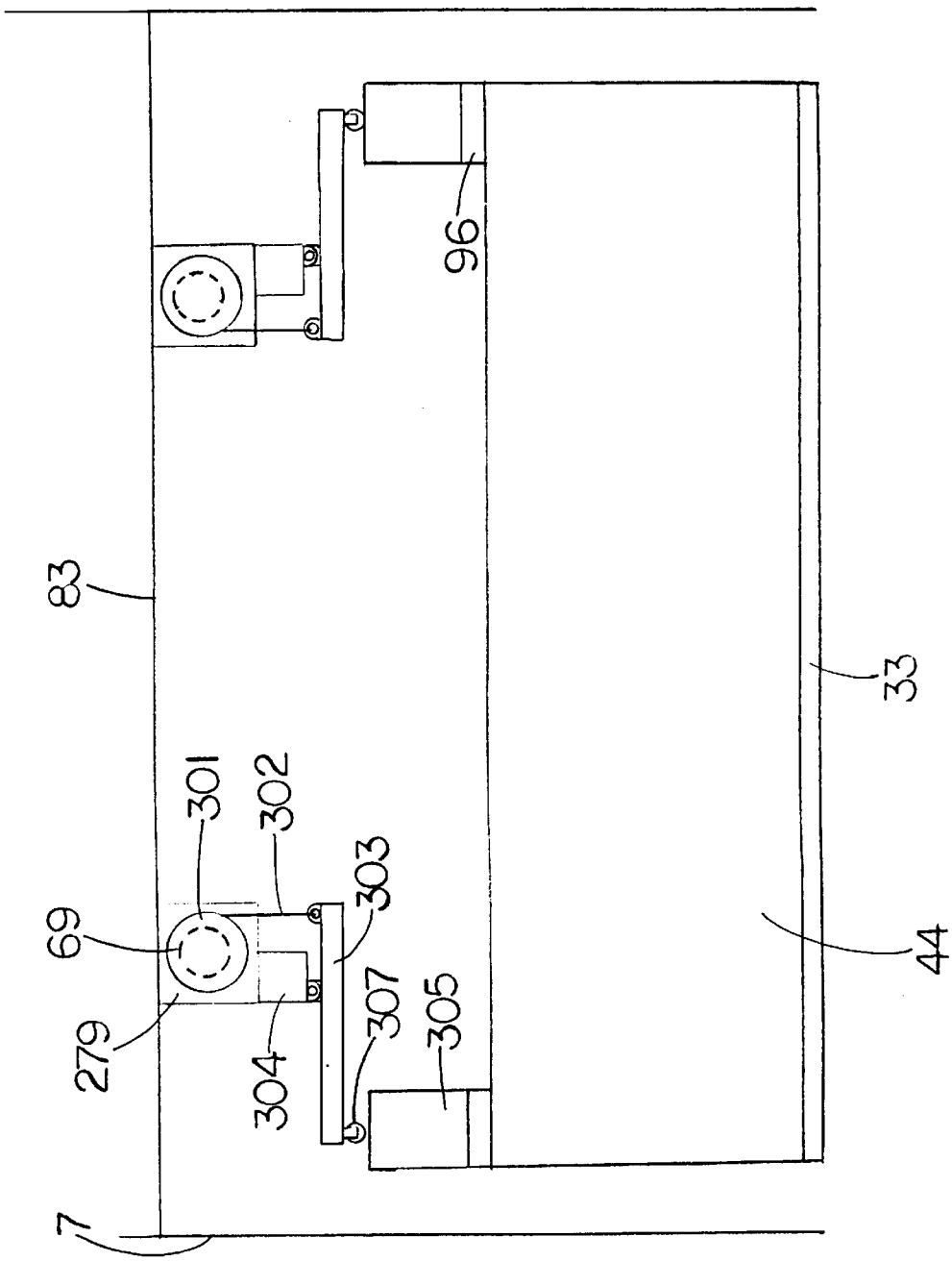

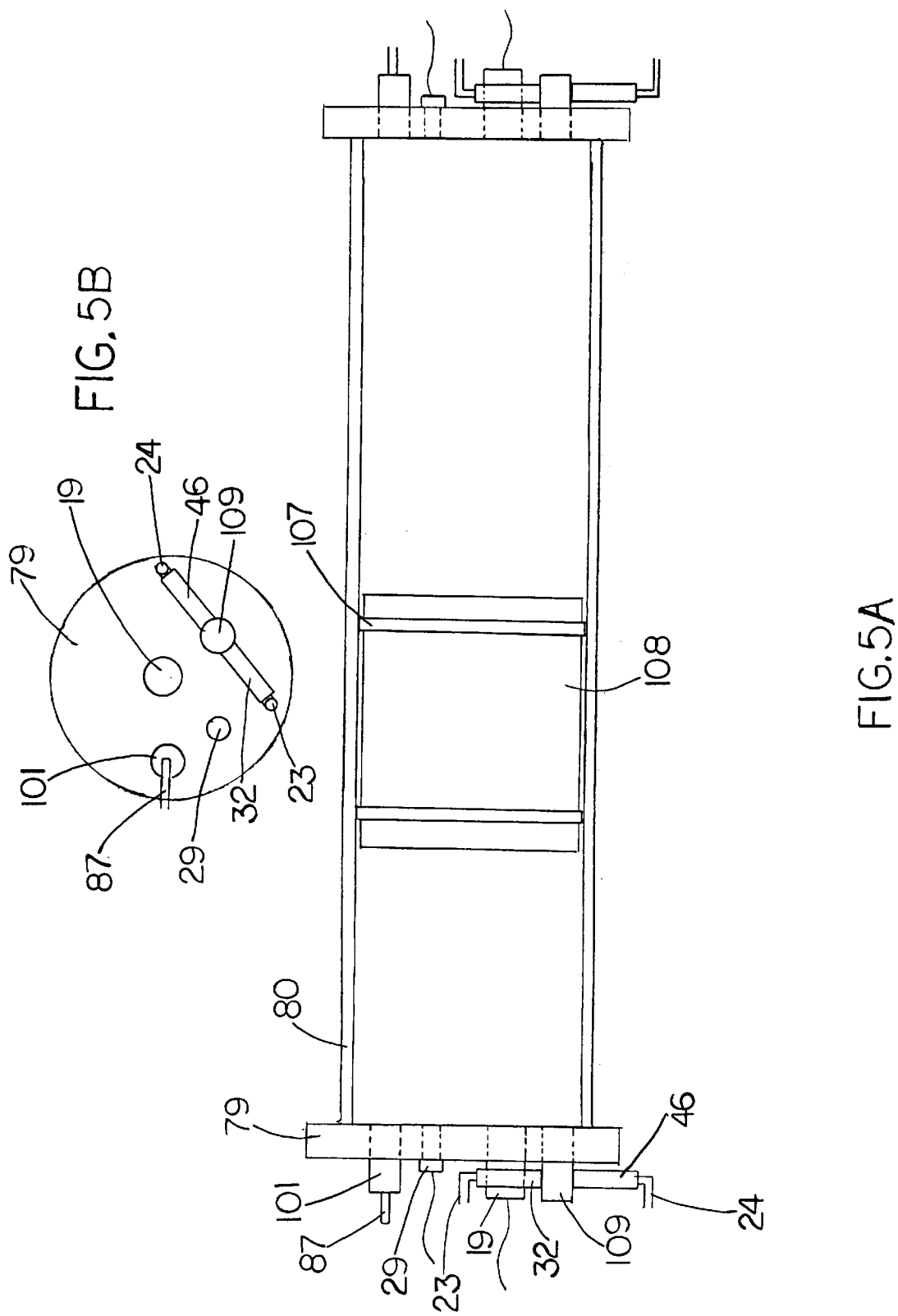

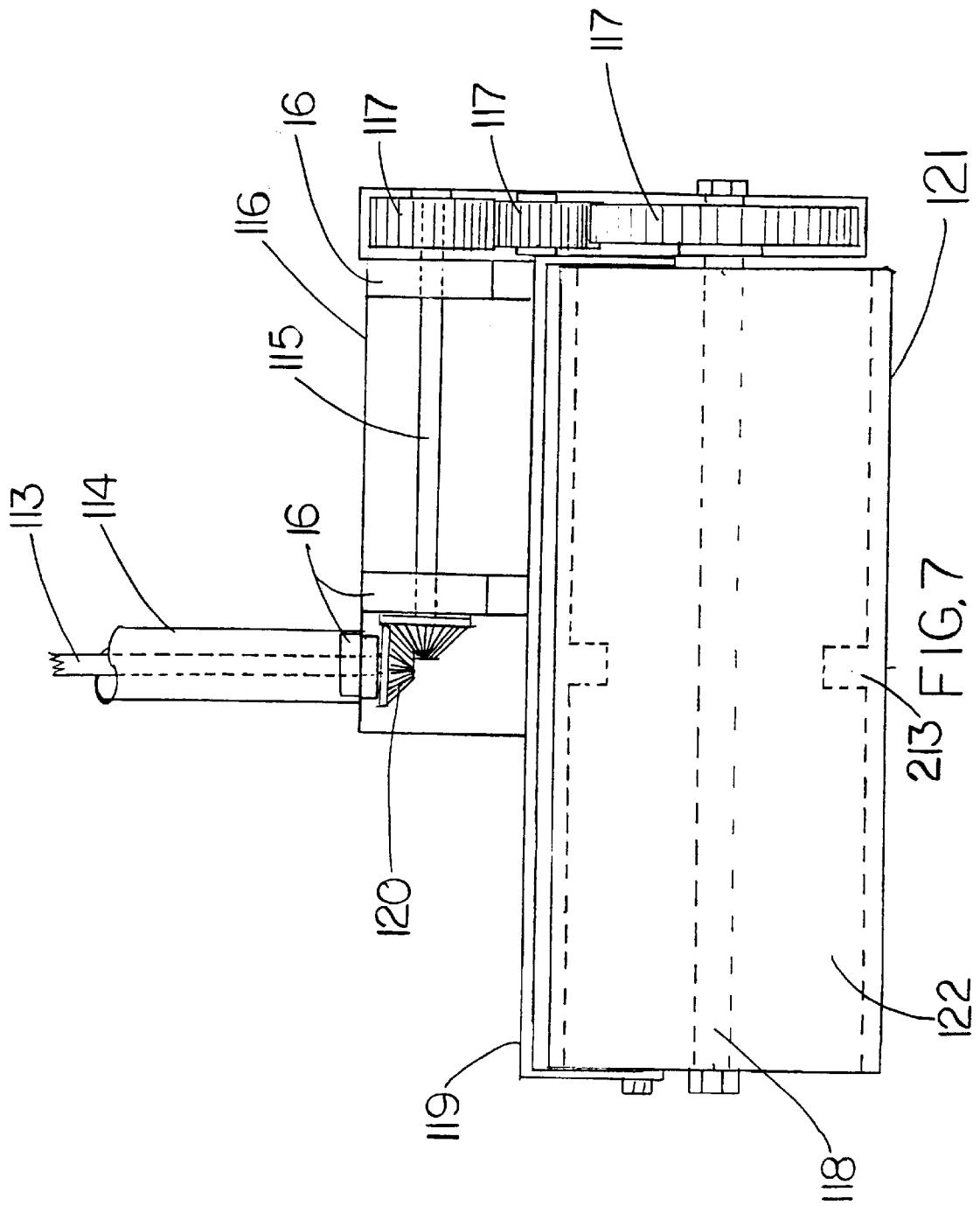

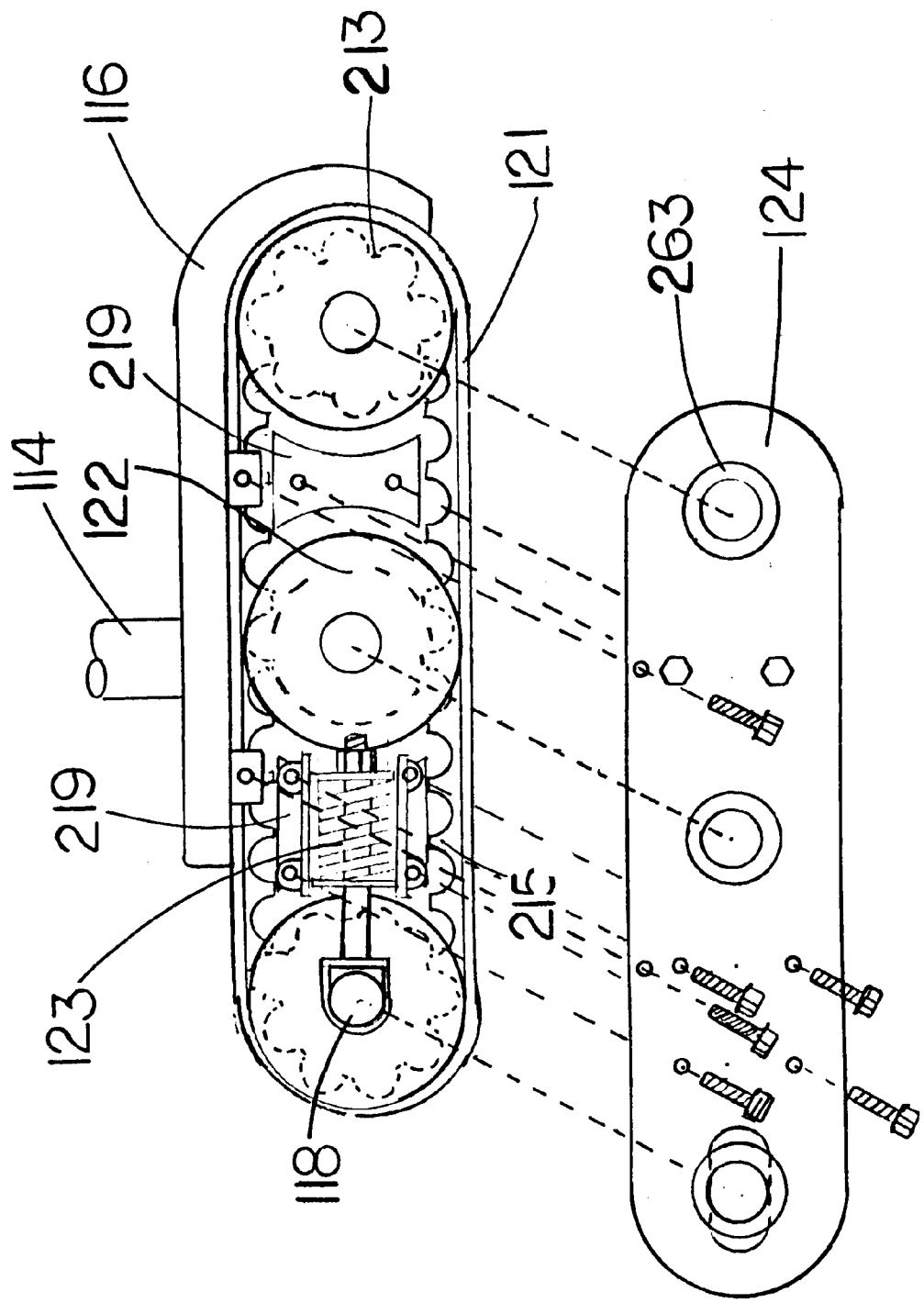

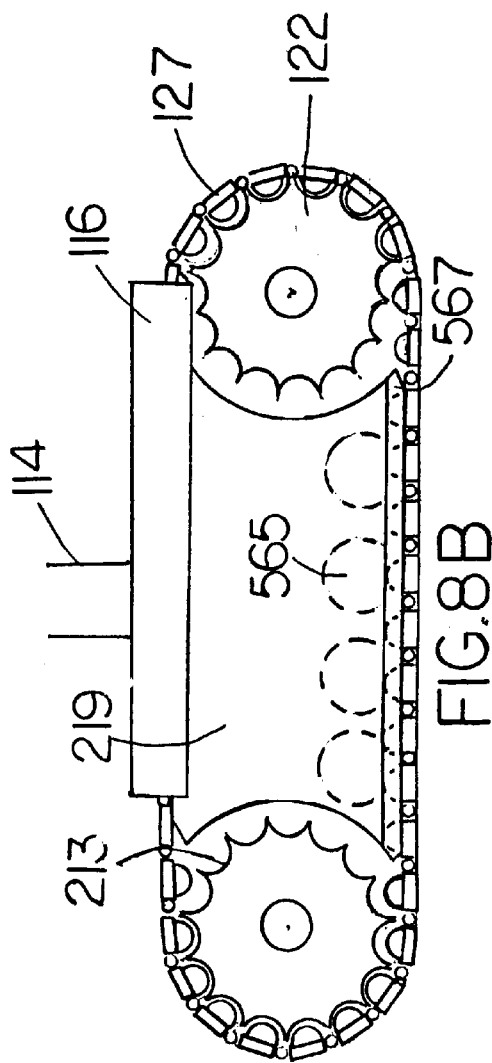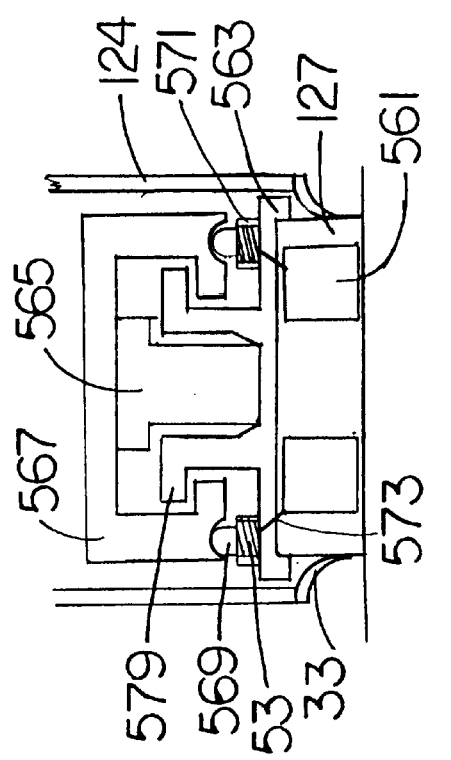

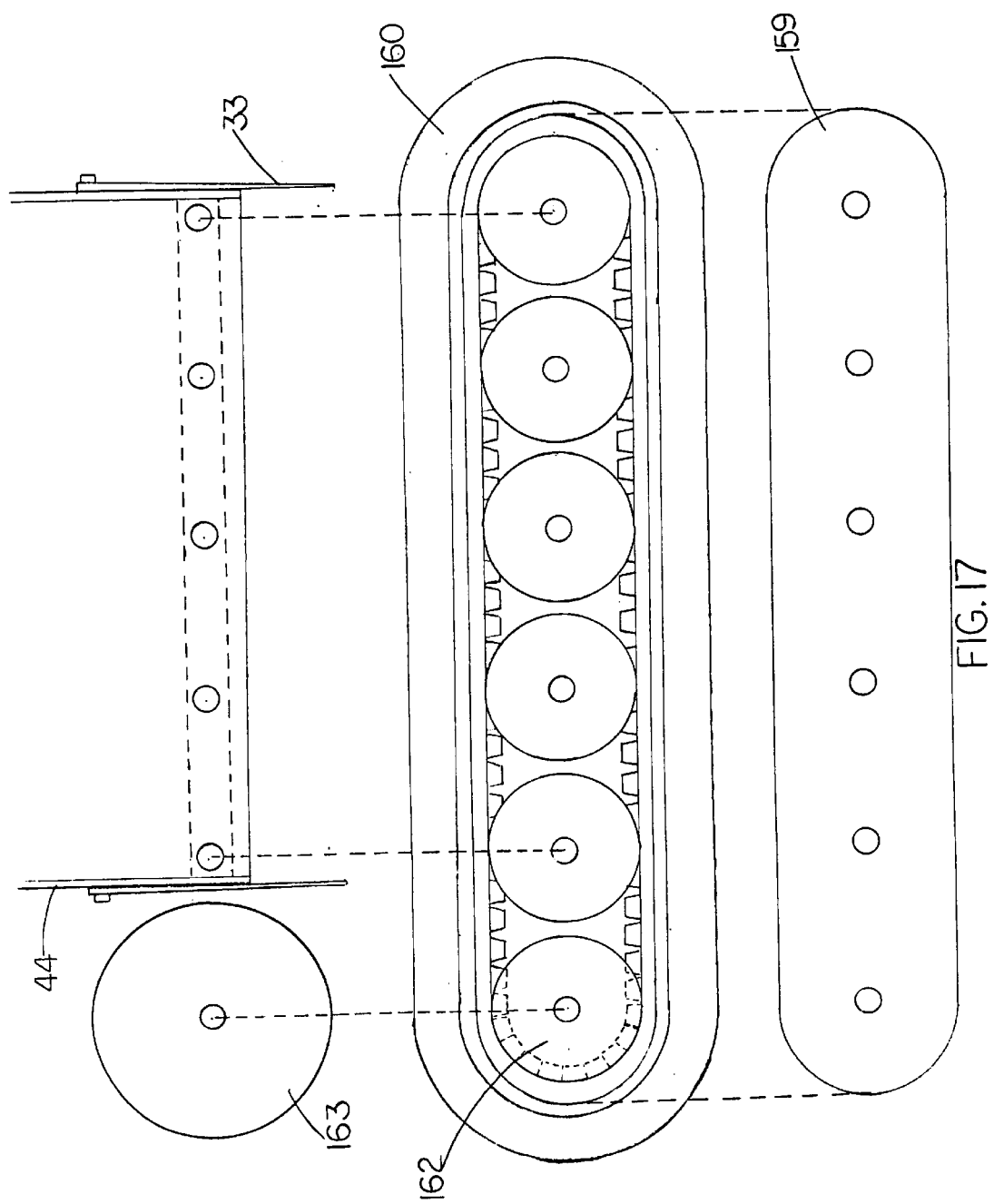

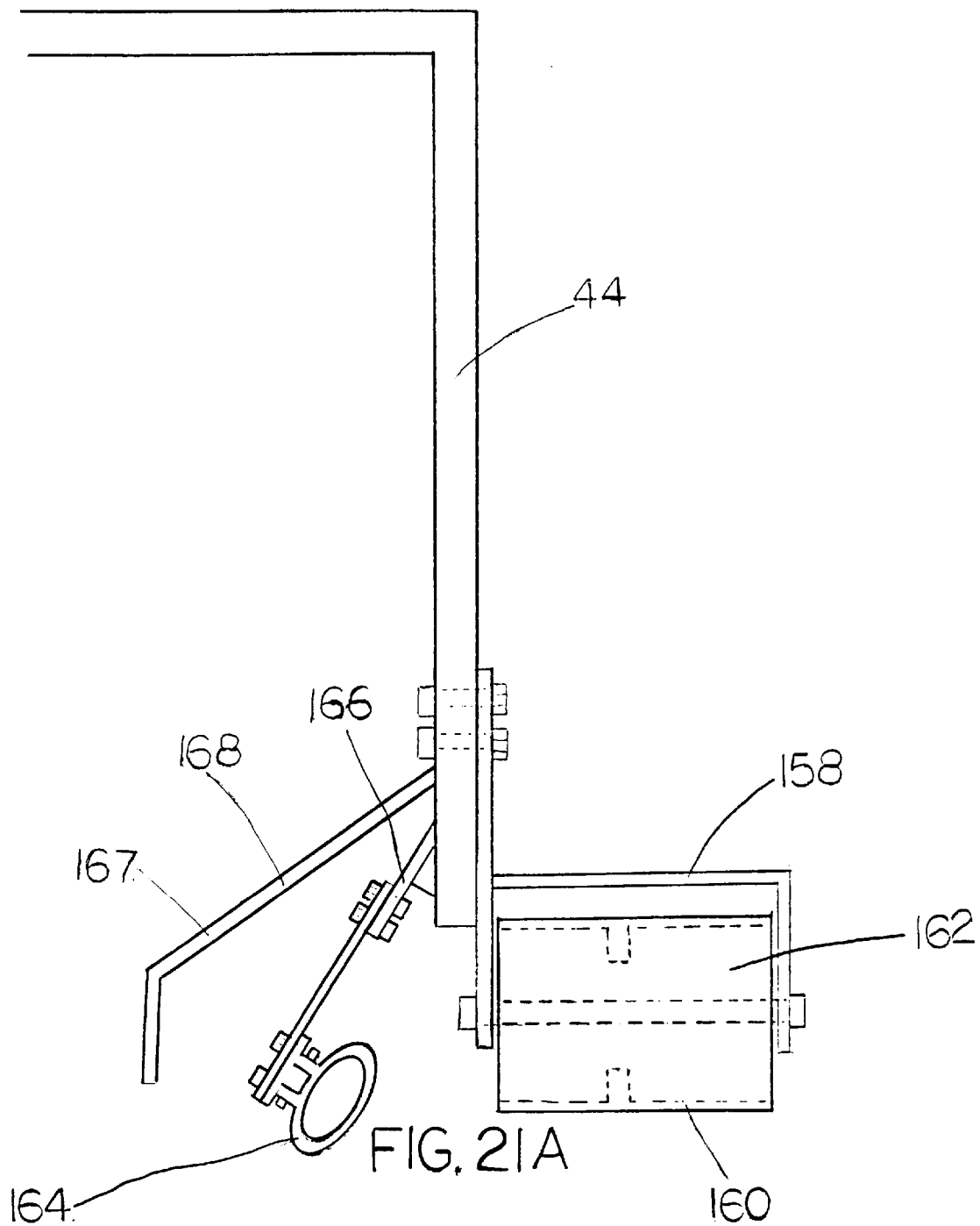

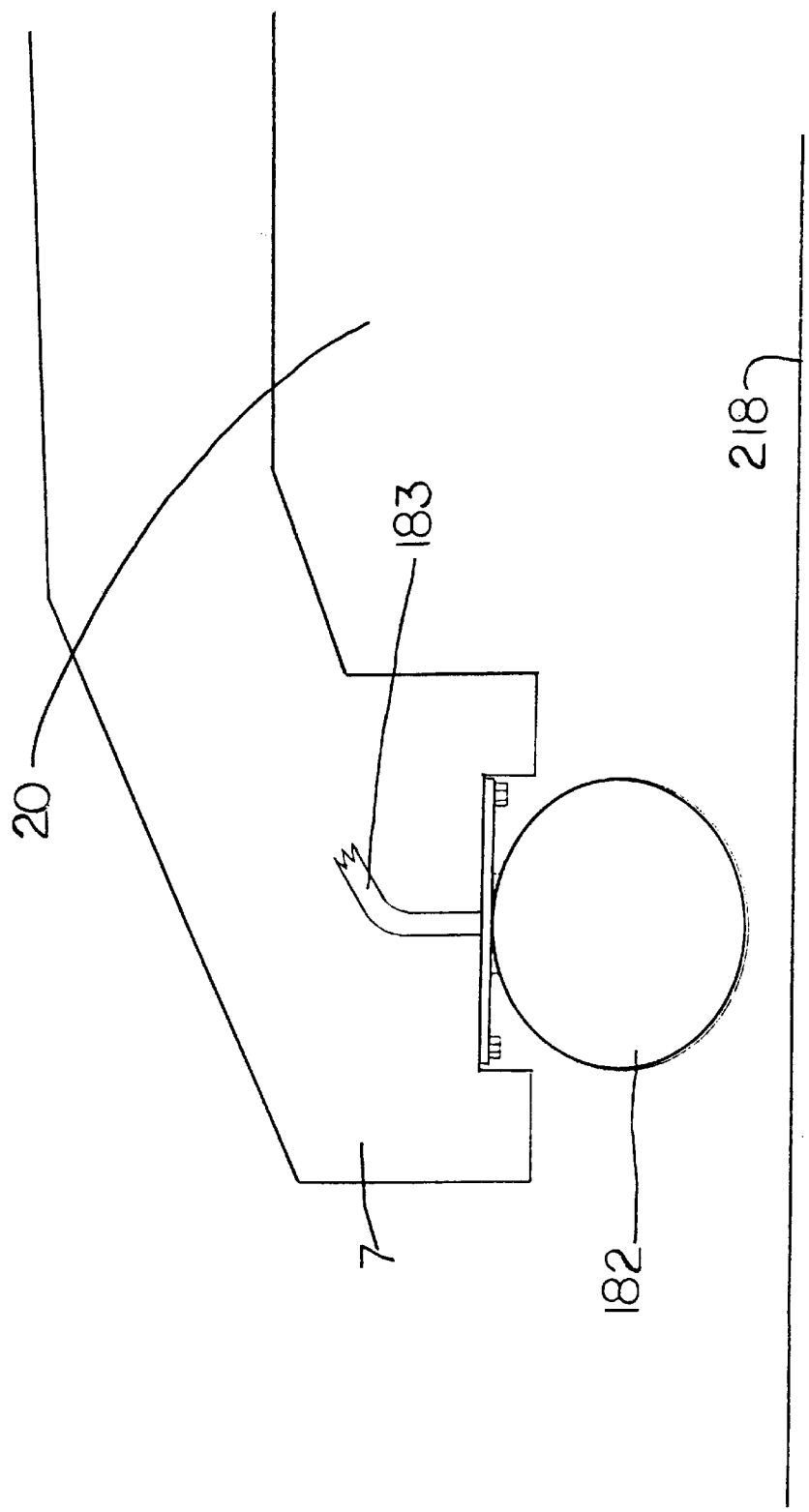

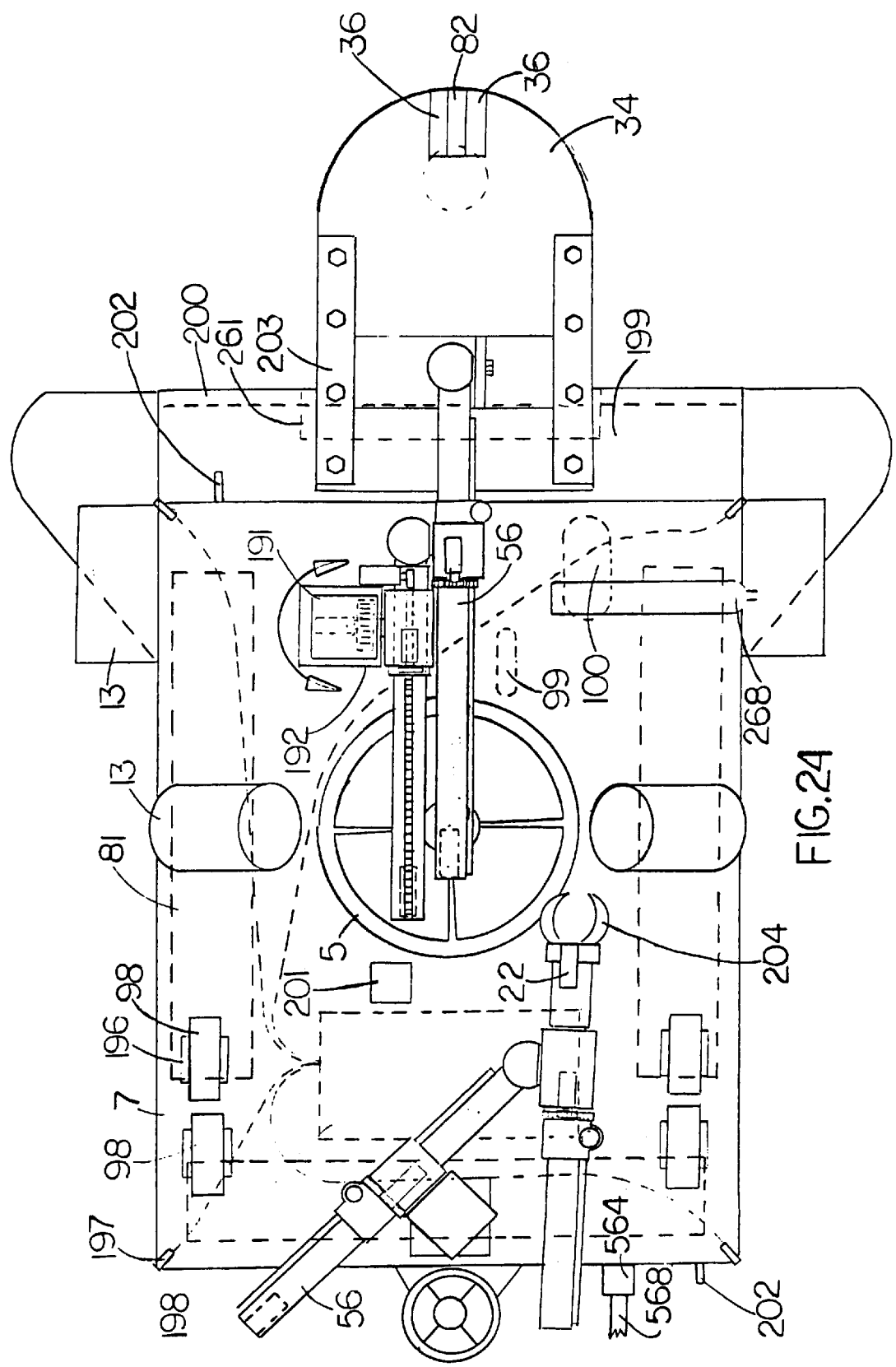

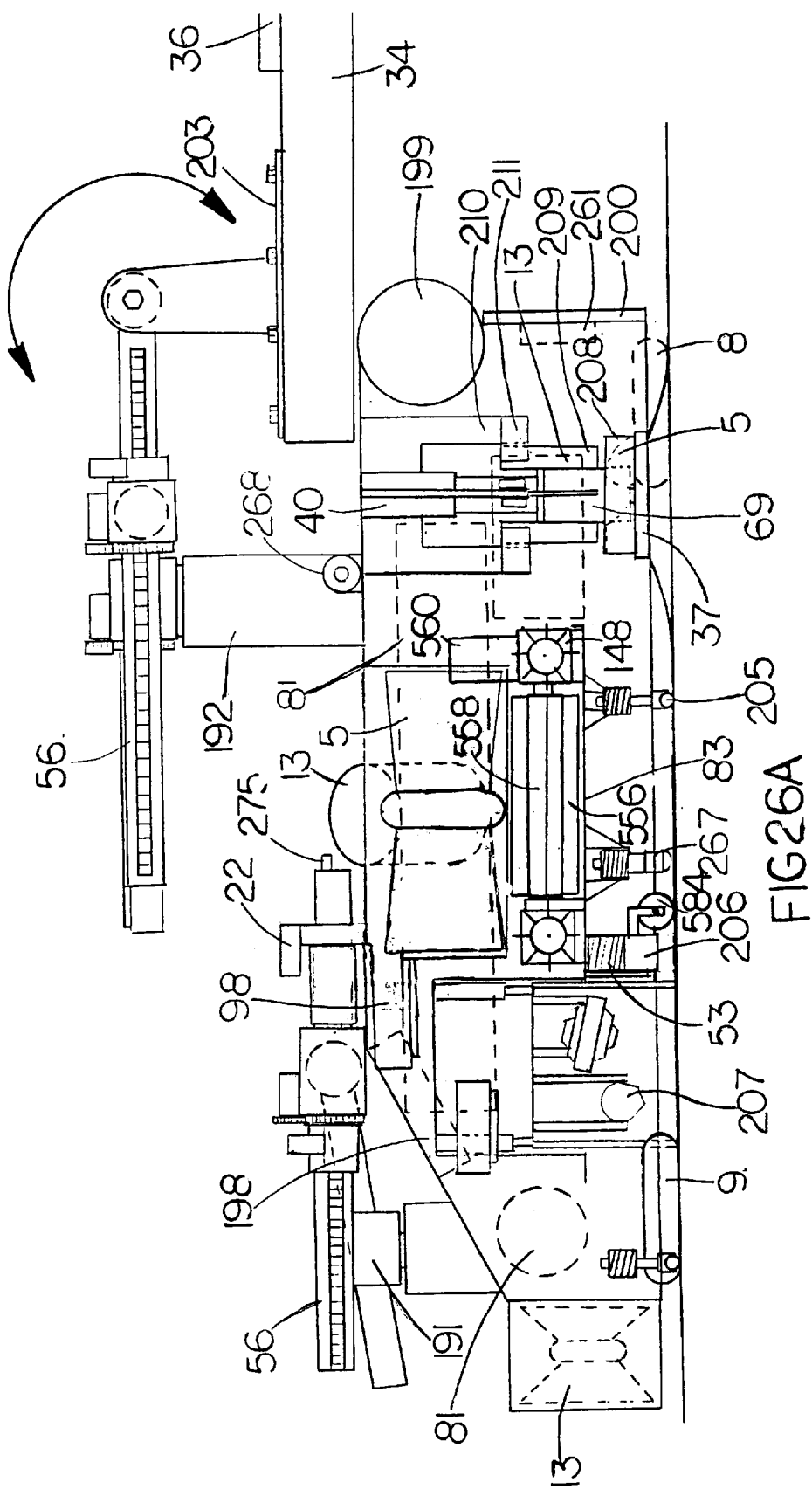

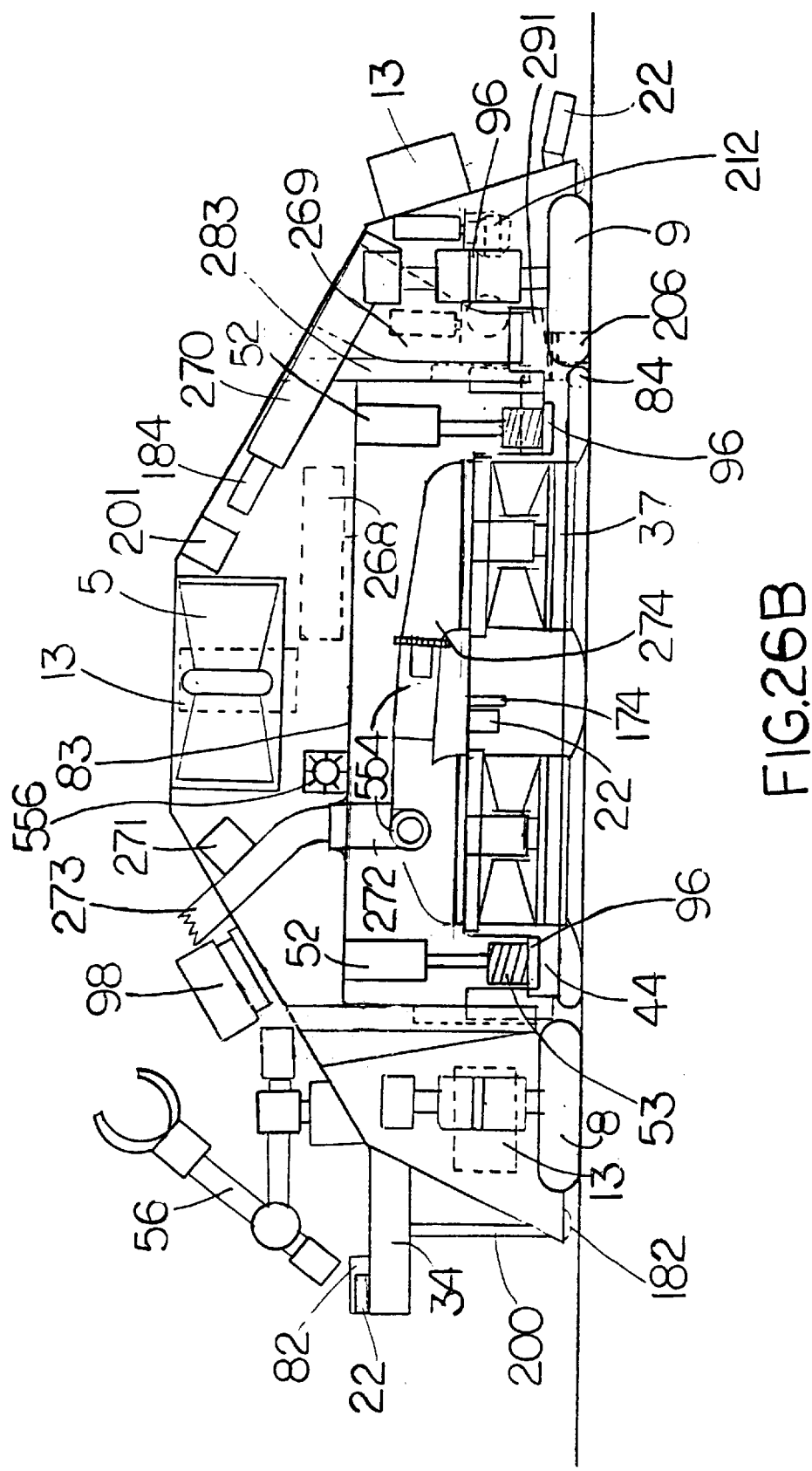

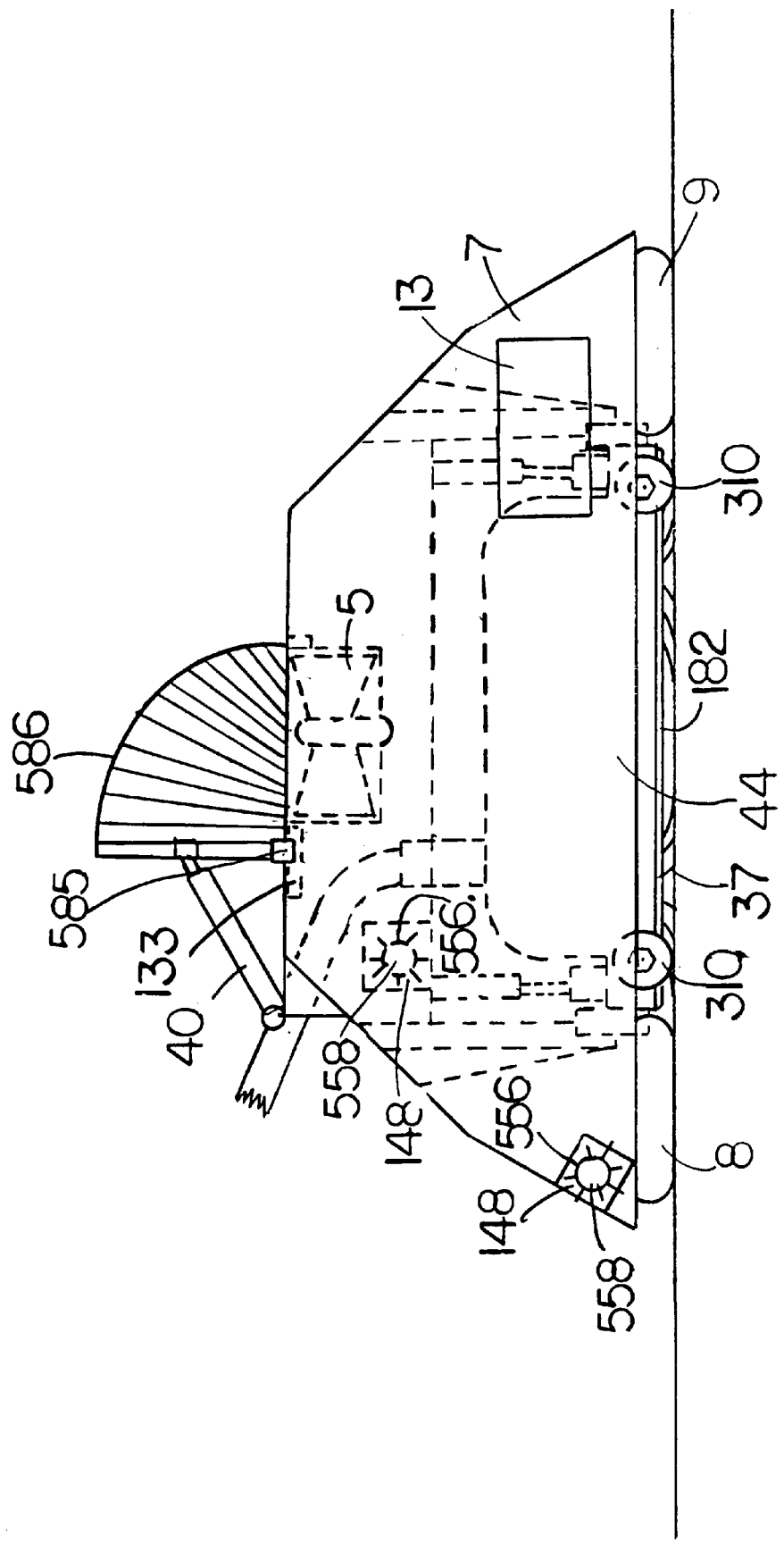

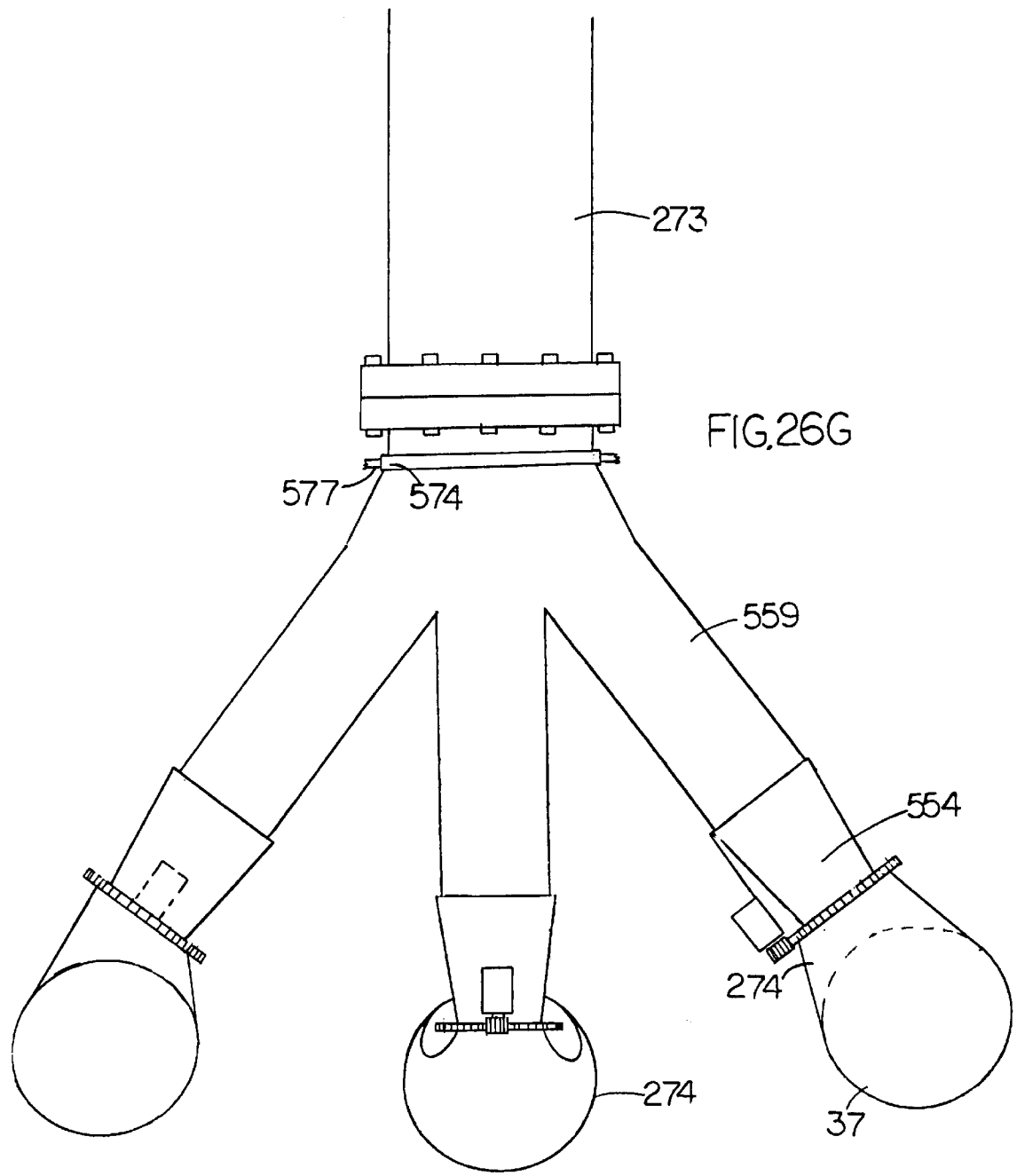

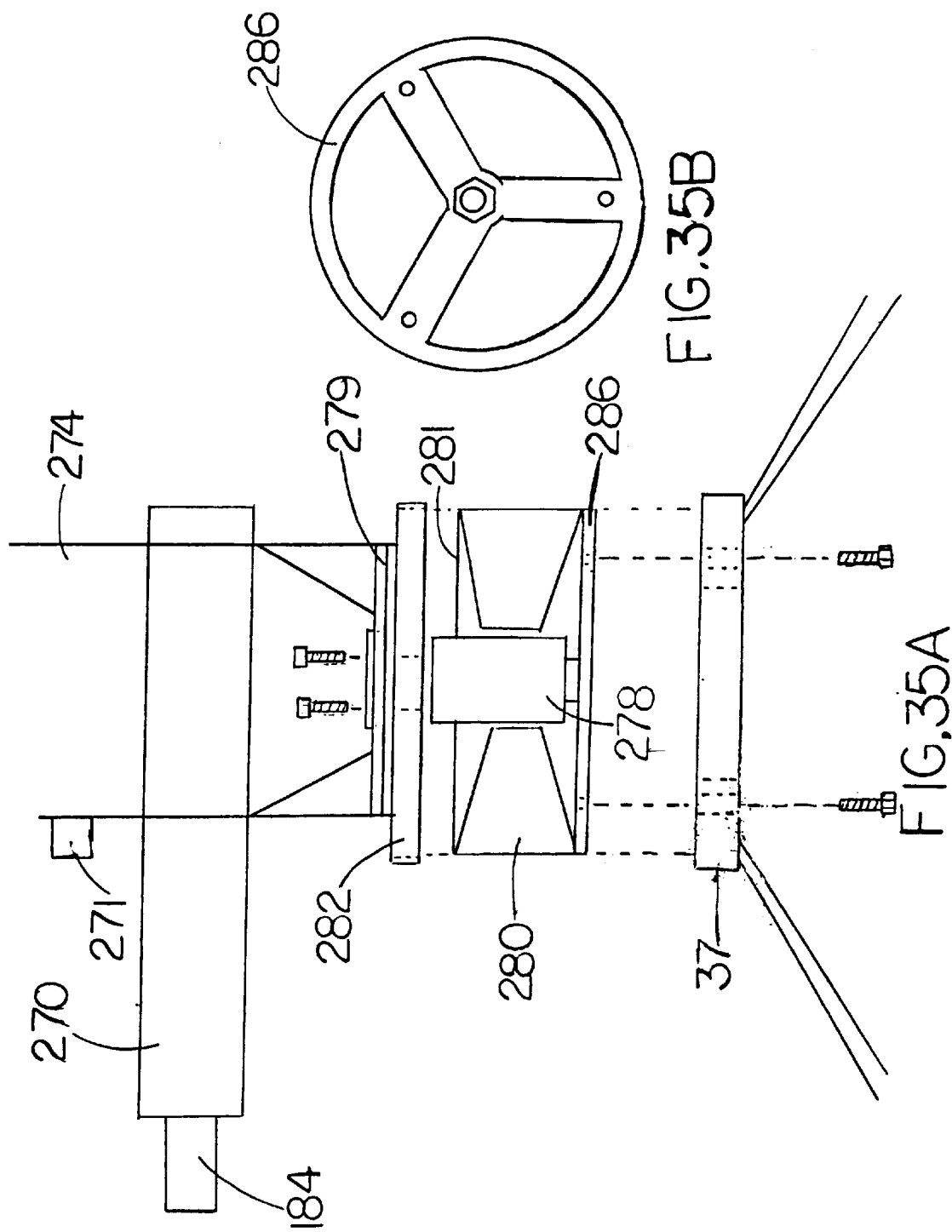

UNDERWATER SELF-PROPELLED SURFACE ADHERING ROBOTICALLY OPERATED VEHICLE

BACKGROUND OF INVENTION

1. Field of the Invention

This invention relates generally to robotically controlled underwater vehicles or "Remote Operated Vehicles" (ROV'S), and more particularly to an underwater self-propelled surface-adhering robotically operated vehicle capable of being navigated through a volume of water and of attaching itself to an underwater surface and traversing along the surface and having an evacuable enclosure providing an environment for task accomplishment and having measurement and inspection devices and tools for underwater hull cleaning, welding, and other underwater tasks.

2. Brief Description of the Prior Art

Heretofore, most robotic underwater vehicles designed for underwater inspections have been designed primarily for mid-water use without having the capability to remain attracted to a surface while transiting along it or closely following its curvature for inspection purposes. This inherent lack of capability prevents or limits these machines in station keeping ability in high current or surge conditions while operating. Because these inspection or viewing machines may be required to hold station for long periods of time while task accomplishmment or inspections are underway, this is a serious limitation which the present invention overcomes. The advantages gained by an ROVS' attachment to the work piece are so great that an entire technology base producing a host of new, heretofore unaccomplishable underwater task capabilities is now enabled.

In addition, there are several other related needs, such as the need for an ROV mounted movable enclosure with one open side sealed against the work which can be used as an environment to complete tasks which do not work well underwater such as painting, welding and thermal spraying, as well as other tasks, and can provide unparalleled solutions to underwater problems heretofore unsolvable. These needs have remained largely unrecognized and therefore unanswered until now.

A past unmet need is that of an inspection vehicle which will produce highly reliable mapping and inspection data for underwater structures and for damage to ships, which can adhere to the surfaces of the structure and uses some type of reference method, such as acoustic pingers to assist in precise location at all times. In the past this type of inspection was undertaken using free swimming ROV's or divers with pingers primarily using visual cues to discover and determine damage extent and location. This method has proven to be time consuming and suffers from a lack of accurate mapping and locational data regarding the nature and extent of damage and underwater conditions. In addition, it suffers from the inability to non-destructively and visually inspect large areas of the submerged structure in a timely manner.

One specific case in point of a technological breakthrough in an area of heretofore unrecognized need is disclosed using the present invention as a surface adhering work platform with sufficient attractive force to remain attached to a submerged structure during severe wave and current loading with virtually no unwanted movement. This attribute makes this invention the preferred type of operating platform for intricate tasks such as 3-D laser mapping and underwater robotic welding operations. Another heretofore unrecognized need is for an ROV with built in purgable buoyancy enclosure(s), called buoyancy tubes, which may be used to assist in increased buoyancy and assist in the ROVs orientation. And still another heretofore unrecognized need is that of a stationary, firmly attached vehicle which has excavation tools attached which can enable it to remove soil from around and underneath an underwater pipeline without the need for divers in offshore pipeline repair and inspection operations.

Relative to underwater vehicles and tools which are capable of attaching themselves to objects and surfaces underwater, which is a prerequisite for robotic control, guidance, and navigation of an evacuable enclosure with one open side while attached to the surface, there has been little or no advancement. Most ROV'S are use limited in that they are not designed to attach themselves to a work surface underwater and traverse it, with several exceptions, which follow. The most notable exception to this limitation is disclosed in U.S. Pat. No. 3,906,572 by Winn. This apparatus, which is known under the trade name of SCAMP, has been in widespread worldwide use for underwater hull cleaning of ships hulls since the late 1960's. While it does remain attracted to the hull of a ship while in use, SCAMP suffers from the major drawback of not having any navigation or guidance aids such as thrusters or rudders incorporated to make it capable of being robotically controlled while in transit thru a volume of water to the side of the ship's hull from the hull cleaning support platform or dock. It must be guided by a diver or swimmer to the ship's hull because of its inherent instability and lack of controllability in free water. As such, it is not a true "ROV", but instead is simply a robotically controlled work tool for the side of ships and other marine structures. The teachings of Winn's disclosure reflect this limitation, and no reference to thrusters, water jets or other mid-water guidance features such as a rudder are mentioned or suggested. Since it is physically impossible for a single impeller or propeller driven underwater tool to guide itself without some external means of guidance or directional stability, this is a significant drawback which the present invention overcomes. A similar invention, U.S. Pat. No. 5,174,222 by Rogers, shows a similar hydraulically powered robotic or diver guided vehicle which suffers from the same inherent drawbacks. In addition, these two machines do not have an evacuable area or enclosure incorporated as designed.

Another prior art invention which has the ability to attach itself to underwater structures is disclosed by the same author, Winn, in a subsequent patent. U.S. Pat. No. 4,058, 082 discloses an underwater painting machine with the same basic structural design for maintaining it attached to the ship's hull. Although this machine has a different purpose, that of painting instead of cleaning ship's hulls, with attendant structural differences, it suffers from similar limitations in guidance and navigation capabilities to that of SCAMP.

Another prior art invention which is capable of attachment to a substrate with an incorporated evacuable enclosure is disclosed in U.S. Pat. No. 4,270,484 by Shimatani, et al, which discloses an underwater painting machine which has a painting chamber incorporated which is evacuable. In this invention, the machine can be held against a work surface principally by electromagnets, and uses as a backup attraction method a thruster which does not produce a low pressure area underneath the machine body as in the prior art of Winn or Rogers, above, and with the present invention, and suffers from the additional limitation of not being equipped with guidance thrusters or other directive and navigational means. Additionally it has wheels of conventional design which do not have a large contact area to influence movement of an incorporated evacuable enclosure, creating an unreliable traction method for this type of structural design. In a major structural defect, the evacuable enclosure is rigid in its attachment to the main body of the machine, and uses the inflatability of a seal at the bottom of the painting chamber, which is the evacuable enclosure of the invention, as the method of conforming to irregularities in the substrate. Because many irregularities exceed in size the capabilities of a seal to conform, effectively jamming the machine in place or flooding the evacuable enclosure, or both when coming in contact with it, this design is structurally deficient and limited to very even underwater surfaces, making the capabilities of this machine limited. Additionally, the ballast chambers incorporated do not have the ability to allocate either or both ballast and buoyancy to specific areas of the machine to compensate for its physical position and dynamic buoyancy changes, making it structurally unsuitable for adaptation to robotic guidance and navigation capabilities. Also, this machine's design is limited to the specific function of underwater painting.

Another prior art hull cleaning machine which has the ability to remain attracted to the hull of a ship, and which is a true ROV, is disclosed in Japanese patent No. 0299492 by Miyama, which shows a machine with a frame which encloses several thrusters which act to push the machine against the hull of the vessel constantly while the machine cleans the hull, and which rolls along the hull on wheels provided which are motorized. This vehicle employs a minimum of two thrusters to keep the machine against the hull instead of an impeller in an enclosed suction chamber, and does not employ a closed body with a low pressure area below the thrusters to create attraction to the hull. As such, it is structurally different from the present invention and as a result is not capable of creating strong attraction forces against the hull by creating a proximal partial vacuum or low pressure area while attached to a surface. The thruster's thrust remains fairly constant whether attracted to the hull or in mid water transiting to a location.

In the past when hull cleaning operations were undertaken the liquid effluent and solid marine growth cleaning products were simply discharged back to the sea and allowed to settle to the sea floor. Research has shown that marine algae and other marine organisms which are attached to ship hulls absorb and store large amounts of copper compounds from hull coatings, making discharge of this matter to the sea floor questionable as to its environmental effects. As a result it is seen as desirable to remove the solid portions in this type of marine discharge before discharging the effluent water to a storm drain or other fluid handling structure. All of the prior art cited above has large volumetric flows of effluent, making portable on-line filtration unfeasible. A different type of structural design is required to remove the solid material from underwater structures with a minimum of effluent water being incorporated as the carrier. Because the brush design of SCAMP has been proven superior in growth removal without damaging hull coatings, incorporating this type of brush in a new cleaning design which more efficiently scavenges the dislodged marine growth is seen as desirable.

In another disclosure relative to non-destructive testing, U.S. Pat. No. 4,814,705 discloses a non-destructive testing device which is held attracted to a ferrous metal surface by an electromagnet, and is capable of moving along the surface. In this device, the magnet serves the dual function of attractor to the substrate and of inducing a magnetic field into the substrate for providing metal plate thickness measurements. The flux leakage level of the magnetic field can be measured by a Hall effect sensing device. This invention can be used for metal thickness measurements of relatively large areas of metal plating such as are found in land based petroleum storage tanks. Although fairly well adapted for above water environments, it suffers from the liability of having the poles of the magnet in constant, very close proximity to the metal substrate to facilitate the requisite attraction and magnetic induction of the substrate. This design produces large amounts of metal filings and metallic debris being collected by and attached to the magnet in short periods of time, which need to be periodically removed to facilitate continued effective operation of the device. This is not always possible in underwater operations, due to the remoteness of the work site from the operating platform and other logistics considerations such as difficulty in navigating to and reacquiring the exact work site, short operating windows due to production schedules, departure schedules of the vessel being worked on, etc. The design of this invention has the additional liability of being poorly adapted to uneven surfaces. Because the magnet must be in intimate contact with the work surface to provide adequate attraction to it, there is less ground clearance for the vehicle to traverse irregularities in the substrate. As a result if the surface has significant irregularities, such as dents and high spots, the magnet often makes physical contact with the substrate and subsequently jams the vehicle in place, effectively rendering it inoperable. Most ships and marine structures have uneven surfaces due to high spots on weld seams, weather and sea effects, tug damage, etc., which often cannot be accurately quantified beforehand, making this design unattractive for underwater applications. Additionally, whenever the clearance between the magnet and substrate varies markedly the accuracy of the measurements gained is influenced, making the measurements less reliable. There is an evident need for a structural design which will correct these liabilities and deficiencies.

Another vehicle which uses a Hall effect sensor to measure metal loss is disclosed in U.S. Pat. No. 4,573,013. This disclosure describes a vehicle which is used to inspect the steel reinforcing members in prestressed concrete beams. The above water portions of bridges are routinely inspected using this type of tool, but has not been adapted to the underwater environment. Underwater corrosion of reinforcing members in bridges is a critical problem which reduces the structural soundness of the bridge. There is an unanswered need for an ROV which can attach itself to the underwater portions of concrete structures for reinforcing member inspections periodically. In addition, similar tools to measure metal soundness in concrete bridges, based on new radar technologies, have recently been introduced into the marketplace and are well adapted to incorporation in the design of the present invention.

The prior art discussed above, having wheeled means of propulsion along an underwater surface, all suffer from the same traction problems to a greater or lesser degree, because attachment of marine algae and grass to all underwater surfaces makes them slippery and difficult to gain traction on for an underwater vehicle. The added liability of increased frictional resistance due to the seals of an enclosure being in contact with the surface creates an additional traction problem for conventional wheeled vehicles, making conventional wheel designs unsuitable for vehicles incorporating enclosures which press against the structure and are to be moved while doing so. Marine shell encrustation, such as barnacles, add to the problem both for the enclosure's forward movement and for the small wheels of the vehicle to climb over them. Traction has proven to be inadequate in the prior art where large barnacles are in common evidence, sometimes preventing the machine from moving forward against the growth, even though all of its wheels are turning as drive wheels. A method of increased traction such as tractor treads to drive underwater vehicles which attach themselves to underwater surfaces is needed. In addition; the need for high maneuverability after the vehicle has attached itself to the substrate has not been met by the prior art, because the existing vehicles are designed for long periods of relatively few turning movements as they progress in horizontal movements in hull cleaning operations with turns to change direction but not to accurately position the machine in a specific location for a viewing or inspection task. Tracked vehicles used for sea bed tasks such as cable burial typically have full length tracks which are not well adapted for high maneuverability in close quarters, which is a requirement of underwater damage inspections of ships and structures. It is evident that an innovative new wheel design is needed for this application.

Relative to vehicles which are capable of adhering to and traversing the side of a ship or other structure and can be either immersed or operated in dry, out of water applications for inspecting, cleaning and painting of ship hulls as well as other tasks, have not addressed the need to navigate while in inverted positions. U.S. Pat. No. 3,960,229 by Shio, discloses a vehicle with full length, tank like electromagnetic treads which will not remain magnetized when the machine's weight pulls the tread away from the wheels, separating the electrical contacts, thus losing attractive force. In addition, this vehicle must be turned by operating one tread while the other is held in a stationary position in the conventional manner used to steer military tanks and construction machinery, which is awkward and difficult on rough surfaces such ship bottoms with large barnacles in evidence, thus interfering with the turning movements and making the vehicle subject to losing adhesion. For manuvering and transiting along small radius curvatures such as pipelines or oil platform jacket legs, spherical wheels are advantageous in that they will roll against the surface through a wide range of diameters. In another disclosure, U.S. Pat. No. 3,609,612 by Tibbling shows several rotating wheels each surrounded by an electromagnet which is held in proximity to the metal substrate by a frame. This type of arrangement requires a space between the electromagnet and the substrate and is subject to jamming against protrusions or uneven surfaces. It is not well adapted for use on underwater surfaces with marine growth or which have been deformed by the elements or have been damaged, and is not a spherical but a round wheel with a flat bottom cross sectionally, making it difficult to turn on short radius curvatures.

Prior art free swimming ROVS have suffered from the inability to perform high quality 3-D laser or other 3-D mapping methods for inspection of damage to structures in preparation for repair element fabrication using raster scanning photogrammetry laser systems, because of the requirement that the operating platform be held perfectly stable for several or more seconds while the mapping acquires an image, even if held against the structure by several robotic arms. A heretofore unanswered need for a method of accurately remotely measuring the boundaries and configuration of damage as a tool for repair planning is hereby disclosed.

In addition, a three dimensional measuring tool which can be carried by an inspection ROV for quickly and easily gaining accurate dimensions of battle and collision damage by physically conforming to the shape of the damage in zero visibility conditions is of value in emergency repair situations where time is of the essence in being able to precisely measure and accurately fabricate closely fitting patches to effect the repair. In the past, much trial and error has been used to determine the exact shape of deformed shell plating at the site of battle and collision damage, with divers making countless trips down to the damage site to test a new doubler plate shape for snugness and weldability. This circumstance often evidences itself in littoral regions, with large amounts of suspended particles in the water which may prevent the acquisition of useful, accurate forward looking sonar or 3-D laser mapping data. It is of benefit to provide a simple method of accurately measuring and cataloging the exact shape of damage to the hull to effect timely underwater repairs.

In addition, for navigation and guidance of an ROV and for higher quality telepresence, the combination of forward looking sonar and a stereoscopic laser imaging system is novel as an enabling tool. This system may be combined with various commercial 3-D viewing systems for measurement, identification and discrimination of underwater objects, and various head mounted or free space holographic telepresence systems to enable viewing around the ROV. U.S. Pat. No. 4,010,619 by Hightower et al, discloses a free swimming ROV with an on board sonar system and TV cameras, both of which are used for navigation and guisdance, but the specification mentions nothing about combining them in a sensor fusion system in one array to be used simultaneously. This involves the steps of combining the images in a composite, then writing software and applying it to an application to integrate the two images before the images can be integrated in a way that can be understood. In another prior art disclosure, U.S. Pat. No. 4,502,407 by Stevens, shows a free swimming ROV with several robotic arms attached, but no mention of a sonar transducer being attached to either arm for navigation, guidance or for damage studies in littoral regions is mentioned in the specification.

Relative to robotically controlled welding using robotic arms, x-y coordinate movable torches, and wheeled movable vehicles, there is a long list of prior art for above water applications, but no underwater welding robots have been developed which can attach to and freely traverse an underwater surface while remaining attached to it, which is a requirement to maintain the stability needed to complete high quality robotic welds. Due to the nature of the underwater environment, the present level of technological development of free swimming ROV'S to hold station in a current or high sea state is inadequate to provide a work platform for high quality, precise task accomplishment of the above types which require steadiness and controlled movements. An ROV which can attach itself to an underwater work surface is needed if high quality underwater task accomplishment such as welding and related inspections and mapping of the underwater body of ships and marine structures are to be accomplished. In addition, for underwater cutting, the present invention is specifically well adapted for use with conventional plasma arc cutting torches or the "Spinarc" underwater spark erosion cutting process, manufactured by Spinarc, Inc., Wirtz, Va. For long continuous cutting tasks requiring precise control over the cutting path, any of which may be attached to either a robotic arm or to the interior of the evacuable enclosure and mounted on a linear slide or similar automation system. The present invention is capable of being moved at a controlled rate along a work surface as the cutting operation continues without periodic interruptions for repositioning, making this a versatile and precise tool for robotic underwater cutting tasks. This capability of attaching to a structure is also of value in pipeline operations where excavation underneath the pipe is need for repairs or inspections. The ability to remain perfectly motionless while attached to a pipeline and manipulating an airlift or a jet with a robotic arm to enable the displacement of large masses of soil is seen as an advantage and a heretofore unmet need.

In addition, the need for a buoyancy allocation system which is capable of selectively moving either or both a volume of air for buoyancy, and water for ballast from one location on the ROV to another has not been well developed in prior art. The need to maintain a stable position at an underwater location while suspended in a volume of water for long periods in an inverted, vertical or other component position is enhanced by a system which can adapt to task requirements and can add either ballast or buoyancy at will and place it at a selected location on the ROV. In addition, the need to compensate for weight or twisting moment increases inherent in moving or manipulating heavy objects around underwater is best answered by a system which can compensate for these forces in a passive manner, allowing the thrusters freedom for navigation and guidance needs.

Several prior art patents have created variable buoyancy features, but have not addressed the allocation of buoyancy or ballast. U.S. Pat. No. 5,174,222 by Rogers discloses a simple bellows type buoyancy chamber which may be remotely inflated but is not capable of being robotically moved to another location on the machine while in operation, and will not remain constant in buoyancy as depth changes due to its flexible nature. A prior art disclosure for a hull cleaning machine which has the brushes incorporated with multiple impellers is disclosed in U.S. Pat. No. 4,697,536 by Hirata. This invention is a diver operated vehicle and has no thrusters or other navigation and guidance means incorporated. It shows several floats with movable pistons and springs internally specifically for introduction of air to increase buoyancy when required. It does not have any valving attached to the pistons or other methods of controlling allocation of fluids and gases in the pistons and the specification does not teach that the pistons can be used for bouyancy allocation by adding either air or water to one side or the other of the piston chamber to compensate for heavy loads which the machine may be carrying, or for inverted positions in mid water which require that the machine be navigated for prolonged periods without touching the work surface in an inspection mode using the on board guidance and navigation elements. The need for an inspection or work vehicle which can be selectively buoyed and ballasted and which can retain constant buoyancy as depth changes, and can compensate for dynamic buoyancy changes such as from an evacuable enclosure which is in turn either full of a gas or water, or for tasks involving transport or manipulation of heavy objects, making vast changes in the dynamic capabilities in the machine is hereby addressed.

In addition, a movable weight on board the vehicle made of lead or other heavy metal which can be quickly changed with a heavier or lighter one for specific tasks, and which can be moved from one location to another on the vehicle after installation while the vehicle is in operation and on location is of advantage in the delivery and installation of heavy objects on underwater structures, and for the subsequent inspection or adjustment of the object. In this type of application, the vehicles bouyancy allocation instantly becomes unbalanced if the vehicle has had compensating bouyancy or ballast added for off balance loads or for installations in inverted or other positions. This feature on board an ROV offers the advantage of eliminating or reducing the size of an awkward and bulky bouyancy package attachment to the object to be delivered. The combination of a movable weight system and a bouyancy allocation system provides the ROV with the means to counterbalance the weight of heavy objects which the ROV may be called upon to transport to underwater locations. U.S. Pat. No. 4,455,962 by Gongwer shows a spherical, free swimming ROV with a movable weight to provide attitude control while in operation underwater. However, the specification does not address whether this weight may be used to counterbalance off balance loads which the ROV may be called upon to transport to an underwater location.

Relative to intrinsically safe electrical generating systems and power transmission devices, which are required for ROVS which are used for ballast and cargo tank inspections on ships and other potentially explosive structures, U.S. Pat. No. 4,821,665 by Matthias et al, shows an ROV with an intrinsically safe submersible power generating system which is powered by a flow of hydraulic fluid from the surface. This vehicle is not a surface adhering vehicle and the power generating system requires a separate supply of fluid for a hydraulic motor which turns the generator. In a related disclosure, U.S. Pat. No. 4,808,837 by the same inventor discloses the submersible power generator of the ROV for shipping and general flammable applications. The disclosure does not however suggest its use or adaptation to an unrestricted ambient flow of water to generate electricity.

SUMMARY OF THE INVENTION

An underwater surface adhering inspection vehicle designed for precise underwater visual and non-destructive testing and mapping of large areas of steel structures, which is capable of timely detection of structural damage and the origin of oil leakage from an unknown source using an on-board fluorometer and remote acoustic emissions detector, then measuring the size and precise location of the hole or crack using an on-board eddy current detector, and having the ability to repeatably transit to the precise location after it is discovered is hereby disclosed. Also included is an on-board forward looking sonar system which is mounted on a robotic arm, a remote acoustic emissions sensor used for remotely tracking and measuring defect indicative acoustic emissions from ships and structures being loaded, and an on-board 3-D laser mapping system used for mapping the shape and terrain of underwater structures and damage is also included. In addition, a simple method of measuring irregular shapes and openings in zero visibility underwater conditions, such as are created by mine detonations near the hulls of military ships, or collisions, is disclosed. Positioning is assisted by acoustic transponders placed on the structure by a robotic arm on the vehicle, and the invention is capable of long term station keeping ability at a precise location in free water without constant operator intervention. It also has the ability to repeatably transit to a precise location on underwater structures in a three dimensional orientation with a high degree of repeatability. In addition, the heretofore unanswered need for an underwater hull cleaning machine and system which can adequately remove all marine growth and provide on-stream capture, filtration and processing of effluent water to remove marine growth solids containing large amounts of dissolved copper is disclosed.

It is therefore an object of the present invention to provide an improved method of hull cleaning which utilizes less water to carry the marine growth and solids to a filtration device.

It is another object of the present invention to create a stable work platform at the underwater work site for completion of work tasks by adhering to the structure being worked on.

It is another object to provide an ROV capable of in-water navigation, guidance, and inspection capabilities within a free volume of water while not attached or attracted to any structures.

It is a further object of the present invention to provide an invention which is capable of being remotely guided thru a volume of water to a remotely located underwater structure and upon arrival to adhere to the structure securely.

It is a further object to provide a movable, purgable enclosure which acts as an enabling device for underwater task completion of choice.

It is a further object to provide an evacuable enclosure which is movable while evacuated of water and containing a gas filled interior, enabling task accomplishment while either moving or stopped as required.

It is a further object to provide a suspension system for an evacuable enclosure which exerts constant pressure as the evacuable enclosure changes its height relative to that of the parent machine in response to changing terrain height of the substrate.

It is a further object to provide a work tool capable of high maneuverability while adhering to an underwater surface.

It is a further object to provide an ROV with an underwater navigation and guidance system which has the capability of transmitting, sensing and triangulating its location relative to that of established markers, such as underwater pingers to aid in precise determinations of locations of inspections.

It is a further object of the present invention to provide a movable sonar system which is extendable and articulates.

It is a further object to provide a laser imaging system which can be used in conjunction with a forward looking laser imaging system for visual imaging in combination therewith.

It is another object of the present invention to provide a stable platform for a 3-D laser terrain mapping system.

It is another object to provide a robotically controlled underwater vehicle that has increased traction for traversing underwater structures.

It is another object to provide a robotically controlled underwater vehicle that increases the quality of underwater welds by providing a dry, stable environment for both manual and robotic welds.

A still further object of the invention is to provide a robotically controlled underwater vehicle that has the ability for surface attachment, to maneuver and operate on uneven surfaces while completing tasks, and provides a constant and controllable distance relationship between magnets or other sensors used for steel thickness measurements and flaw detection and the substrate being measured by conforming to bulges and depressions in the substrate.

It is another object of the present invention to provide a vehicle platform for tasks such as inspections, cleaning or painting or other miscellaneous tasks which is capable of traversing a surface which is either underwater or can be out of water in atmospheric environments, using electromagnetic wheels or treads as a source of adhesion to the surface while out of water.

It is another object of the present invention to provide a vehicle which is intrinsically safe for use in highly explosive environments for immersion service.

It is another object of the present invention to provide a stable work platform for manipulating an airlift, jet, or other excavating tools to remove soil from around a pipeline or other submerged object.

Other objects and advantages of the present invention will become apparent from time to time throughout the specification and claims as hereinafter related.

BRIEF DESCRIPTION OF THE DRAWINGS

FIG. 1A is a cross sectional side view of one embodiment of the present invention, showing the major structures of the disclosure.

FIGS. 4A, 4B and 4C show three different alternate embodiments of suspension systems for an evacuable enclosure where 4A is a side cutaway view employing the use of a ram and spring for the suspension, and FIG. 4B shows an end cross sectional view of a lever arrangement, and FIG. 4C shows an end cross sectional view of a gear track and motor arrangement controlling the pressure exerted on the evacuable enclosure.

FIGS. 5A and 5B show a side and top view of a buoyancy tube used in the present invention.

FIG. 7 is an end cross sectional view of a power drive wheel.

FIG. 8A is a side view of a power drive wheel with a tread side plate removed.

FIG. 8B is a side view of an electromagnetic power drive wheel with a tread side plate removed.

FIG. 8C is a cross sectional view along a longitudinal line of rhe tread and interior wheel configuration of an electromagnetic power drive wheel.

FIG. 17 is a side exploded view of the evacuable enclosure rolling seal assembly.

FIGS. 21A and 21B are an end cross sectional view of a rolling seal in combination with a spring loaded hollow seal, showing the seals in both unloaded and loaded conditions.

FIGS. 21C and 21D are end cross sectional views of an expandable seal in both unexpanded and expanded conditions.

FIG. 24 shows a top view of the inspection vehicle.

FIG. 26A is a side view of the inspection vehicle.

FIG. 26B is a side view of the preferred embodiment of the present invention.

FIG. 26C is a side view of an alternate embodiment showing a wheeled method of moving the evacuable enclosure while maintaining a preset standoff distance from the substrate.

FIG. 26G is a plan view of three discharge chambers for hull cleaning brushes each connected to a peripheral vane pump as shown above, and their connection to a hull cleaning effluent discharge hose with a coanda slot at the connection.

FIG. 38 shows a side view of an embodiment well suited for excavation underneath submarine pipelines while attached to them, with an attached airlift and jet hose to robotic arms on the vehicle.

DESCRIPTION OF THE PREFERRED EMBODIMENTS

Figure 1B:
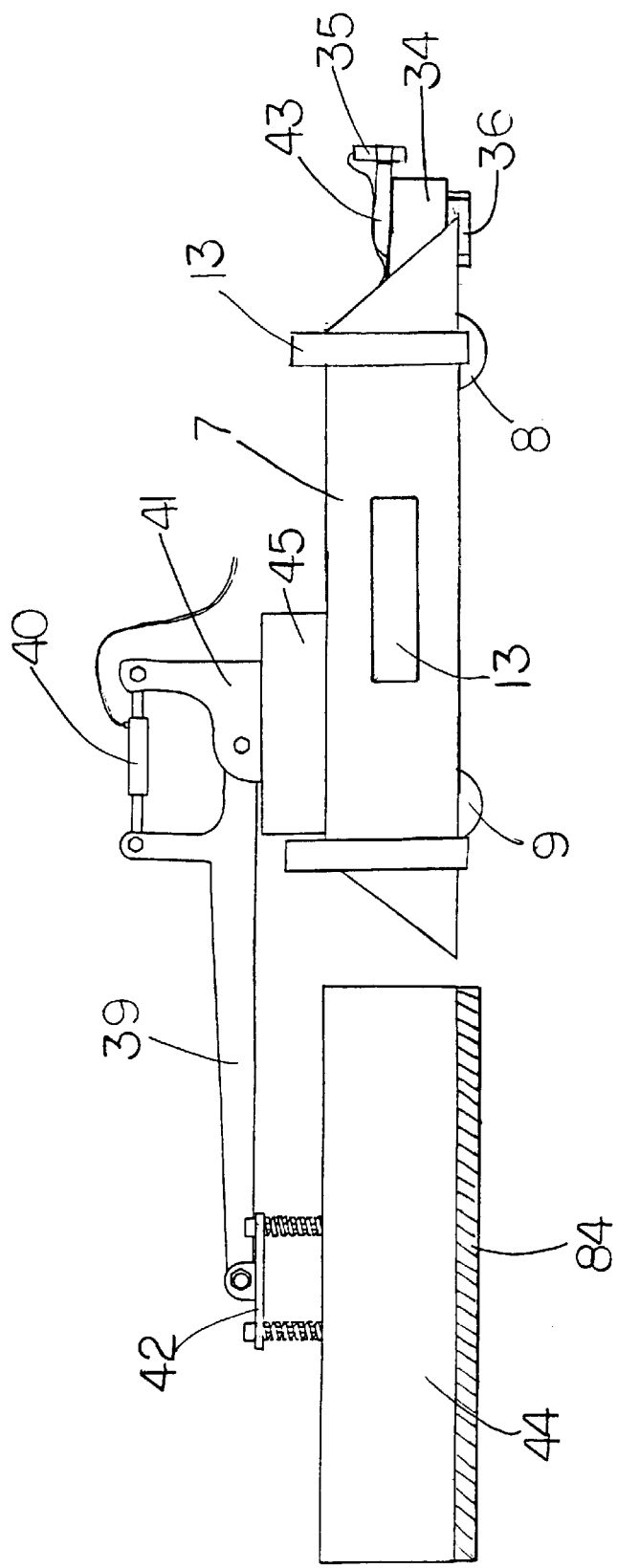
FIG. 1B is a side view of another possible embodiment of the present invention showing an evacuable enclosure attached by a movable arm to a surface adhering ROV.

A description of the construction and operation of the embodiments follows. The following embodiments of the present invention presents a combination ship hull or underwater structure cleaning tool and inspection and remote and physical sensing tool. Since the accuracy of underwater inspections relies upon a surface cleaned of marine growth using most inspection technologies today, this invention can be configured as either a tool used principally for cleaning large areas of structures such as ships in an environmentally acceptable way, or can be configured principally as a light weight, portable inspection tool which has the capability to clean selected surfaces but is not a large scale cleaning machine, or in a third embodiment has the brushes deleted and is strictly a diagnostic inspection tool for clean surfaces. In a fourth embodiment, the invention has the capability to both clean large surface areas and do concurrent accurate, intensive diagnostic surveys of structures. Any of the following elements in any of the shown embodiments may be added to other embodiments or combined together in the spirit of the present invention.

The machine may be used with the evacuable enclosure removed as a platform for robotic tasks using the attached robotic arm or other robotic tools and sensors. This includes tasks such as underwater welding or cutting, drilling, sawing, bolt tightening or other mechanical tasks which are more successfully performed when the operating platform is stable. As such, it is considered as a work class ROV which can either be used as a mid-water vehicle or as a surface adhering tool platform as the operator desires.

The hull inspector-cleaner of the present invention accurately examines the contours of any submerged structure, and has the capabilities to clean surfaces, measure paint and plate thickness and integrity of large areas of plates comprising a structure, can accurately measure the shape, size and contours of damage in any water conditions, including highly turbid conditions with zero underwater visibility due to suspended particulate matter in the water, can search for and diagnose the extent and flow rate of an oil or other fluid leak in a vessel, and can accurately document its progress and log all measured areas during a methodical search or measurement operation on a structure. In addition, it can clean the hull of a ship with a far lower liquid component of the waste discharge effluent fluid flows than heretofore, making it feasible to filter the fluid flow of solid material and contaminated marine growth using an on line filtration system. This facilitates an efficient, accurate cleaning operation with no marine biological waste discharge to the sea, essentially discharging water back to the sea with little or no variance in copper content from background counts.

In the following disclosure, the non-magnetic metal and mechanical components are made from titanium in the preferred embodiment, the magnetic portions are made from 440 series stainless steel and the machine body is made from high density polyethylene. In alternate embodiments, the body may be fabricated using carbon fiber composite, syntactic foam can be used in a sandwich configuration between other materials such as layers of carbon fiber or by itself, and other construction materials such as fiberglass, kevlar, nylon, polycarbonate plastic, ceramic, marine aluminum, stainless steel, titanium, mild steel, brass, or other similar materials can be used as construction materials for the body and mechanical portions of the vehicle if so desired. In the preferred embodiment, the machine body is designed to be a monolithic structure in which the shell or body of the vehicle also serves as the frame and provides structural rigidity and strength to support the suspension system and evacuable enclosure, although an internal framework of struts and braces can also be used for reinforcement if desired, and the vehicle may be constructed in an open frame design in the conventional manner of underwater vehicles, suspending the evacuable enclosure from the open frame machine body if so desired. In the preferred embodiment, the machine is electro-hydraulic in power supply for the thrusters and impeller, and uses an electrical source from an umbilical for the motorized controller controlled motors and on-board electronics. Alternatively, other power sources may be used such as pneumatic, hydraulic or electrical from surface supplied or on-board sources. In the intrinsically safe embodiments shown, such as in FIGS. 26A, B and C, where an on board submersible generator is used, the primary power source is a remotely located hydraulic pump, which is connected to the ROV by hydraulic fluid supply and return hoses, or alternatively this embodiment may employ a saltwater hydraulic system with no return hose as the power source. Electricity is generated by an on board submersible generator which supplies all of the electrical power and signal transmission functions on the vehicle.

Starting with FIG. 1A, which is a side view of an ROV with an evacuable enclosure 44 attached. The ROV has a machine body 7 with a front wheel 8 of which there may be several and a back wheel 9 of which there may also be several, attached thereto by a bracket 264 and spring for movably supporting the machine body on a surface. The wheels in this example are provided with tractor treads 77, however, in alternate embodiments and the suspension system is not used, and other wheels are used and may be fixed in a vertical orientation. The machine body 7 has a thruster 13, of which there may be a multiplicity, for propelling the vehicle through a body of water. A suction chamber 20 having an open bottom end, and an opening through its top end is mounted on the machine body 7 and has an impeller 5 driven by a motor mounted in the suction chamber. The impeller used may be a ring type propeller, or a conventional propeller, and may be provided with coanda slots to acheive a coanda effect. The impeller draws water through the open bottom end of the suction chamber 20 and expels it through the top opening to create a negative pressure or suction force at the bottom end to adhere the machine body 7 onto an underwater surface. A deflector shroud 308 is mounted over the top opening to deflect the effluent water flow towards the rear of the machine, and which is capable of assisting the machine in forward travel while transiting through a volume of water. A buoyancy tube 81 of which there are a multiplicity mounted on the machine body, creates and distributes buoyancy to areas of the ROV which require it by the action of a free floating ram inside which will be discussed in depth later.

A movable ballast assembly 90, of which there may a multiplicity, is attached to a linear slide 133 and acts as a movable counterweight to counteract the twisting action of off-balance tasks. The movable ballast assembly also assists in stabilizing the ROV in inverted and vertical component positions to provide extended position and station keeping ability while operating in free water if required. A motor 69 controls the position of the linear slide by turning a worm screw. The evacuable enclosure 44 is held underneath the machine body 7 by an enclosure pivot arm 130, of which there are a multiplicity, attached to a suction guard 83 which is a flat plate that directs water flow around the sides of the evacuable enclosure, thereby preventing it from being sucked away from a substrate by water flowing thru the impeller. The suction guard 83 is attached to the machine body by brackets. The evacuable enclosure has at the bottom a side seal 84, which may be a stationary or rolling seal depending upon task requirements.

Turning again to the suspension system, a spring pressure activating ram 52 depresses the coil spring 53, using variable pressure measured by a load cell 96. In this system, the coil spring acts as the principal suspension for the evacuable enclosure 44, and adapts to changes in the height of the substrate between the wheels 8 and 9. If a large amount of irregularities in the surface to be traversed are anticipated which would require suspension to have longer travel than that of the coil springs, a constant pressure, distance compensating system which will correct for large surface irregularities can be incorporated in which connected to the spring pressure activating ram by a hose is an air pressure regulator 276 which regulates the input pressure, and the pressure of which is remotely adjustable by the operator. Also connected to the pressure chamber of the spring pressure activating ram 52 is a motorized controller controlled exhaust valve 101, which is in this case a remotely controlled pressure regulator which regulates overpressure and exhausts to the sea, and uses closed loop position control, and can be operated by a servo, stepper, or other motorized controller and may also be robotically controlled if so desired. This system has the effect of producing a constant pressure on the coil springs, regardless of the length the ram has been extended, and if reverse pressure originating from surface irregularities pressing up on the evacuable enclosure beyond the stroke of the coil spring manifests itself, the rams automatically are pushed back in response to the venting of the overpressure by the motorized controller controlled exhaust valve to a position which maintains the required amount of pressure on the evacuable enclosure. This design has the effect of making each of the spring activating rams into variable, controllable rate springs with a long throw to compensate for large variations in the substrate's height. In other embodiments, or for deeper water applications, the system may use hydraulics to achieve the same effect, using ordinary hydraulics technology as is known in the art to achieve the same effect, or a system of gears on a track on each corner where the evacuable enclosure is movable up and down along the track by the gear motor, and incorporating a motorized controller controlled motor using closed loop position control, and can be operated by a servo, stepper, or other motorized controller and may also be robotically controlled if so desired, and a load cell in which the system responds to increases in load on the load cell by making appropriate changes in the height of the evacuable enclosure by the operation of the motorized controller controlled motor. The evacuable enclosure suspension system can either operate in conjunction with the suspension system of the wheels, or can operate independently in embodiments of the ROV which do not have wheel suspension.

FIG. 1B shows an alternate embodiment wherein the machine body 7 is separate from the evacuable enclosure 44. The machine body 7 has a front wheel 8 of which there may be several, a back wheel 9 of which there may also be several, a thruster 13 of which there may be a multiplicity. A control arm 39 is attached to a control mount 41 attached to a spacer 45 mounted on the body 7. A ram 40 forces the arm 39 downward to apply pressure on a spring plate assembly 42 which in turn applies pressure on the evacuable enclosure 44 which has a side seal 84 on each side. A lidar camera mount 43 on the front of the machine body holds a lidar camera 35 in a down-looking position, and below it is a sonar transducer array 34 with a forward-looking lidar camera 36 immediately beneath it, of which there may be several for use in stereoscopic viewing.

Figure 2:
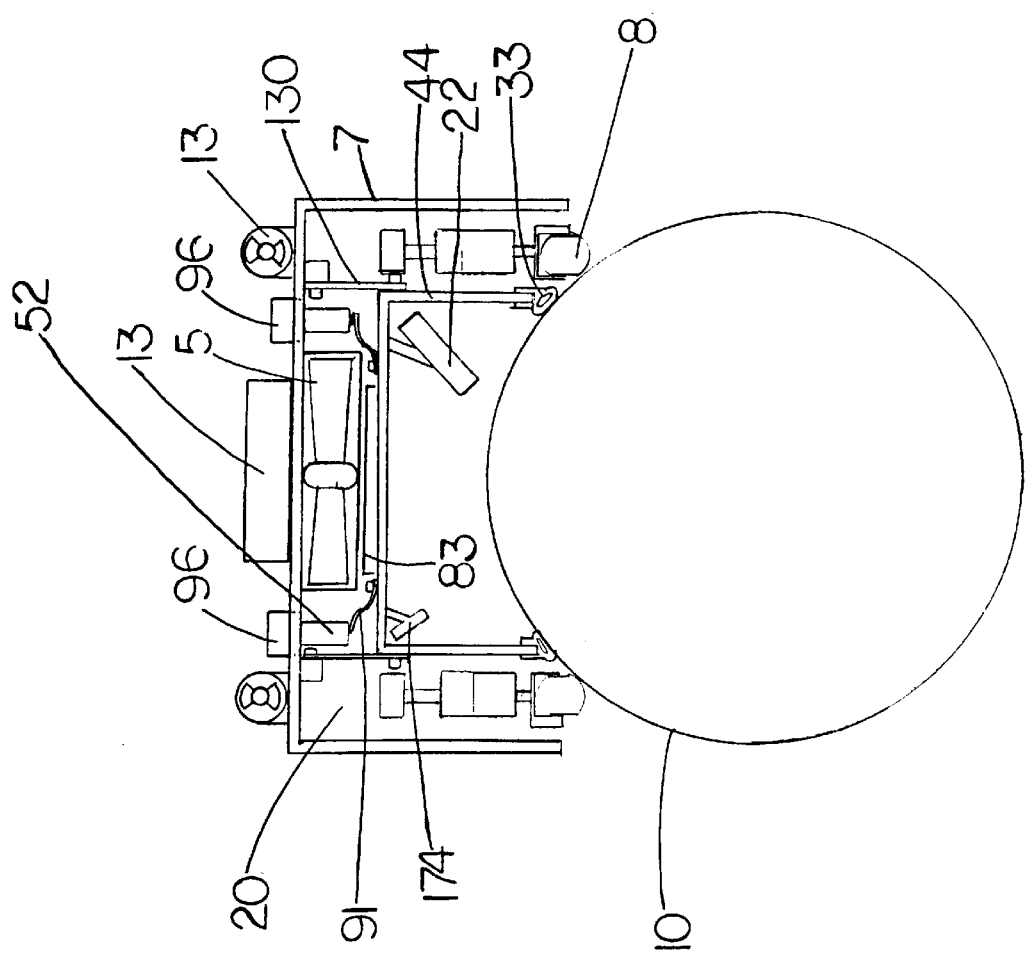
FIG. 2 is an end cross sectional view of an embodiment of the present invention specifically adapted to travel on cylindrical shaped objects.

FIG. 2 shows an embodiment which is specifically adapted for travel on cylindrical structures, wherein the machine body 7 has a thruster 13, of which there may be a plurality, a suction chamber 20 with an impeller 5 enclosed and a suction guard 83 below the impeller. A spring pressure activating ram 52, of which there may be a multiplicity, is mounted on the machine body 7 and behind each a load cell 96 for measuring pressure exerted on a leaf spring 91 which presses down on the evacuable enclosure and a rubber seal 33 at the bottom of the evacuable enclosure. Inside the evacuable enclosure is mounted a TV camera 22 and a light 174. Contacting a pipe 10 is a front wheel 8, which is a modified spherical embodiment adapted to pivot on cambered surfaces such as pipes and other curvatures without losing traction or guidance. In this embodiment, the wheels may be turned at right angles to produce circumferential travel on the pipe if so desired. In this embodiment, the ROV may be used for excavation of soil or other overburden from around and underneath the pipeline by the incorporation of one or more robotic manipulators or arms which can be attached to jet nozzles and hoses, airliffts, eductors, rotary and other types of digging tools, and may be used with a combination of the above tools. An airlift or robotic arm when used in this application can have attached jet nozzles or other configurations of various soil removal tools and equipment which are known in the art by those of ordinary skill. The jet hose, if a water-fed jet is used, may be supplied from a remotely located source of pressurized water or may be fed from an onboard water pump mounted on the ROV.

Figure 3:
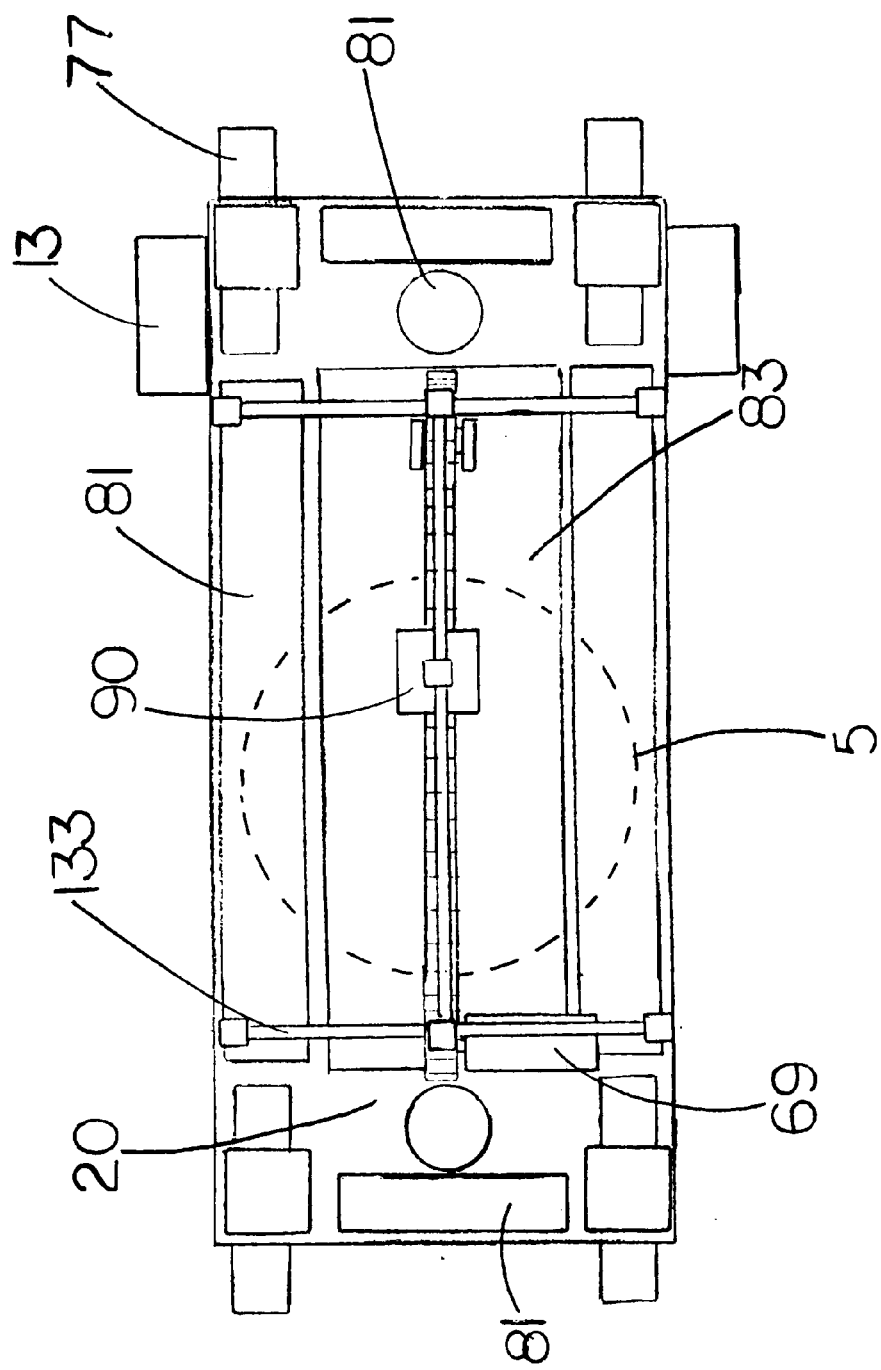
FIG. 3 is a cross sectional top view of an embodiment of the present invention showing the placement of major structures.

FIG. 3, shows a top view of the machine body 7 with the top and impeller removed, showing the structural layout of an embodiment wherein a thruster 13, of which there can be a multiplicity, is mounted on the side, and inside the machine body a movable ballast assembly 90 is mounted on a linear slide 133 and moved by a motor 69 inside of a suction chamber 20, which also has a buoyancy tube 81, of which there can be a multiplicity, and also inside the suction chamber is a suction guard 83, which is shown as being mounted below the movable ballast assembly. This configuration can be changed so that the movable ballast assembly 90 is mounted below the suction chamber 20 if task and stability requirements dictate, along with the buoyancy tubes 81 in any alternate embodiments. For reference, a dotted line indicates the relative location of the impeller 5. A tractor tread 77 is shown at the front being mounted on a wheel.

Figure 4A:
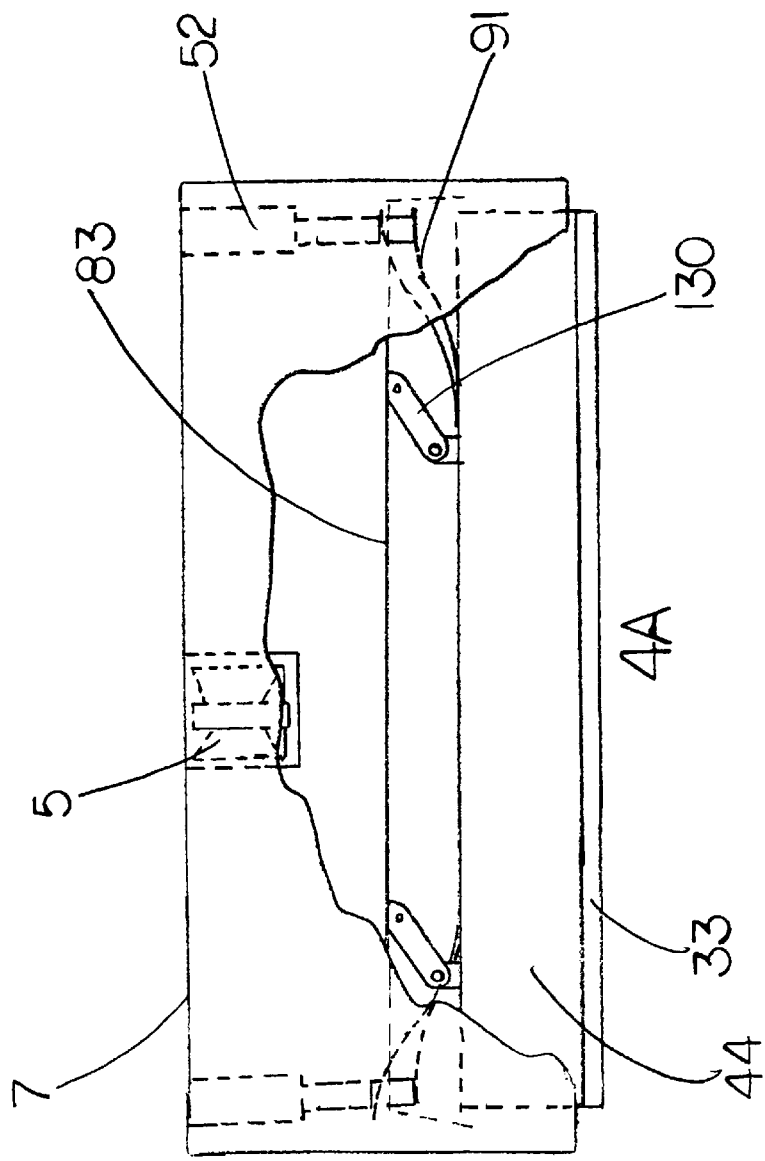

FIG. 4A, shows in a side cutaway view, an arrangement of the suspension and pressure producing mechanism for the evacuable enclosure 44 wherein the machine body 7 has an impeller 5 enclosed in a suction chamber with a suction guard 83 therebelow, and a spring pressure activating ram 52, of which there can be a multiplicity, which depresses a leaf spring 91 that is attached to the evacuable enclosure 44 attached to the machine body by an enclosure pivot arm 130, of which there may be a multiplicity, which is affixed to the suction guard 83. The the evacuable enclosure has a rubber seal 33 at the bottom. In other embodiments the enclosure pivot arms 130 can be attached to the brackets inside the suction chamber which are directly affixed to the machine body with any of the embodiments shown in this specification. If the leaf spring is depressed to the limit of its travel by an irregularity on the surface being travelled on, thus pushing the evacuable enclosure up against the ram, the spring pressure activating ram has the ability to retract by means of an exhaust valve which senses an overpressure in the ram if the ram is air pressurized, which alternatively can also be a pressure regulating valve or other suitable pressure reducing elements such as bypass valves and the like known by those with average skill in the art if the system is hydraulic for deep water applications. In an alternate embodiment, the ram may be a double acting ram and may be made to automatically retract in response to directed pressure from the substrate sensed by the load cell by the action of a motorized controller controlled flow control valve which is actuated in response to signals from the load cell.

FIG. 4B shows a motor and lever arrangement, of which there may be a multiplicity, wherein a motor bracket 279 is attached either to the suction guard 83 as shown or alternatively may be attached to the interior of the machine body at a convenient location, and a motor 69, which may be either an air, hydraulic or electric motor, is attached to a drum 301 having a length of wire 302 wrapped around it. The wire extends down to one end of a pivot bar 303, which is moveably attached to a mount 304, and the end of the pivot bar has a roller 307 which presses downward on a pedestal 305 on the corner of the evacuable enclosure 44, which has a load cell 96 incorporated. In this embodiment, the air motor exerts a constant pulling pressure on the wire which translates the movement into downward pressure on the evacuable enclosure. In this embodiment, each corner of the evacuable enclosure has a motor and lever arrangement, each acting separately in response to changing height and thus pressure requirements of that area of the evacuable enclosure. If the evacuable enclosure encounters a high spot, the motor will automatically unspool a quantity of wire in response to a twisting pressure on the drum greater than the internal pressure, which is caused by the lever moving downward. The pressure may be regulated by an on board pressure regulator 276 as shown in FIG. 1, or may alternatively be controlled by a remotely located one. The length of the pivot bar, location of the fulcrum, size of the drum and motor and input pressure to the motor will determine the exerted pressure on the seals of the enclosure, which should not exceed the pressure exerted on the wheels to prevent traction problems but should be great enough to facilitate a seal around the base of the enclosure. This pressure will vary with the size of the evacuable enclosure used.

Several other alternate suspension embodiments for the present invention are possible using the lever and motor arrangement. In one embodiment, the enclosure has a coil or leaf spring incorporated which the roller pushes on. In another, only one assembly as shown presses down on the center of the evacuable enclosure. In another, this suspension for the evacuable enclosure is the only suspension that the machine has, leaving the wheels without spring loading. In another alternate embodiment, the evacuable enclosure has a coil spring as its only suspension and the wheels of the machine do not have any suspension. In another, the wheels are spring loaded, but the evacuable enclosure is rigidly attached and relies on the wheel suspension to compensate for irregularities in the substrate. In another, the motor, pivot bar, motor bracket, drum, wire and mount are inverted and affixed to the top of the evacuable enclosure and the roller presses on a pedestal or similar structure on the machine body or suction guard. In another, the drum has two separate wires which are wrapped in opposite directions around the drum and are each affixed to opposite ends of the lever with the roller being attached to the pedestal on a sliding track, and the motor is reversible, making this assembly capable of pulling the evacuable enclosure away from the substrate for tasks which do not require the hull cleaning brushes to be in contact with the substrate. When a load cell is incorporated which senses pressure exerted on the top of the evacuable enclosure, the air or hydraulic pressure or voltage to the motor may be changed accordingly by a remotely located controller by an operator.

Figure 4C:
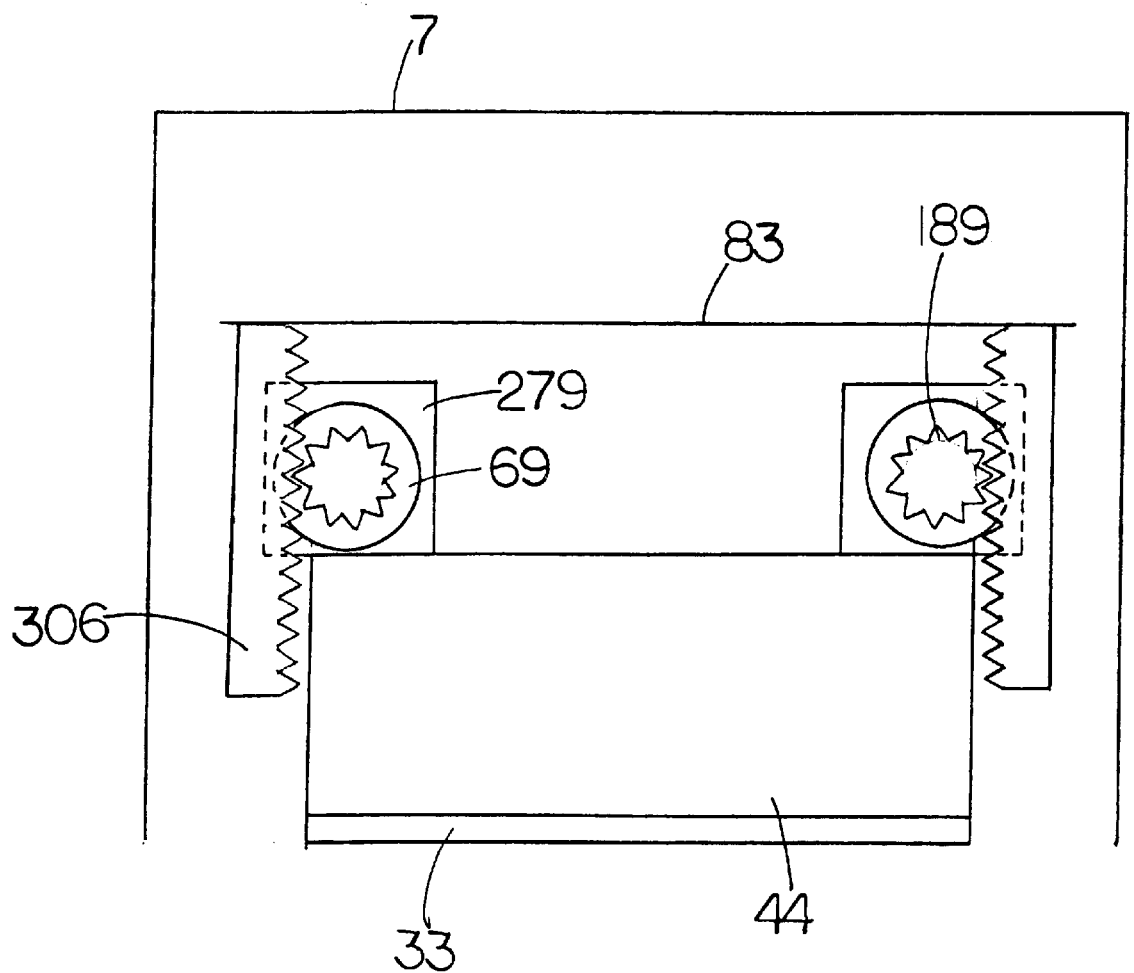

FIG. 4C shows another suspension system, of which there may be a multiplicity, for the evacuable enclosure 44, wherein a motor drive gear 189 is driven by a motor 69, which may be an electric, hydraulic, pneumatic motor, and may be reversible, which is secured to the top of the evacuable enclosure 44 by a motor bracket 279. The drive gear meshes with and moves along a gear track 306, which is rigidly attached to the suction guard 83 as shown or may in alternate embodiments by attached to the interior of the machine body at a convenient location. In this embodiment, each corner of the evacuable enclosure may have a gear and motor driving along a gear track, and the assemblies may be inverted and connected instead to the machine body or suction guard, with the gear tracks each attached to the respective corners of the evacuable enclosure. The output shaft of the motor which is attached to the motor drive gear can also have a suitable reduction gear box attached which multiplies the torque to the gear if so desired. In another alternate embodiment, a linear slide is used in place of the gear track in each corner, in the center, or on several sides to move the evacuable enclosure appropriately.

Any of the above suspension methods may also be used as the suspension method employed for the principal suspension for the wheels of the vehicle, being incorporated separately into each. In addition, sway and torsion bars may also be used as well as leaf springs for the wheel suspension and evacuable enclosure.

FIGS. 5A and 5B, show side and top views, respectively, of the buoyancy tube. In FIG. 5A an end cap 79 is attached to a tube body 80 and has attached a motorized controller controlled exhaust valve 101 which uses closed loop position control, and can be operated by a servo, stepper, or other motorized controller and may also be robotically controlled if so desired, and has connected an exhaust duct 87. Also connected and penetrating the end cap is a pressure sensor 29, an ultrasonic sensor 19 and an intake manifold 109. Attached to the intake manifold is a motorized controller controlled water inlet valve 32, and a motorized controller controlled air inlet valve 46, both of which use closed loop position and velocity control, and can be operated by a servo, stepper, or other motorized controller and may also be robotically controlled if so desired. Attached to the motorized controller controlled water inlet valve is a water inlet 23, and attached to the motorized controller controlled air inlet valve is an air duct 24. A piston 108 with an O-ring 107, of which there may be a multiplicity, is slidably disposed inside the buoyancy tube. FIG. 5B shows a top view layout of the end cap, detailing the relative locations of the aforementioned structures. A similar end cap may be found at each end of the buoyancy tube, facilitating charging or purging either side with either air or water, depending on the operator's preferences and task requirements, the piston is resultantly moved by this action, providing either buoyancy or ballast on either side of the piston.

Figure 6:
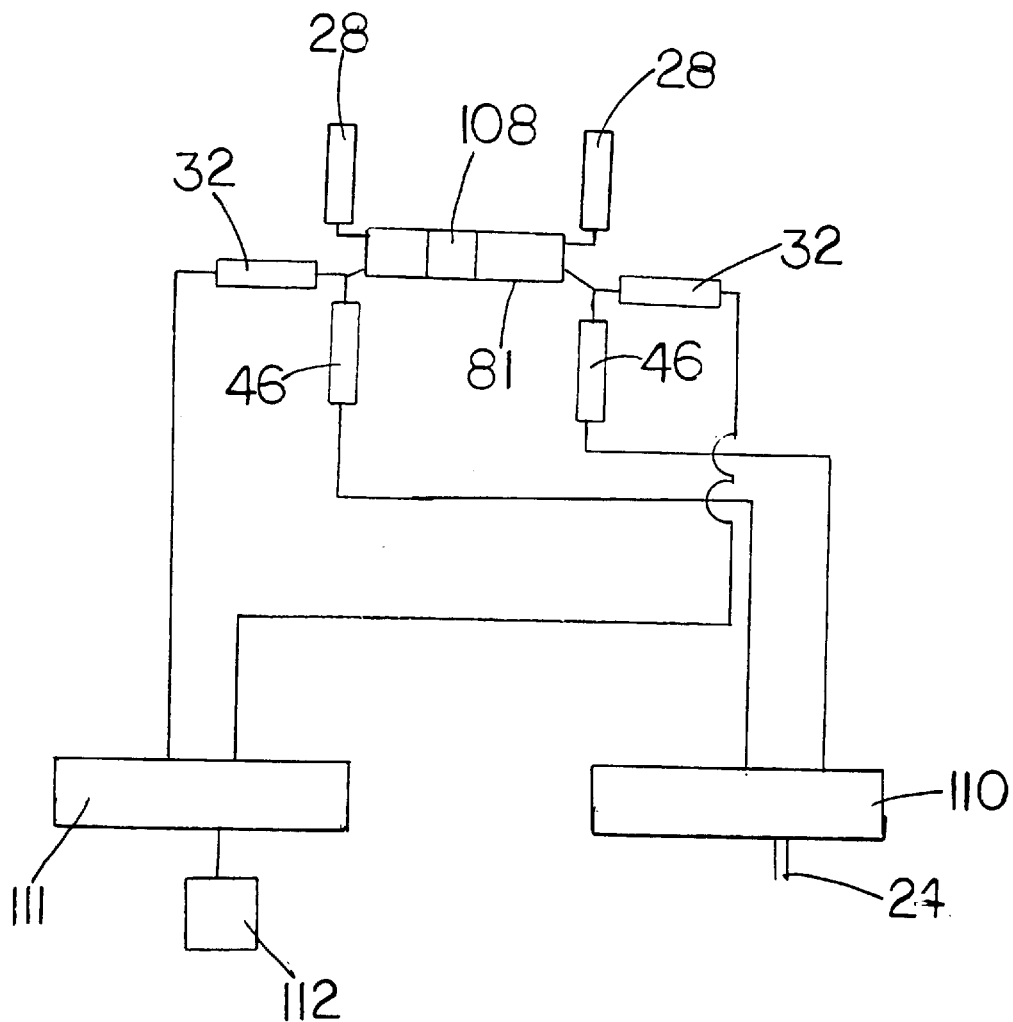
FIG. 6 is a schematic drawing of the air and fluid flow systems used with the buoyancy tubes.

FIG. 6 is a schematic view of the water and air supply and exhaust systems used in the buoyancy tubes, where the exhaust valve 28, which is controlled by a motorized controller, which uses closed loop position and velocity control, and can be operated by a servo, stepper, or other motorized controller and may also be robotically controlled if so desired, terminates outside the machine, and is capable of exhausting either air or water by remote control. The motorized controller controlled water inlet valves 32 on each end cap connect to a water distribution manifold 111, which is a fluid filled structure pressurized by a buoyancy tube water pump 112, which is a low pressure pump onboard the machine. The motorized controller controlled air inlet valves 46 are both connected to a common air distribution manifold 110, which is supplied with pressurized air from an air duct 24 which is connected to a remotely located air source. In alternate embodiments, the water pump is a high pressure pump for deep water applications, and may be remotely located from the machine with a high pressure water hose connected. The air and water supply and exhaust valves are each separately remotely controlled by an operator, allowing the piston in the buoyancy tube to be pushed by either water or air pressure to any selectable position in the tube based on task parameters. Signals from each of the sensors are shown on a screen, depicting the internal pressure and relative positions of each piston in each buoyancy tube on the ROV, and which side of each tube is water filled, and is viewed by an operator who controls the machine's position and stability. The ultrasonic sensor 19 shown in FIG. 5 mounted on the end cap at each end of the buoyancy tube indicates the position of the piston and indicates the presence or absence of water on either side of the piston by the strength of the return ultrasonic signal. Since ultrasonic signals adapted for a liquid medium give poor returns through an air medium, the return time of the emitted signal from the sensor on either end cap will indicate the piston's position. If no return signal is sensed by either ultrasonic sensor on a buoyancy tube, then it is assumed that the tube is filled with air, the pressure of which can be measured by the pressure sensor 29 on either end cap.

FIG. 7 is a front cross sectional view of a propulsion wheel, in which a propulsion shaft 113 is enclosed in a shaft casing 114 and is centered by a bearing 16 at the top of a transfer case 116 inside of which the propulsion shaft is connected to a bevel gear 120 which meshes with a similar bevel gear which is attached to a transfer shaft 115 which is also centered in a bearing 16. Attached to the transfer case is a transfer case bracket 119 which is secured to a tread side plate and wheel spacer which is shown in FIG. 8. The transfer shaft is connected to a propulsion gear 117 which is a straight cut gear and of which there is a series terminating at an axle 118 which turns a tread roller 122, of which there may be a multiplicity, which is enclosed by a tread 121 which has a tread tooth 215 to maintain the belt's alignment on the roller and which there is a multiplicity on each tread which fit into a tread tooth groove 213 which is serrated to conform to the shape of the teeth in the tread, thereby preventing the tread from slipping on the drive roller. Any of the other non-driving rollers may have a non-serrated groove as shown on the middle roller in FIG. 8 if so desired. In the preferred embodiment the wheel parts, transfer case and gears are made from titanium, although in other embodiments other suitable construction materials such as rigid plastics, carbon fiber composites or other metals such as brass or aluminum can be used. The tread is made from rubber-fabric laminates and is similar in cross sectional design to conveyor belts and other flexible rubber treads commonly used in industry. The tread can have raised crossbars approximately 2 cm. apart or other tread designs for traction on slippery surfaces which are commonly encountered on underwater structures. In alternate embodiments, the tread is made from 440 series magnetizable stainless steel and the tread rollers each contain permanent or electromagnets to assist in attraction to a substrate. This type of embodiment using electromagnetic attraction is of great benefit in out of water, terrestrial applications such as painting or flame spraying large flat surfaces, such as petroleum storage tanks, semisubmersible drilling rigs or ship hulls, which may be vertical or overhead, and in which a thruster or impeller is of no value in an atmospheric environment. Suitable metal belts for this application are comercially available from Belt Technologies, Agawam, Mass. The transfer case 116 is filled with gear lube in the preferred embodiment and seals are provided at each penetration to prevent leakage. The propulsion wheels are designed to operate in forward or reverse travel modes and can pivot in a full 360 degree circle on the central axis of the wheel when required by turning the shaft casing by steering means shown in FIGS. 10 and 11. In the drawings, the preferred embodiment has four wheels, but in alternate embodiments three wheels can also be used, as well as more than four wheels. In other alternate embodiments, the vehicle may have conventional wheels and steering without incorporating suspension or the ability to turn in a 360 degree arc as shown in the prior art without departing from the spirit of the present invention.

Turning now to FIG. 8A which is a side view of a propulsion wheel with a tread side plate removed, where a shaft casing 114 is attached to a transfer case 116 underneath which is found a tread 121 with multiple tread teeth 215 which fit into a tread tooth groove 213 in each of the tread rollers 122 which turn on an axle 118. Attached to the forward axle is a spring roller tensioner 123, of which there can be a multiplicity, which pushes the axle forward, creating constant tension on the tread which prevents slippage by maintaining the tread teeth seated firmly in the tread tooth grooves as the rollers turn. In an alternate embodiment, instead of a circumferential groove on each roller, each roller has grooves extending transversely across the full width of the roller with the rubber tread having appropriate raised crossbars which fit into the grooves on each roller to prevent tread slippage on the drive roller during high drag tasks, such as when moving an evacuable enclosure across an uneven surface while holding it against the surface. On both sides of each wheel is a tread side plate 124 to which is attached a wheel bearing 263, of which there is a multiplicity. In other embodiments, the wheel bearing can be replaced by a bushing if so desired. The bearing on the front axle is mounted so that it can move forward or backward in the axle groove in the tread side plate in response to pressure from the spring roller tensioner. Extending between and connected to both side plates between each roller is a wheel spacer 219 of which there may be a multiplicity, and which act to align the side plate in a vertical axis and thereby create a more rigid mount for the axles in the side plates. The tread side plate protects the rollers from debris lodging between them and the tread and aligns the axles. The axles are held in place in the tread side plate by nuts which screw onto the ends of each axle and are then secured with cotter pins or other securement devices. In an alternate embodiment, the spring roller tensioner can be located on the outside surface of the tread side plate. in other embodiments the spring roller tensioner is attached to the transfer case brackets, which can extend down on each side of the wheel with holes provided for each axle.

Turning now to FIG. 8B, which shows a side view of an electromagnetic power drive wheel with a tread side plate removed, where an electromagnet 127 of which there is a multiplicity forms a rotating tractor tread which contacts at the bottom a contact plate 567 which is attached to the wheel spacer, which in this embodiment is enlarged to fill most of the gap between both front and back tread rollers, and which also supports a spacer wheel 565, of which there may be a multiplicity. In this embodiment, the tread side plate, which is shown in FIG. 8C, has a seal around its periphery contacting the sides of the electromagnets to prevent the intrusion of dirt or other foreign bodies into the interior of the wheel assembly.

FIG. 8C is a cross sectional view along a longitudinal line of rhe tread and interior wheel configuration of an electromagnetic power drive wheel, where a contact plate 567 contacts a carbon contactor 569 which is attached to a coil spring 53 which sits in a receptacle 571 the assembly of which there can be a multiplicity of, and which ordinarily is attached one on each side of a tread segment 563 as is shown, although a single embodiment is also possible. In addition, other types of contactors such as rollers may be employed instead of the carbon brushes shown. The tread segment has an interlocking convolution 579 which interlocks with a similar appurtenance of the contact plate and prevents the tread from separating from the carbon contactors beyond the travel of the coil springs when the wheel is inverted on the underside of structures, thus preventing the loss of attraction while in inverted positions. An electromagnet 127 is attached to the bottom of the tread segment and has incorporated a coil 561, which is used to generate an electromagnetic field, and of which there can be a multiplicity, and is connected to the carbon contactor by a wire 573, which receives a supply of electricity from the contact plate which is supplied with a flow of electricity from a remotely located power generation source and transmitted by a power cable or wire to the contact plate. The electrical power used to power the electromagnets can either be AC or DC current, although in the preferred embodiment AC current is used. Unlke prior art tread wheel designs that extend the entire length of the vehicle are limited to tank-like pivots caused by stopping one tread while moving the other (which would be difficult or impossible on ship bottoms with barnacles and other growth attached, and have an inherent problem of tread slack causing separation of the carbon contactors from the contact plate while in inverted positions, the electromagnetic wheels of the present invention utilizes separately pivotable treads which are steered by separately pivoting each on an axis in a similar manner to wheels on an automobile. Outside of the carbon contactors and wheels is found several of a tread side plate 124, which has around its periphery a rubber seal 33, which prevents the intrusion of foreign particles and materials. In alternate embodiments, the interior of the wheel assembly may have a supply of water continuously introduced, thereby providing a positive pressure differential and assisting in maintaining the interior free of contaminants. The tread segments are made from rigid plastic with hinges between them in the preferred embodiment, but may be made from any non-conducting material or conducting material with insulation from the electrically energized portions of the magnets to prevent grounding, and the treads may be made from a continuous band of flexible gum or silicone rubber instead of rigid segments as is shown here. The present invention in this embodiment may be used for terrestrial out of water applications such as inspecting or cleaning and painting the sides of ships or other similar tasks, and may have the thrusters 13, central impeller 5, evacuable enclosure, robotic arms, sonar system and suction chamber deleted from the vehicle for this embodiment if so desired, along with other such elements disclosed in the present specification if not needed for the specific task if used in an exclusively out of water application. In other applications, such elements of the present invention as have been disclosed in this specification may be incorporated or deleted to suit specific needs. This embodiment has the particular and unique advantage of being able, with thrusters incorporated, to navigate and manuever both in a free volume of water; while submerged and attached to the side of an underwater structure; and while attached to a structure in a dry atmosphere. The invention in this embodiment or in a similar embodiment but without thrusters incorporated may be operated underwater adhering to the side of a ship, then driven up the surface out of the water and along the structure above the waters surface without interfering with the machine's operation or modifying its structure, or may be driven into the water from an above water location if so desired either with or without thrusters incorporated as so desired to suit specific task requirements.

Figure 9:
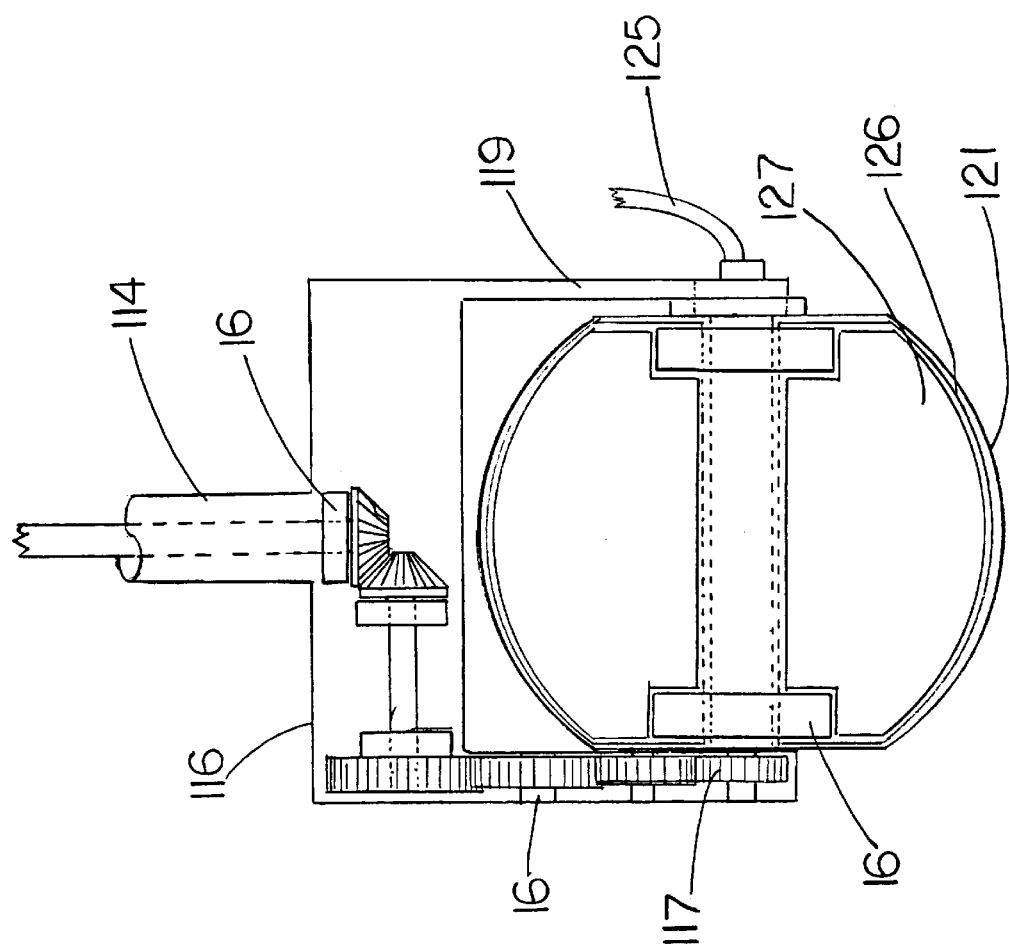
FIG. 9 is a cross sectional view of another embodiment of a power drive wheel used for traveling on curved surfaces.

FIG. 9 shows a power drive wheel which is specifically well adapted for travel on curved surfaces. This drive wheel is made from titanium, or other strong, non-corrosive metal such as magnetic stainless steel, brass or alternatively from plastic or carbon fiber and is covered with a thin coat of rubber to facilitate traction on slippery underwater surfaces. The wheel is turned by twisting the shaft casing while on a surface. The wheel may have electromagnetic capabilities in alternate embodiments as shown if so desired and can be made from magnetic stainless or mild steel for this utility, and have an internal electromagnet as shown, in which a power cable 125 connects to a wheel 126 which has internally an electromagnet 127 of which there may be a multiplicity, and which can be oriented with the axis of the magnetic field toward the surface which the wheel is traveling upon. This electromagnetic attraction is of great benefit in out of water, terrestrial embodiments where the machine is used for thermal spraying or painting of pipelines, where an impeller cannot be used as an attraction method to hold the machine against a work surface. The shaft casing may be of varying lengths and size, and the machine is adaptable to many different sizes of pipe and curvatures.

Figure 10A:
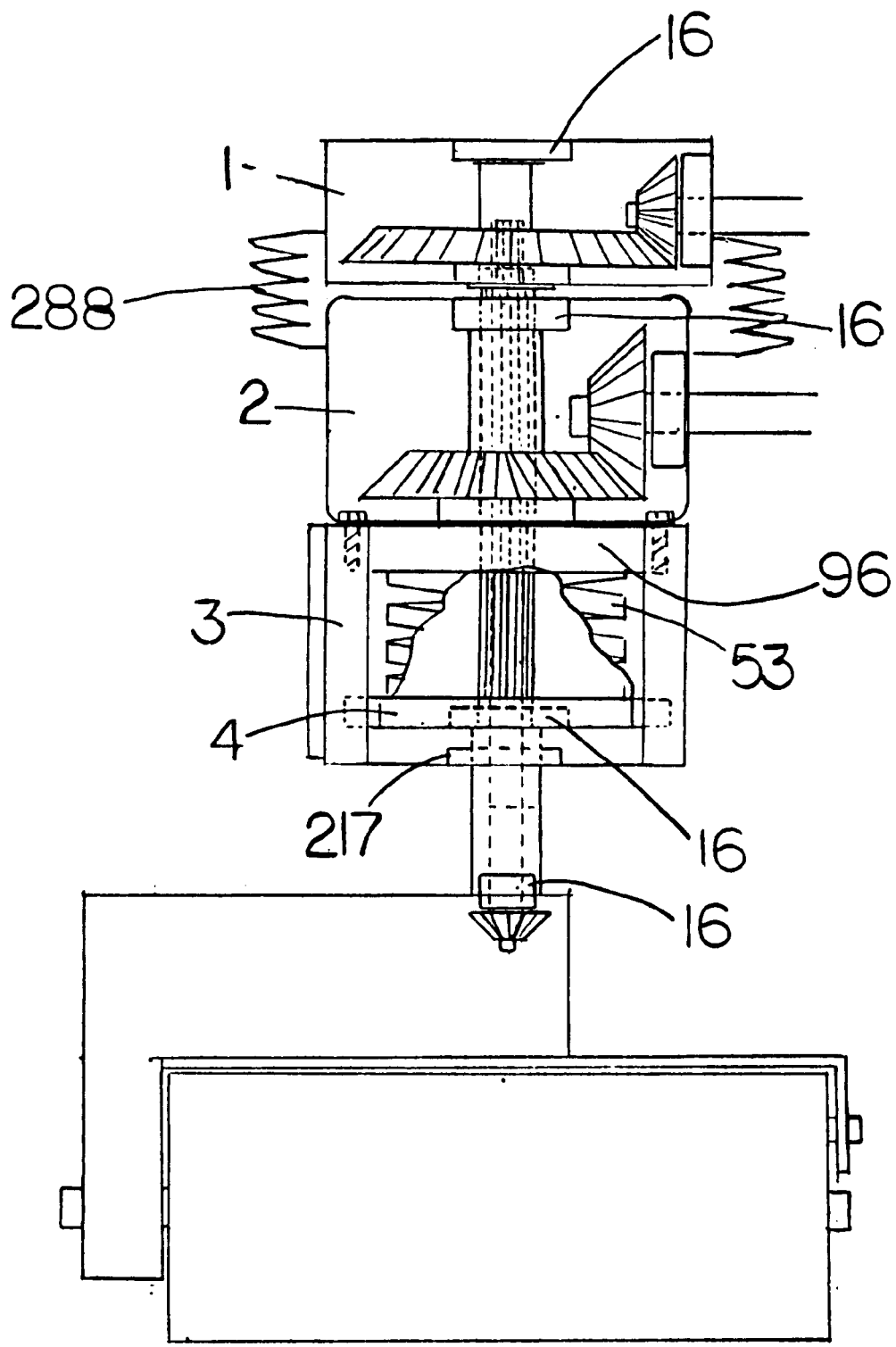
FIGS. 10A and 10B are front cross sectional views of the suspension, steering and propulsion gear cases and housing, showing the suspension in both loaded and unloaded conditions.
Figure 10B:
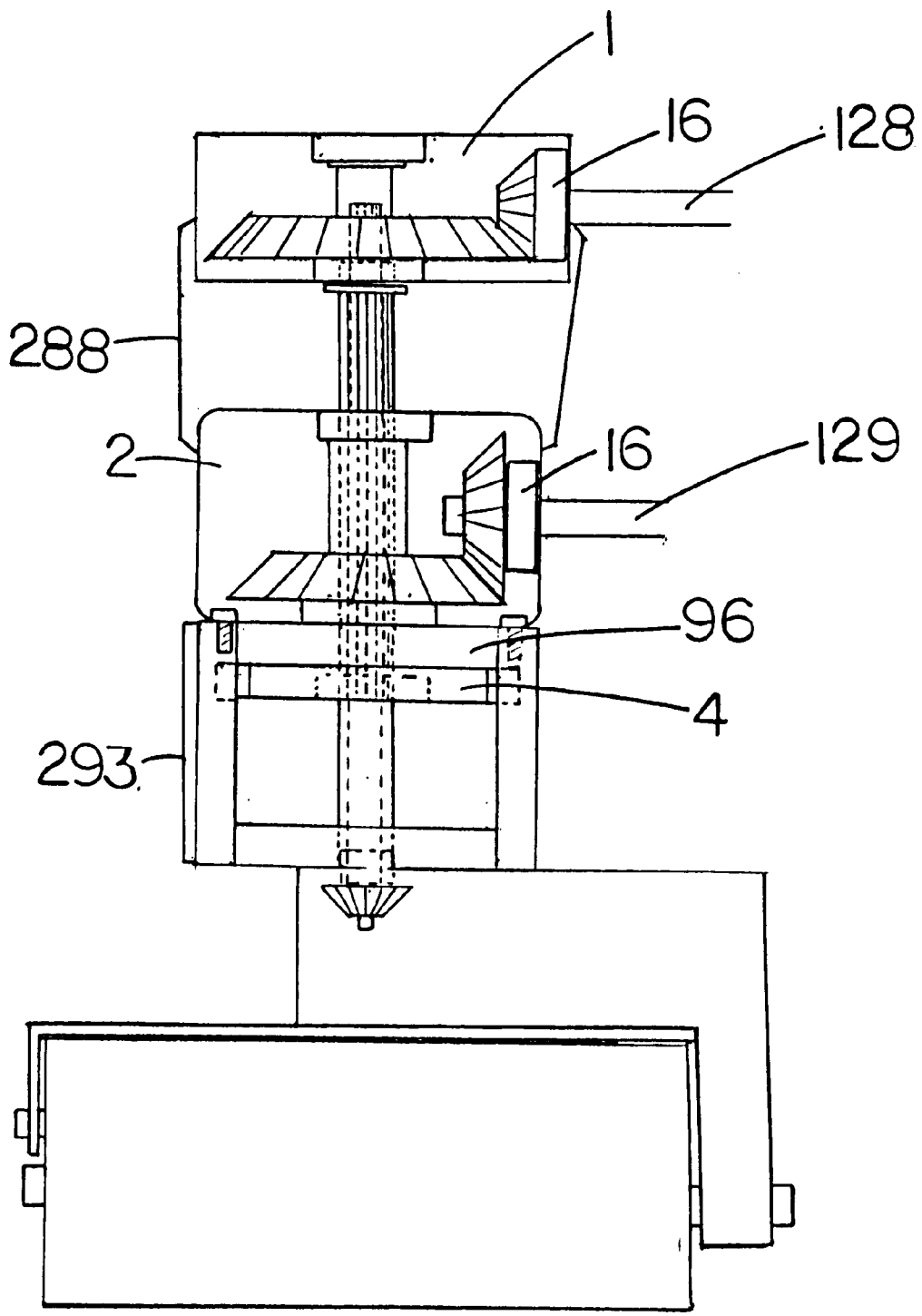

Turning now to FIGS. 10A and 10B, where in FIG. 10A a propulsion gear case 1 sits above a steering box 2, which in turn is located above a suspension housing 3 which is a sealed enclosure which is fluid filled with gear oil or other lubricant which communicates with the steering box which contains a coil spring 53 which bears on a spring base plate 4 which is capable of sliding up and down inside the suspension housing which has a shaft seal 217 at the bottom which slides on the shaft casing and prevents fluid leakage to the outside. A rubber boot 288, is affixed to the propulsion gear case and steering box by conventional adhesives, clips, straps or brackets and is fluid filled. It protects the sliding shafting inside the steering box from grit, sand and other contamination. In alternate embodiments, the propulsion gear case is cylindrical in shape and has a skirt with a seal at the bottom which extends down partially over the periphery of a cylindrical steering box with seals at the top and which can be contiguous with the steering box and suspension housing if so desired and still retain the spirit of the invention. In other alternate embodiments, the steering and propulsion assembly is enclosed in a separate fluid filled enclosure in the machine body which has an opening with a shaft seal which the shaft casing and wheel protrude from.

The propulsion gear case and steering box each have separate drives to control each function. The propulsion gear case in the preferred embodiment is a separate oil filled structure with seals at the top and bottom to prevent leakage, but in alternate embodiments may share the same fluid supply with the steering box. The steering box is fixedly attached to the suspension housing using conventional means, and may in alternate embodiments be configured as a contiguous structure with each other and may be configured as a cylinder with a seal at the bottom to prevent fluid leakage from the interior. In 10B, the suspension is shown compressed by the downward force of the impeller in the machine body and the low pressure effect of the fluid flows under the machine body, which raises the coil spring and spring base plate to the top of the suspension housing, also moving the propulsion gear case upward. The steering box is sealed on one side by a rubber diaphragm 293 which allows for fluid expansion as the suspension is compressed, which forces the components into the steering box. The assembly may be secured to the machine body by welding or bolting the suspension housing or the propulsion gear case to brackets or the like on the machine body or suction guard. A driveshaft 128 enters the propulsion gear case from the side to provide forward and reverse movement, and a steering shaft 129 enters the steering box to provide steering guidance while traversing a surface. A load cell in each suspension housing onto which the coil spring applies upward pressure sends a constant readout of the spring pressures on each wheel, indicating whether the wheel is contacting the substrate and whether the evacuable enclosure is lifting the machine body up in negotiating a high or low spot on the substrate.

Figure 11A:
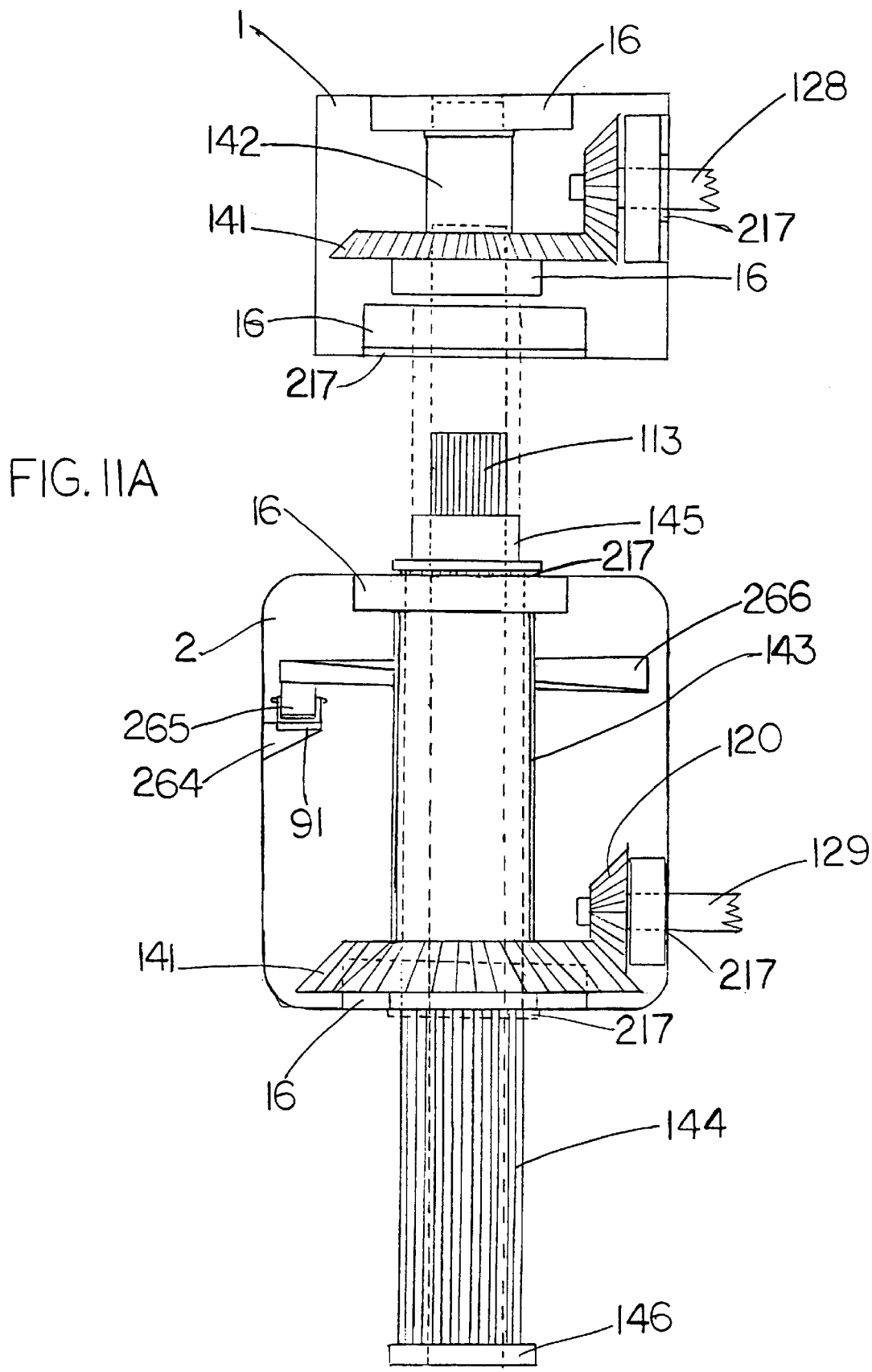
FIGS. 11A and 11B are front cross sectional drawings of structural details of two embodiments of the propulsion gear case and steering box.
Figure 11B:
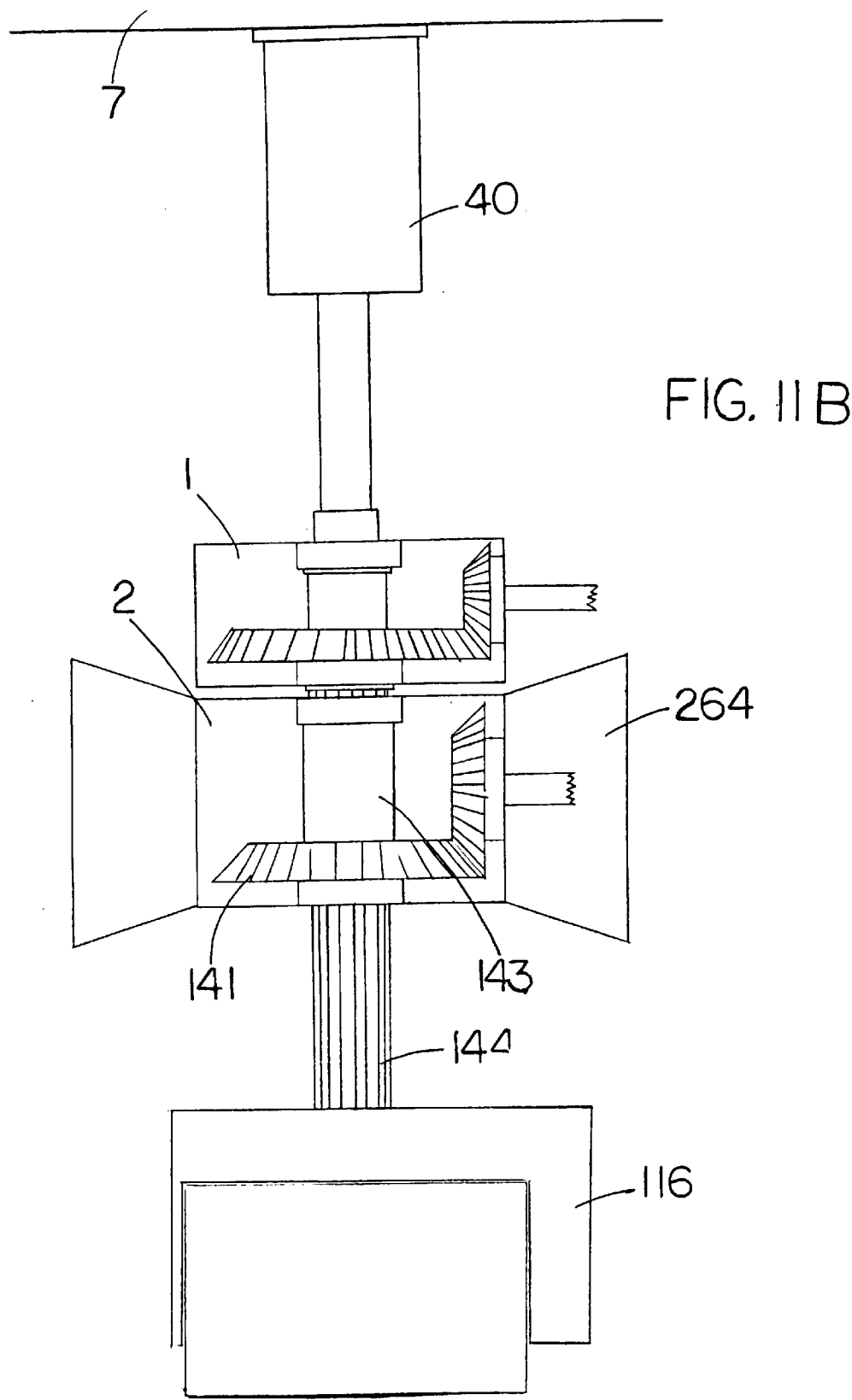

Turning now to FIG. 11A, which is a side cross sectional view of the preferred embodiment of the steering and propulsion assembly of the present invention, which shows a gear extension shaft 142 attached to a crown gear 141 inside of the propulsion gear case, which has a seal and bearing at the bottom which fit on a bearing seat 145 on a spline shaft 144 which is a hollow structure which encloses the propulsion shaft for the wheel assembly which has a spline at the end as shown which is fixedly attached to the crown gear and gear extension shaft. Inside the steering box is found a sliding collar 143 which is attached to a crown gear, and which has attached a variable thickness circular disk 266 to which a rolling ultrasonic transducer 265 rolls against. The rolling ultrasonic transducer is pressed against the variable thickness circular disk by a leaf spring and is fixedly attached to the steering box by a bracket as shown. The rolling ultrasonic transducer detects the thickness of the variable thickness circular disk as it is turned by the rotation of the steering shaft and gives accurate readings of the position of the wheel, which is displayed by a graphical user interface at a remotely located operators control console. The bottom surface of the variable thickness circular disk is parallel to the axis of the rolling ultrasonic transducer, facilitating constant pressure application regardless of position. The variable thickness circular disk gradually tapers in a clockwise or counterclockwise direction and is thickest at a point adjacent to its thinnest point. Its position on the sliding collar can be made adjustable by means of a set screw or other securement so that the wheels may each be aligned to give readings as preferred by the operator. A shaft seal 217 is found at each of the penetrations of the steering and propulsion boxes and internally in the spline shaft to prevent leakage of oil from the interior. At the bottom of the spline shaft is found a suspension stop collar 146 which prevents the suspension from traveling too far. FIG. 11B shows an alternate embodiment in which the propulsion gear case has attached a ram which is secured to the machine body, and which is used to push the wheel down, thereby lifting the machine body and evacuable enclosure over high spots in the substrate which would otherwise impede the progress of the evacuable enclosure. This embodiment may be used with a suspension housing as shown in previous drawings or without it, as shown here.

Figure 12:
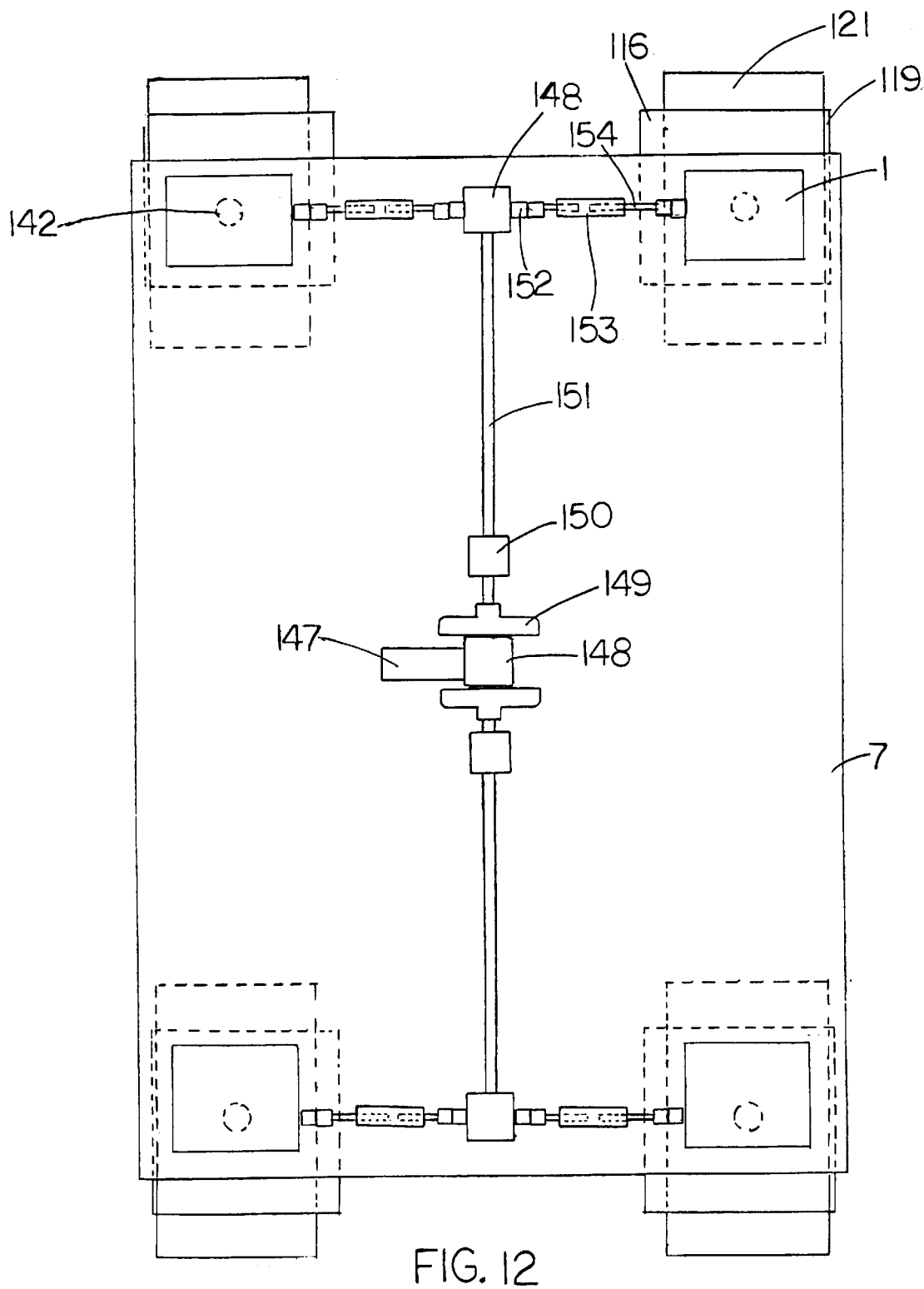
FIG. 12 is a top view of the present invention with the top removed, detailing the construction of the propulsion system.

Turning now to FIG. 12, which is a plan view of the propulsion system of the present invention, where a motor 147, of which there may be a multiplicity, is connected to an angle drive 148 which has a clutch 149 on either side of the dual output angle drive, which are connected to a primary driveshaft 151 which is kept centered in rotation by a thrust block 150, of which there may be a multiplicity, then connecting to another angle drive at the front and rear of the machine body, with dual outputs connected to a u-joint 152, of which there is a multiplicity, which connects to a intermediate shaft 154 which has along its length a slip collar 153. The motor is a variable speed motorized controller controlled motor which is capable of forward and reverse rotation and uses closed loop position and velocity control, and can be operated by a servo, stepper, or other motorized controller and may also be robotically controlled if so desired, and can be powered by hydraulics or pneumatic power in alternate embodiments. The clutches can each be independently controlled by similar means, making the front and rear wheels separately controllable from each other, and can be controlled by either hydraulic, electric or pneumatic means, and in the preferred embodiment are hydraulically actuated.

Figure 13:
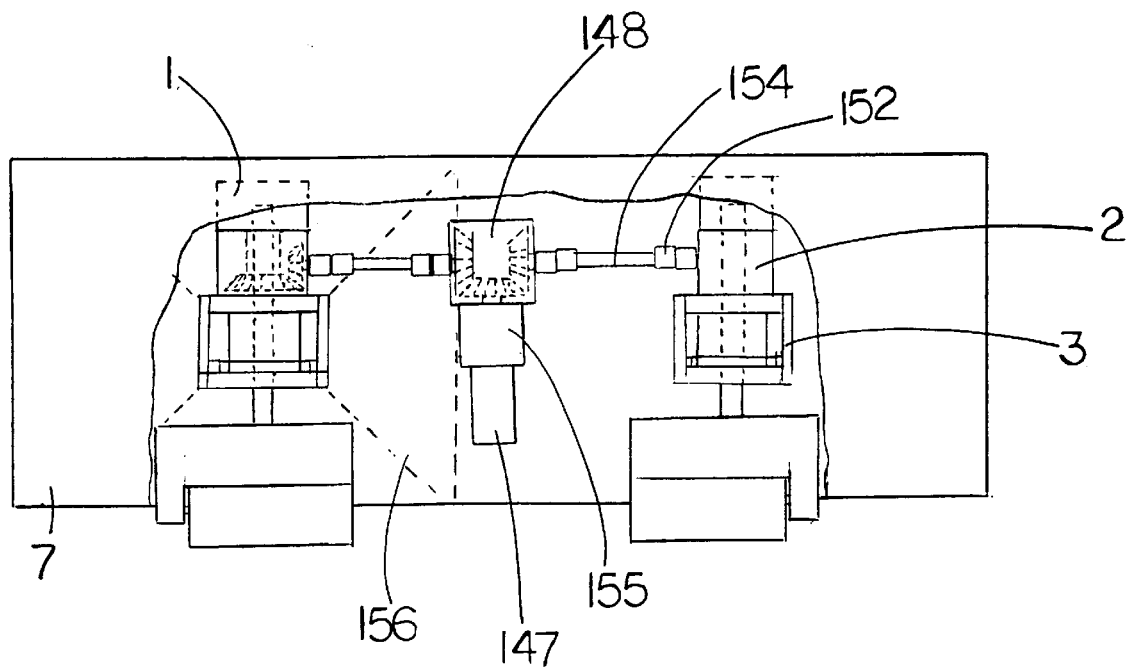
FIG. 13 is an end cutaway view of the steering system of the present invention.

Turning now to FIG. 13, which is a front cutaway view of the steering system showing a motor attached to a reduction gear box 155 which connects to an angle drive 148 which then connects to an intermediate shaft by means of several u-joints, then to the steering box where the rotational energy is directed to the wheels by means of gears. In the preferred embodiment, the suspension housing is secured to the machine body by means of a bracket 156, of which there may be a multiplicity. In the preferred embodiment the motor is electrically powered and uses closed loop position and velocity control, and can be operated by a servo, stepper, or other motorized controller and may also be robotically controlled if so desired. In alternate embodiments the suspension and propulsion system may be secured by other means such as an enclosure, belts, clips or adhesives.

Figure 14:
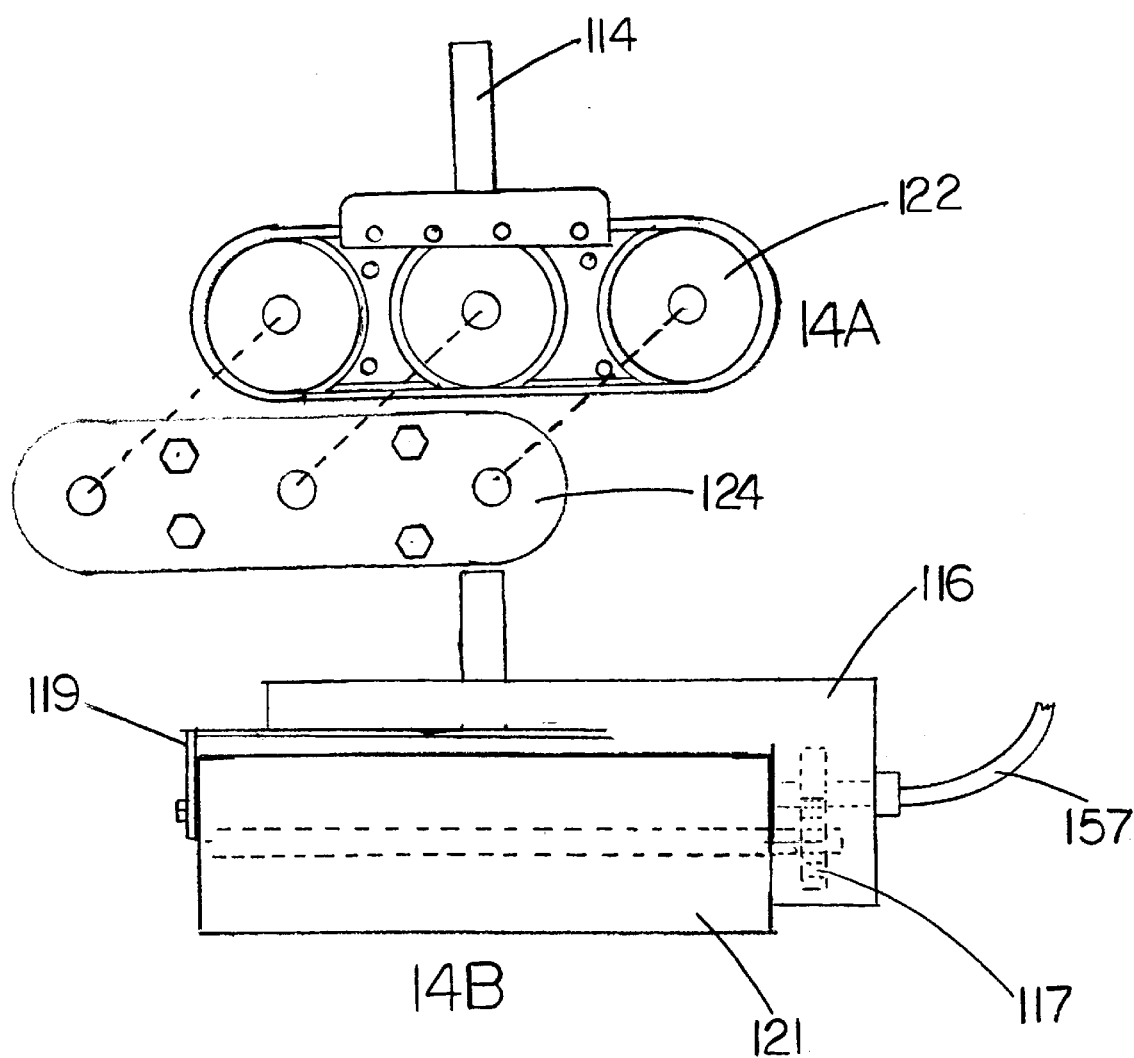
FIGS. 14A and 14B are side and end views, respectively of an alternate embodiment of the propulsion system of the present invention showing a cable drive method of propulsion.

Turning now to FIGS. 14A and 14B, where in 14A, which is a side view of an alternate embodiment of a propulsion wheel with the tread side plate removed for clarity, and in 14B which is a front view of a propulsion wheel with a flexible torque cable 157 which is connected to the propulsion gears in the wheel. This cable may be of the type commonly used in industry for flexibly transferring rotational energy, and may be made of any suitable metal.

Figure 15:
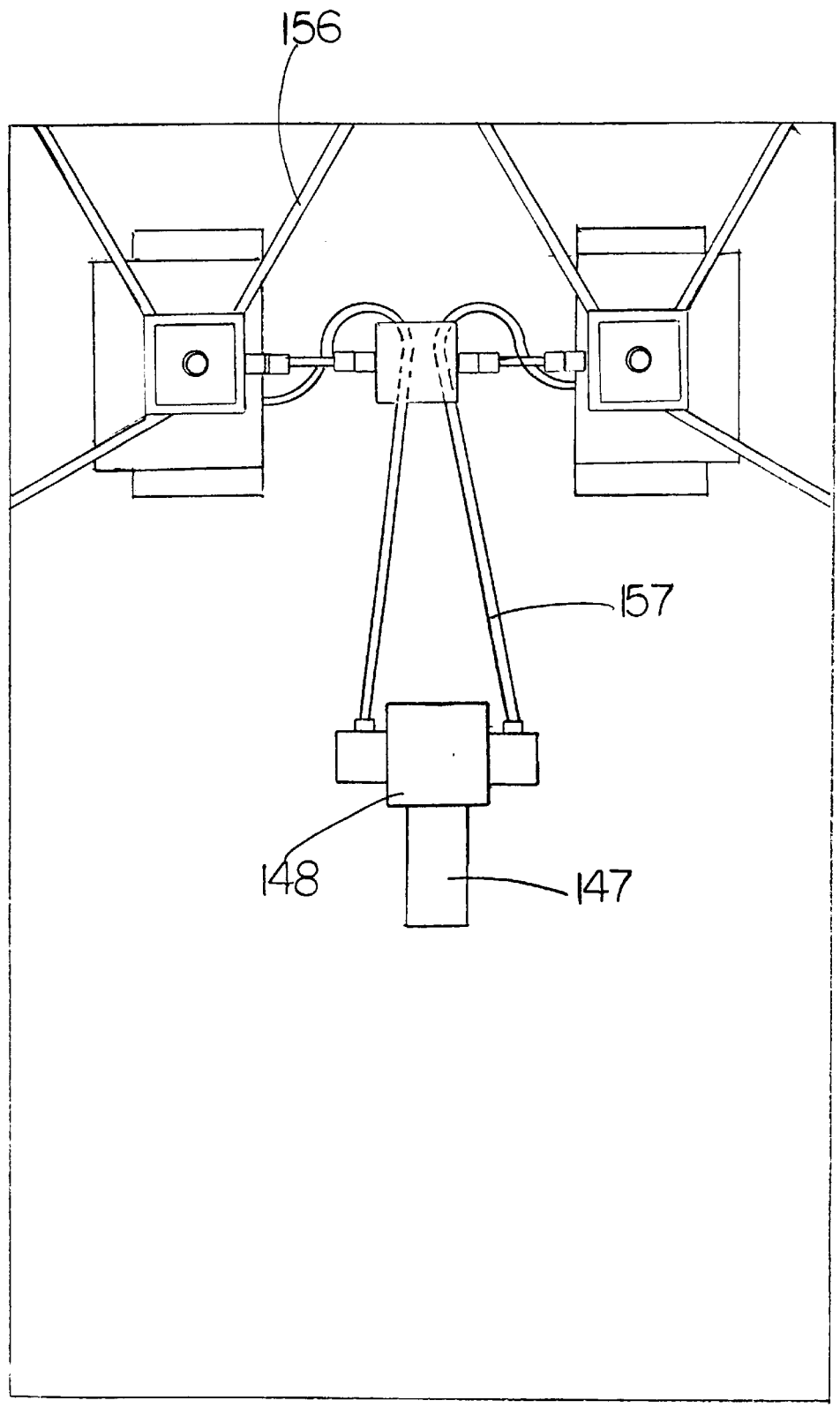
FIG. 15 is a top view of an ROV with the top removed, detailing the elements and layout of the cable drive embodiment of the propulsion system.
Figure 15:
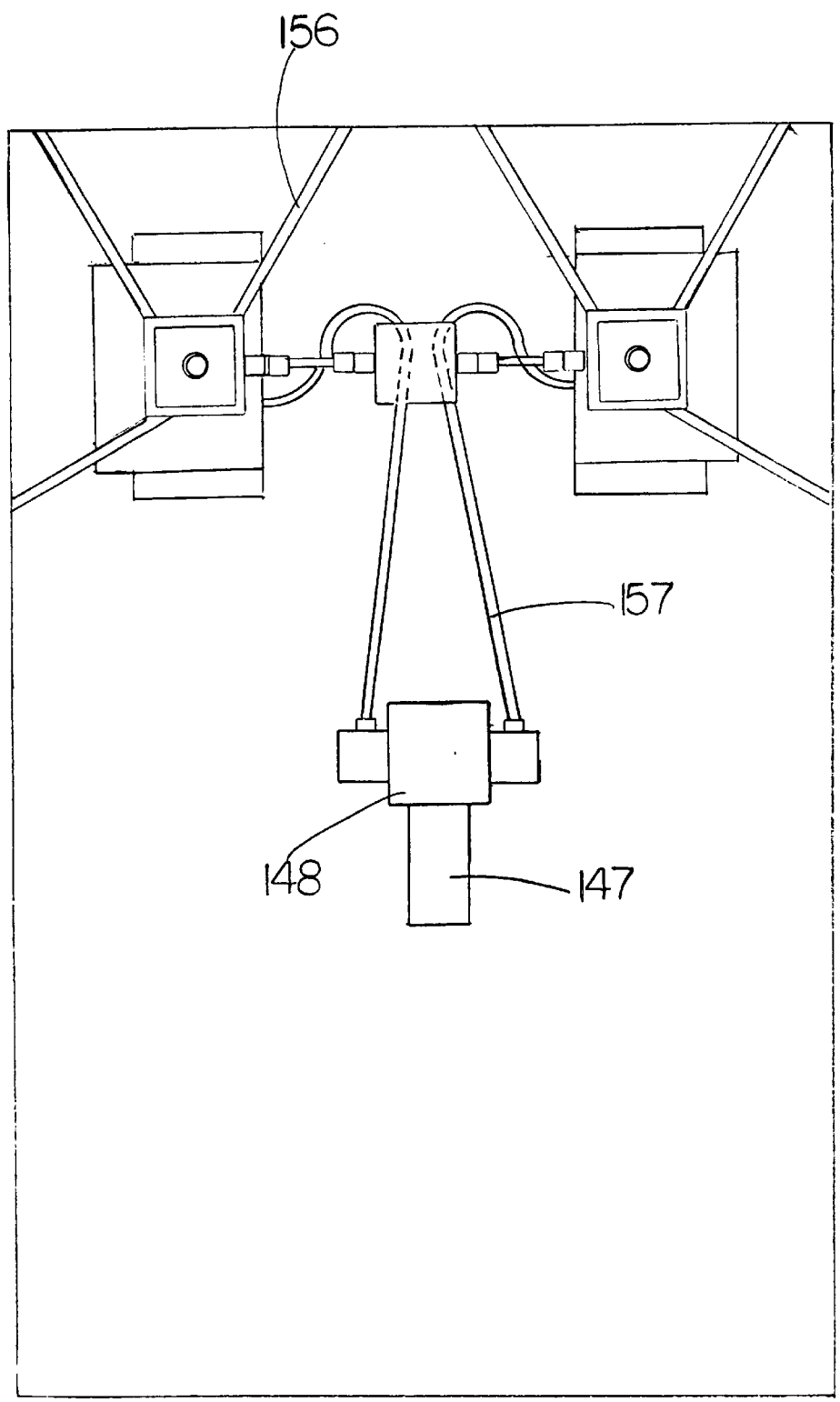

FIG. 15 shows the embodiment of FIGS. 14A and 14B in a plan view which details the attachment and layout of the components.

Figure 16:
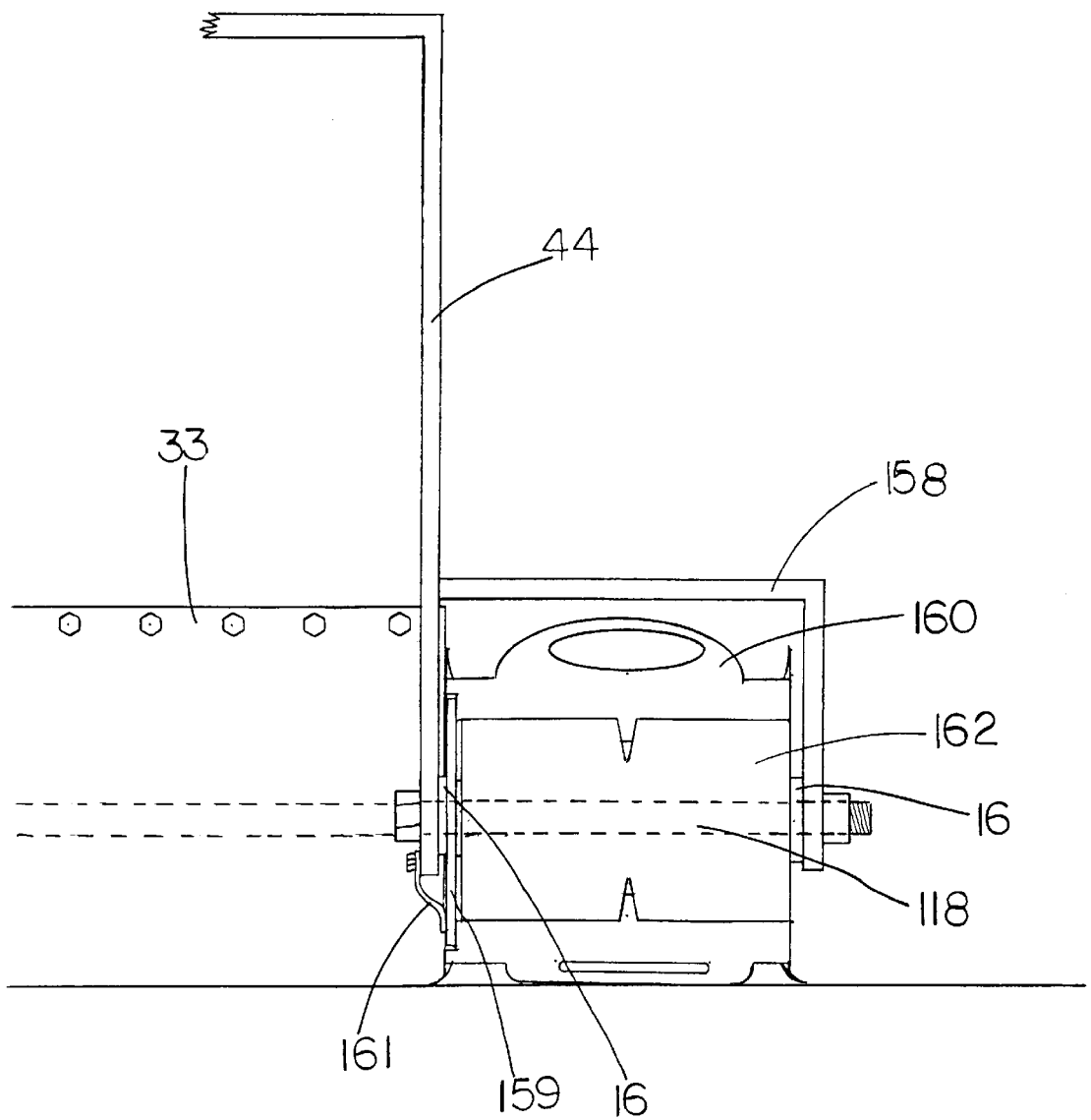
FIG. 16 is an end cross sectional view of the evacuable enclosure rolling seal arrangement of the present invention.

Turning now to FIG. 16, which is a front cross sectional view of the rolling seal assembly of the present invention attached to an evacuable enclosure, where a rolling seal bracket 158 has penetrating it an axle which has attached a rolling seal plate 159 which has a rolling seal spring 161 of which there may be a multiplicity, pressing against the lower portion of it so that it applies constant pressure to the side of a rolling seal 160 which rolls on a rolling seal roller 162 of which there may also be a multiplicity. this seal has a hollow portion which communicates with the surrounding medium by one or more limber holes, and which is springy and resilient. In the preferred embodiment the rolling seal is made from soft silicone rubber and in alternate embodiments may be made from other rubber or flexible materials such as gum rubber, mylar, stainless steel sheets, or other flexible plastics.

Turning now to FIG. 17, which shows a side view of the rolling seal assembly with the assembly detached from the evacuable enclosure and the rolling seal plate and enclosure roller removed, where an enclosure roller 163 is shown detached from the rolling seal which normally shares the axle in common when assembled, and the enclosure roller can serve as either the front or rear seal for the evacuable enclosure in tandem with a flap seal which would assist in preventing the escape of gas from the interior of the enclosure and prevent the intrusion of water into the evacuable enclosure.

Figure 18B:
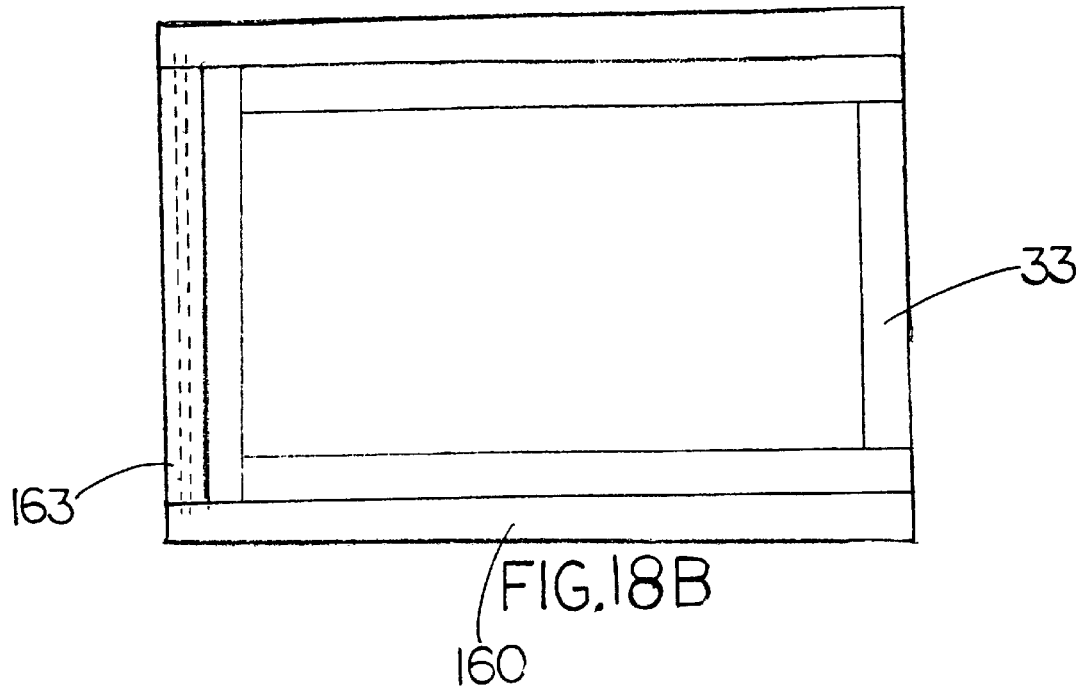
FIGS. 18A, 18B, and 18C are side, top, and end views, respectively of the seal arrangement on the evacuable enclosure of the present invention.
Figure 18A:
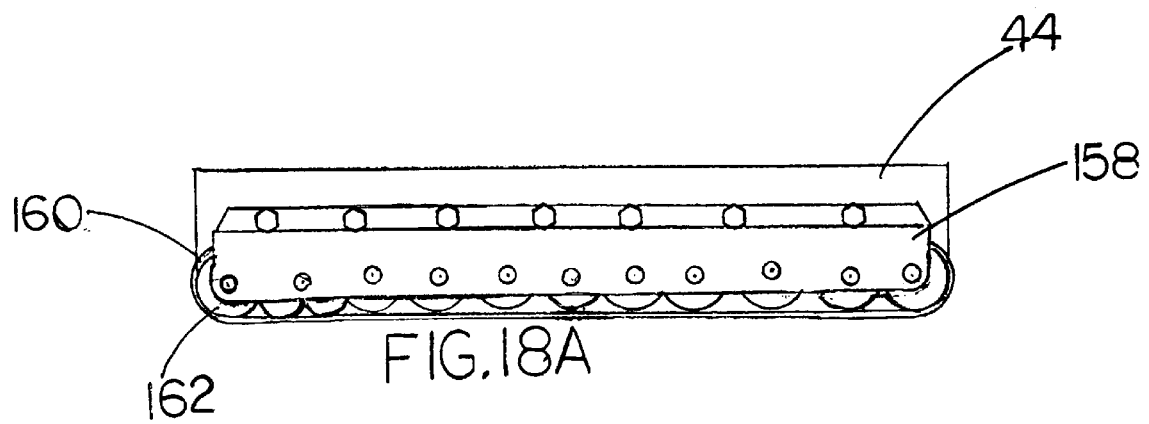

Turning now to FIGS. 18A, B and C, which show the detail and arrangement of another embodiment of the rolling seal assembly and the relationship with the other seals on the evacuable enclosure.

Figure 19:
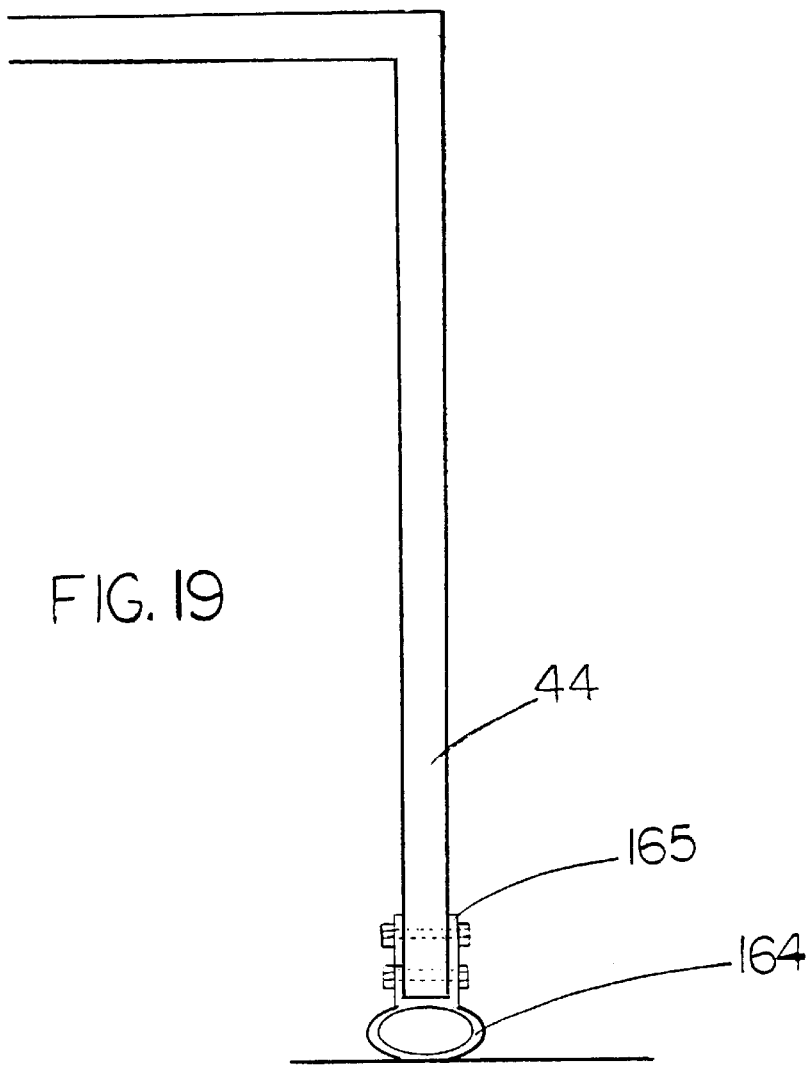
FIG. 19 is an end cross sectional view of the arrangement of a hollow rubber seal on an evacuable enclosure.
Figure 18C:
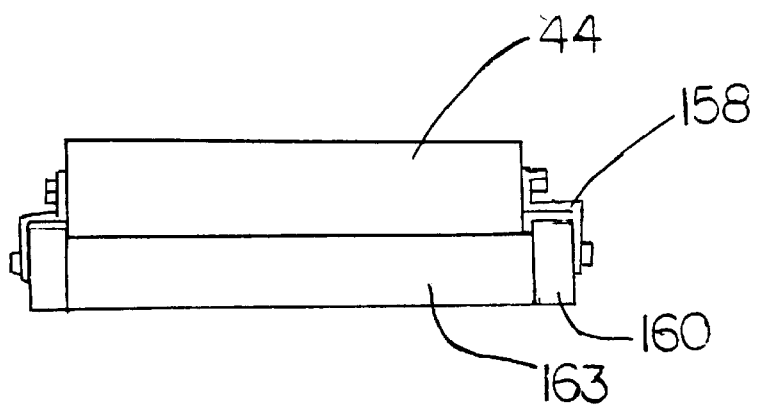

Turning now to FIG. 19, which is a front cross sectional view of a hollow seal arrangement which is well adapted to seal on uneven surfaces, where a hollow rubber seal 164 is attached by a seal flange 165 to an evacuable enclosure, using bolts in the preferred embodiment, but other sealing methods such as clips or adhesives may be used in alternate embodiments. This seal may have several limber holes to communicate with the ambient fluid or alternatively may be connected to a water or air hose by which the seal may be pressurized, if so desired.

Figure 20:
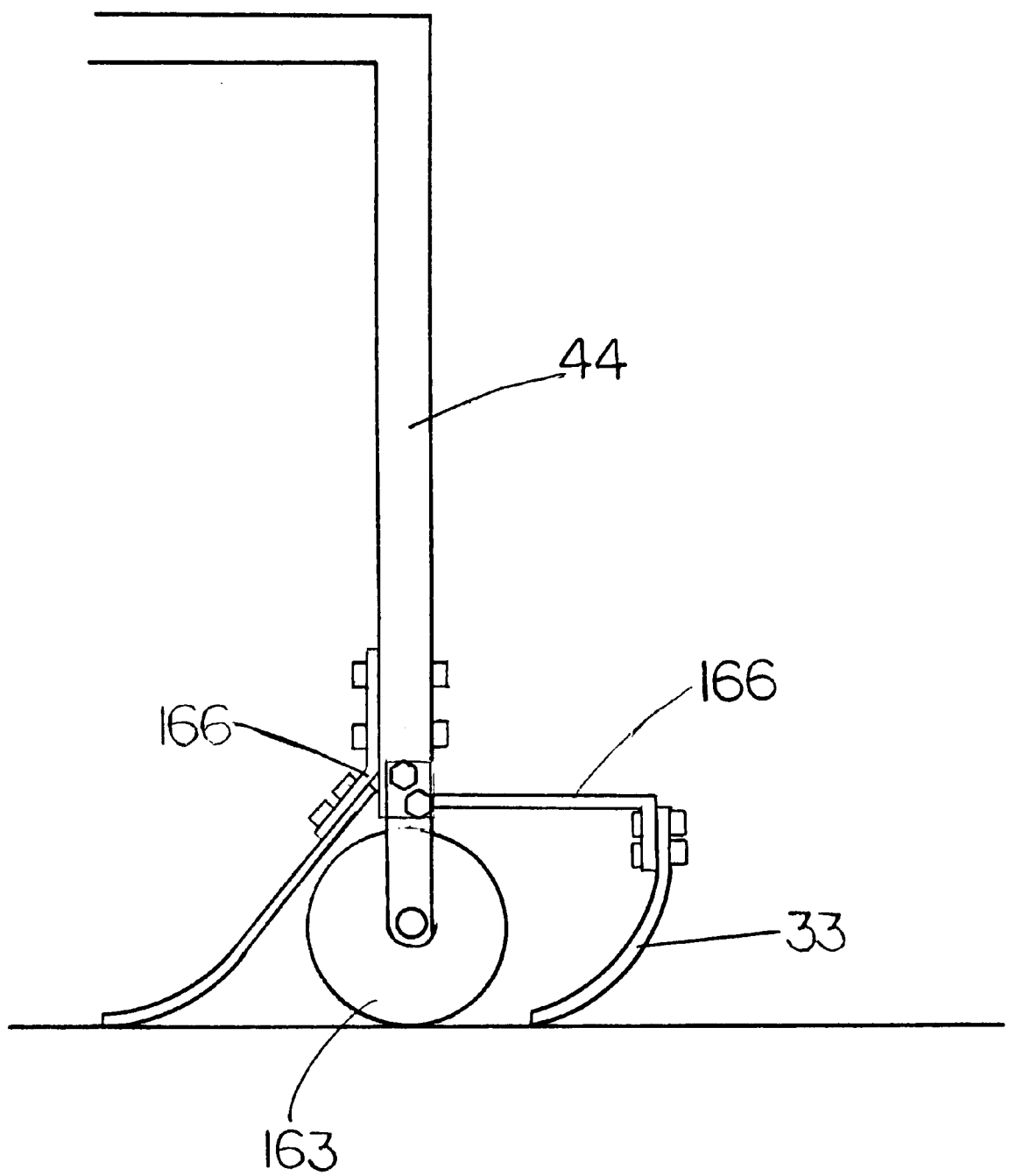
FIG. 20 is a side view of the preferred embodiment of the arrangement of a roller in combination with several flap seals on the front of an evacuable enclosure.

Turning now to FIG. 20, which shows a side cross sectional view of the preferred embodiment of the seal arrangement on an evacuable enclosure where an enclosure roller, which in this embodiment is a hollow fluid filled rubber bag which surrounds and is attached to a central rod internally, and which has several partitions forming chambers along its length which attach to the rod, and which have apertures throughwith the fluid may flow from compartment to compartment. The roller provides a flexible, conforming seal to a substrate which may have changing terrain heights and configurations. This roller also enables easier movement of the enclosure along a surface by reducing rolling resistance of the enclosure on the substrate and preventing the evacuable enclosure from applying undue pressure on the adjacent seals, which are attached by a seal bracket 166, of which there may be a multiplicity. The roller may be free wheeling, as shown, or may have gears attached at the ends which can either be connected to gears incorporated in the rolling seal axles or connected to motorized controller controlled motors to provide rotational force. The fluid filled roller is made from silicone rubber in the preferred embodiment, although natural rubber, rubberized canvas, or other suitable flexible material can be used, and the roller or hollow axle may have a valve on the side connected to a slip ring or swivel connected to a hose which is attached to a remotely adjustable source of pressurized fluid to enable the introduction or withdrawal of fluid for adjustment of the internal pressure in the roller. In alternate embodiments, the roller may be rigid and made from hard rubber or plastic or compliant and made of open cell sponge rubber or other compliant, springy material and covered with a thin coating of latex or other soft rubber to enable better sealing against the substrate, with limber holes at intervals to enable exit and entrance of water as the surfaces of the roller are compressed and expand in turn. If so desired, a remotely controlled position adjustable plastic or other rigid roller may be incorporated adjacent the roller just above or to the side and which may be used to roll and seal against and apply pressure against the surface of the roller to create higher internal pressure in it without incorporating a fluid valving system in the roller to introduce water for increasing or decreasing internal pressure to suit operating conditions, and which is adjustable by means of a linear slide or other similar motion producing means with motorized controller controlled motors which use closed loop position and velocity control, and can be operated by a servo, stepper, or other motorized controller and may also be robotically controlled if so desired, In other embodiments, the flap or other rubber seals shown in the drawing may be deleted, and the fluid filled roller used alone as the sole sealing method.

Figure 21B:
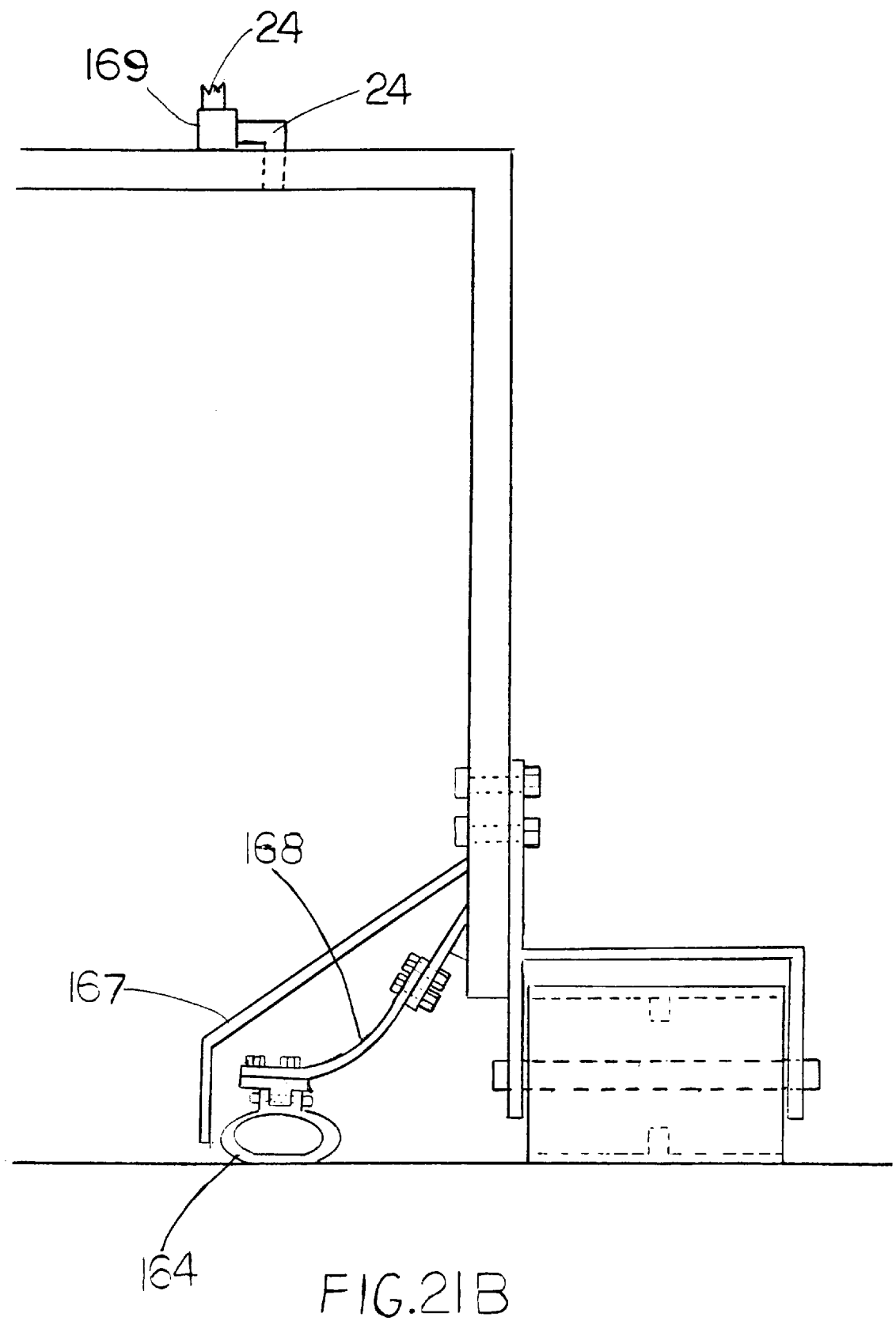
Figure 21C:
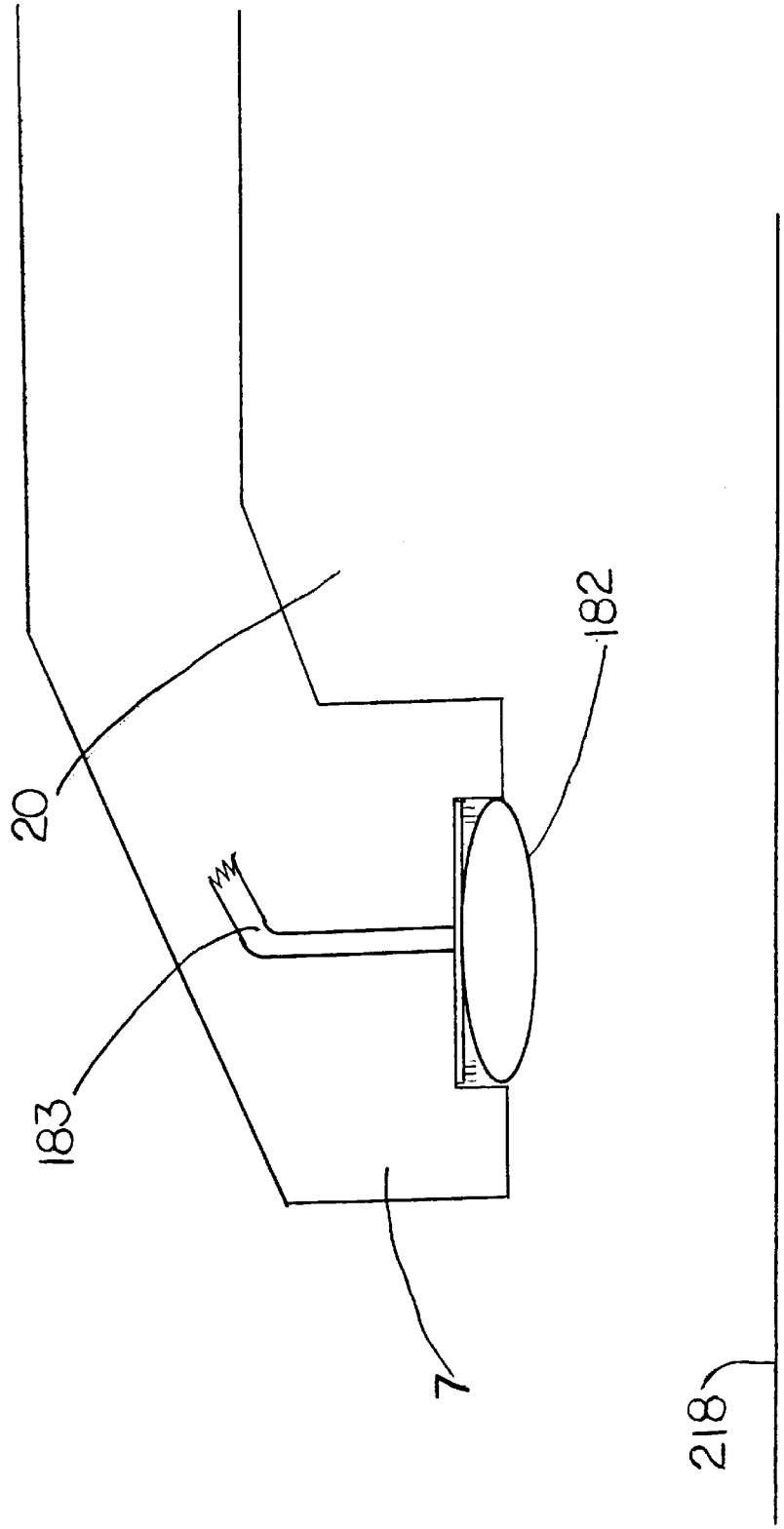

Turning now to FIGS. 21 A,B,C, and D, which are several other possible seal configurations. FIG. 21A is a front cross sectional view of an evacuable enclosure with a combination rolling seal and a hollow rubber seal on the side, where a seal loader, which is a flexible protrusion made from stiff rubber or mylar holds the seal extended, and a seal guard 167 protects the seal from damage. The seal configuration shown may be reversed with the hollow rubber seal on the exterior of the evacuable enclosure instead of the interior as shown. FIG. 21B shows the same seal configuration with the seals pressed against a substrate, and the seal loader and hollow rubber seal being suitably deflected to accommodate the substrate. At the top of the evacuable enclosure is an air flow sensor 169 which is attached to an air duct which supplies air or gas to the interior of the evacuable enclosure. FIGS. 21C and D show a flow limiting seal which is used to increase suction attraction by decreasing the distance from the machine body periphery to the substrate. In 21C an expandable seal 182 is connected to an expandable seal water hose 183, which can be connected to a remotely located pressurized water supply with an in line pressure sensor and a drain valve. This seal assembly is located at the edge of the machine body and is in close proximity to the substrate which in the drawing is a ship hull 218. FIG. 21D shows the seal expanded with a consequent reduction in the distance between the ship hull and the bottom of the expandable seal, which increases the suction inside the suction chamber if the impeller speed remains constant. This type of suction increasing method is superior to movable fences, adjustable guards, etc., because it can repeatedly be subjected to contact with the substrate without damage because it is a flexible structure.

Figure 22A:
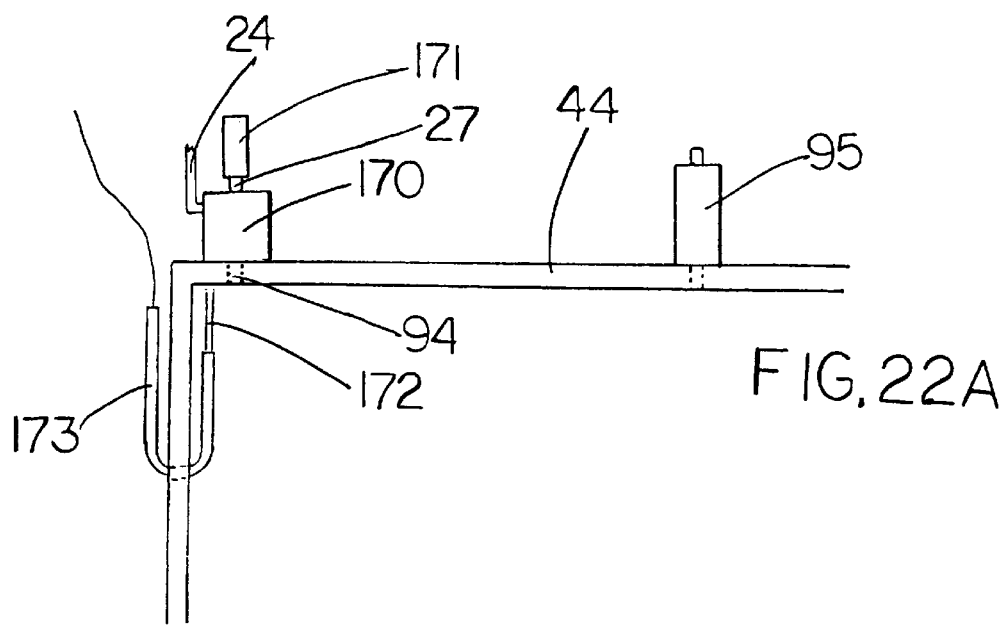
FIGS. 22A and 22B are side and top views, respectively, of the drain and liquid level sensing elements and configuration of the evacuable enclosure.
Figure 22B:
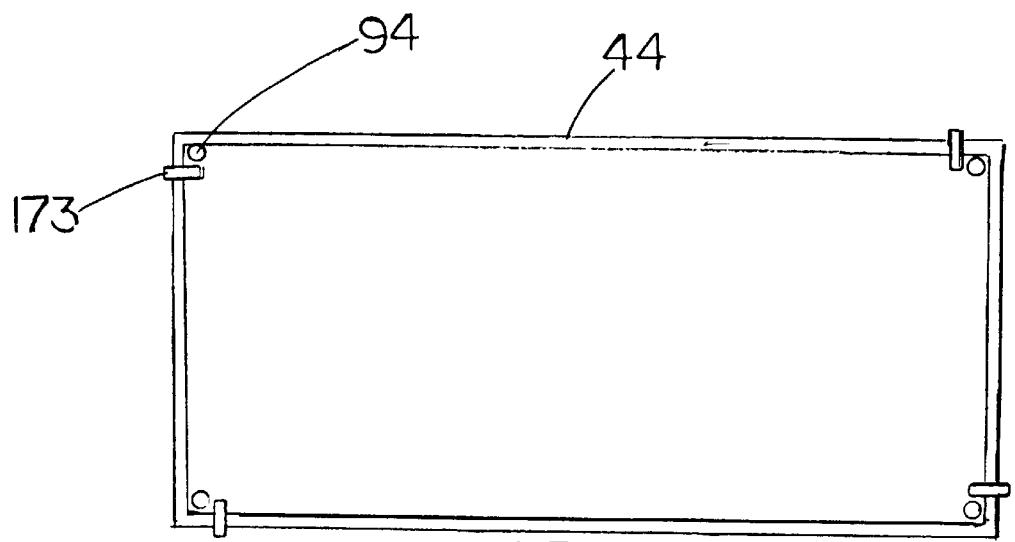

Turning now to FIGS. 22A and 22B, which are side and top views respectively of the drain and liquid level sensing methods of the evacuable enclosure of the present invention, where in FIG. 22A, a miniature centrifugal pump 170 is attached to the backside of the corner of the evacuable enclosure and draws water from the interior of the evacuable enclosure through a drain hole 94 and is connected to a poppet valve 171 by an outlet 27. An air duct 24, which may alternatively be a hydraulic hose with hydraulic fluid, powers the pump. The pump is a centrifugal pump and is designed to run constantly, and will not release or pump air or gas from the interior of the evacuable enclosure, incorporating the poppet valve with an adjustable opening pressure of between ½ and 15 pounds pressure. This design allows the pump to automatically pump out any water which flows into the drain hole without releasing gas. also shown is a pressure differential sensor 95, which is a quartz sensor in the preferred embodiment, which accurately monitors the interior pressure in the evacuable enclosure relative to the ambient pressures with a remotely located real time readout for the machine operator. Also shown is a fiberoptic liquid level sensor 172, which is secured by a fiberoptic cable guide 173. Suitable liquid level sensors for this application are commercially available. In alternate embodiments, other types of liquid level sensing techniques can be used such as photonic, ultrasonic and electromagnetic as well as other fiberoptic methods of sensing levels. FIG. 22B shows the layout from the top of the drain holes and fiberoptic sensors in the evacuable enclosure.

Figure 23:
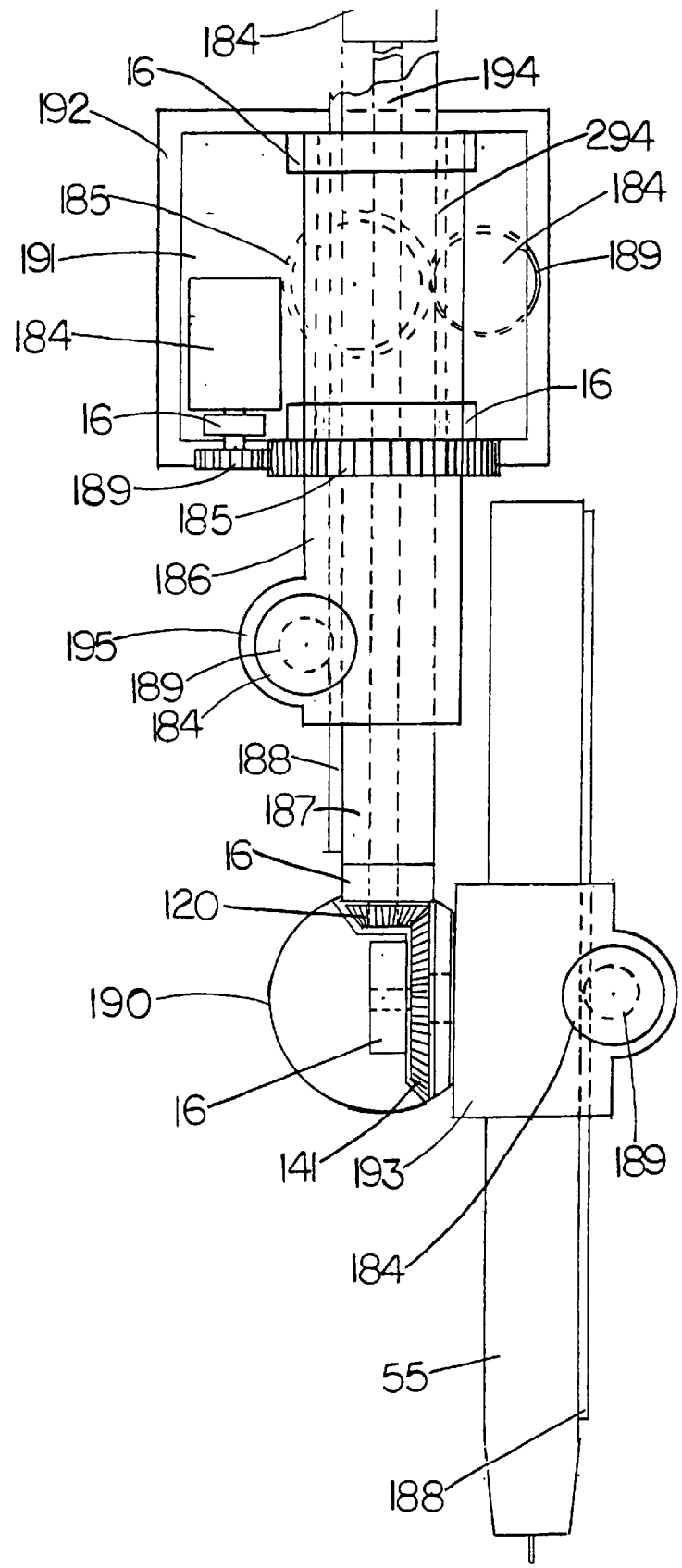
FIG. 23 is a cross sectional side view of a robotic arm used in the preferred embodiment of the present invention, showing the attachment to a robotic welding torch.

Turning now to FIG. 23, which is a cross sectional side view of the preferred embodiment of a robotic arm used with the present invention and which is shown attached to a robotic welding torch as an example task employment, where an arm control rod 194 is enclosed in an arm tube 187 which slides in an arm tube collar 186 and the arm tube terminating in an arm gear case 190 which houses a bevel gear 120, a bearing 16, which in alternate embodiments may be a bushing, and a crown gear 141. When actuated, the crown gear turns a shaft which moves an arm pivot-extend collar 193 which houses a welding torch 55, which has attached an extension track 188 which is a linear gear track the gears of which mesh with a motor drive gear 189 which is attached to a motorized controller controlled motor which moves the welding torch inward and outward thru the arm pivot-extend collar or as shown in FIGS. 24, 26A, and 26B can have a manipulator attached for deployment of the on-board acoustic transceivers or guidance of the on-board sonar transducer array. The incorporated motorized controller controlled motors of the robotic arm use closed loop position and velocity control, and can be operated by a servo, stepper, or other motorized controller and may also be robotically controlled if so desired. A ring gear 185 is affixed to the arm tube collar and encloses a pivot bushing 294 in which the arm tube slides inwardly and outwardly and is turned by a motor drive gear which is powered by a motorized controller controlled motor for pivoting movement of the arm. The inward and outward movements of the arm are controlled by a motorized controller controlled motor and a motor drive gear which are mounted on and penetrating the arm tube collar on an appurtenance called a motorized controller controlled mount 195. The arm tube collar may be either fixedly, as shown or moveably mounted adjacent to the directional control housing, which is capable of rotational movement by the turning of an attached ring gear by a motorized controller controlled motor and gear mounted on a baseplate below. In other embodiments as shown in FIG. 24, where a robotic arm is attached to a sonar transducer array, the arm gear case has attached a directional control housing with an arm tube collar, the ring gear of which being attached to an internal pivot bushing 294, instead of having an arm pivot-extend collar attached, and the directional control housing at the base which is mounted on the baseplate is capable of rotation in a horizontal plane, with the robotic arm being moveably affixed to the side of it with a gear and motorized controller controlled motor enclosed to provide movement in a vertical plane. The electrical potential at each motorized controller controlled motor is integrated into a software program in a remotely located computer which gives a visual readout of the measured position of the robotic arm in real time, in addition to having mounted TV cameras, lighting, sonar transducer arrays, water hoses, measuring tools such as ultrasonic bolt axial force sensors, and grinders and hull cleaning tools such as the "Barnacle Buster", manufactured by Robert C. Collins Co., Inc., Miami, Fla., propeller polishing tools, or welding or cutting torches. This robotic arm of the present invention can also have multiple arm tubes each terminating in an arm gear case as shown in FIG. 24, with an arm tube collar attached, making it a multiple jointed tool for extending into and conforming to the angles and surfaces of enclosed areas with little space for maneuvering. It can also be attached to tools such as hull cleaning brushes and grinders, inspection tools and sensors, and cutting and welding appliances. It can be fitted with force feedback load cells, TV cameras and robotic manipulators and grabbing tools if so desired.

Turning now to FIG. 24, which is a top view of an inspection vehicle embodiment of the present invention and which does not have an evacuable enclosure incorporated. In this embodiment the ROV can serve as a stable platform for many work tasks such as placement and operation of specialized tool packages on underwater oil industry structures and extremely precise underwater cutting and welding operations in any type of surge and current conditions as well as an inspection tool for determination of damage extent and precise location on the structure by attaching itself to the structure being worked on or inspected. The attachment of the forward looking sonar transceiver on the end of a robotic arm enables the use of this tool in confined spaces such as battle damage in military ships evidenced by large holes in the hull, for which it may be deployed into the hole and turned at will to examine the interior for damage without entering the interior or for looking into stem tube access holes, inspecting propeller blade tips, or for inspecting sonar domes for damage in limited underwater visibility conditions. It may also be turned sideways to provide a bathymetric scan of the side of a ship as the ROV transits along the length of the vessel at a distance, registering any deformations of the hull plating in a short time frame. In an alternate embodiment, the Lidar camera arrangement may be mounted in place of the sonar transducer for visual imaging in close quarters, and may be replaced by a conventional TV camera, of which there may be a multiplicity.

The drawing shows a fluorometer sensor-emitter 197, of which there may be a multiplicity is attached to and enclosed by a machine body 7, which has attached an acoustic transceiver 98, of which there may be a multiplicity, and which is attached to a transponder magnetic baseplate 196 which is magnetically and removably affixed to the machine body. Inside of the machine body is found a buoyancy tube 81, of which there may be a multiplicity, and attached to the machine body is a thruster 13, of which there may be a multiplicity also. An acoustic transducer extended tip 202 is attached to the machine body to receive signals from deployed acoustic transceivers. A fluorometer 198 is attached to and receives signals from the attached fluorometer sensor emitters, of which there may be a multiplicity. At the front of the machine body is found a fiberoptic acoustic emissions sensor 200, the electronics of which are enclosed in an electronics enclosure 261. Immediately above it at the top of the machine body is a 3-D laser terrain mapper 199. A sonar attachment bracket 203 secures a sonar transducer array 34 to a robotic arm 56 which is attached to a directional control housing 191 which is mounted on a baseplate 192 which is secured to the machine body. Attached to the front of the sonar transducer array is a lidar camera-forward looking 36, of which there may be a multiplicity, and in the preferred embodiment, which has two as shown in the drawing with a laser emitter 82 placed between two of them. A cathodic protection reference electrode 268 is attached to the machine body and senses the current flowing in submerged impressed current cathodic protection systems. A quartz depth sensor 201 sends signals to a remotely located console for display. An impeller 5, which is mounted in the machine body creates a low pressure area beneath the body of the machine, thereby creating an attachment to a substrate. At the rear of the vehicle is found a hydraulic failsafe valve 564 which is attached to a hydraulic umbilical 568. Suitable failsafe valves which will automatically close in the event of a shipboard fire are commercially available from PGI Intl., Houston, Tex. The hydraulic umbilical supplies pressurized fluid to the impeller in the intrinsically safe embodiment. A rear robotic arm has a TV camera 22 attached, as well as a robotic manipulator 204, which is used to place the acoustic transceivers on the structure being inspected and for any other grasping tasks required. Inside the body of the vehicle is mounted a gyro 99, of which there may be a multiplicity, and a rate, position and heading sensor 100 which are used to navigate the vehicle. A suitable rate, position and heading sensor for use in the preferred embodiment is commercially available from Seatex AS, Redmond, Wash. A suitable fluorometer is commercially available from Ocean Optics Inc., Dunedin, Fla., which uses a filtered, pulsed xenon strobe in combination with a photomultiplier tube with filters in the range of 260–320 nanometers for detection of fluorescence in hydrocarbons in the water stream or on the surface. In addition, a fiberoptic spectrophotometer, which is similar in construction and as also available from the same manufacturer may be substituted for biological or environmental analysis. The waterproof electronics enclosure encloses the photomultiplier tubes, xenon flashes and filters and a computer datalogger and is connected by a fiberoptic link to a remotely located datalogger or computer which is operated by a vehicle operator. The 3-D laser terrain mapper, which is a commercially available photogrammetery or terrain mapping device, is manufactured by several commercial manufacturers, and is an x-y coordinate raster scanning laser system with a gallium aluminum arsenide diode laser emitter, which in other embodiments may also be another type such as a neodmiyum YAG laser, a silicon avalanche photodiode, the system of which uses phase comparisons between emitted and received signals for the z-coordinate range determination and may also use range gating for distance determination. The transmitting and receiving optics and electronics are enclosed in a suitably waterproofed enclosure with waterproof connections for signal transmission wires or fiberoptics and digitized using an on-board analog to digital converter, the output signals of which are transmitted to a remotely located computer terminal for storage and modeling reconstruction and can be downloaded into a CAD program for computer aided drafting. In an alternate embodiment, the video signals from the two lidar cameras-forward looking can be used in combination with the Cybersight 3-D Motion Imaging System, developed by Lawrence Livermore National Laboratory, Livermore, Calif., which is a software program which digitizes and cross correlates image similarities of two convergent images and creates reconstructed three dimensionalized images of the composite, using conventional camera technologies as inputs, and can be combined with a new holographic imaging system called 3-D volumetric display, developed by the RDT&E division of the Naval Command, Control and Ocean Surveillance Center, San Diego, Calif., which is particularly well suited for displays related to this application. In addition, other suitable image display systems such as the system commercially known as Crystal Eyes, or liquid crystal shutter systems for stereoscopic viewing adapted for use with teleoperated vehicles such as ROV's can be used with the present invention to enhance telepresence. In addition, the sensor fusion of the forward looking sonar system and the lidar cameras which may be replaced in alternate embodiments by a single or multiple conventional TV camera is possible using a software program based upon the extinction of the sonar return signal using a noise cancelling function to delete the sonar image from portions of the screen which display a viable lidar image in partially occluded water, deleting sonar images from areas of the viewing screen where two or more adjacent pixels have viable lidar returns. Transiting towards a subject using this integration produces a sonar image of a subject of interest which rapidly is replaced by a lidar generated image as the ROV comes within visual range of the lidar system. Several different embodiments of this combination are possible. In the first, the lidar system may utilize a tunable laser emitter to enhance the transmittance of the light at various depths. In other embodiments the laser emitter may be replaced with an ordinary underwater light, of which there may be a multiplicity, and there may be less than two lidar cameras incorporated in an embodiment if so desired. In other embodiments, the lidar camera and the laser emitter are located remotely from the sonar transducer array. The lidar imaging system used is substantially similar to the system of my U.S. Pat. No. 5,353,054, which hereby incorporated herein by reference. In another alternate embodiment, a system which emits and senses polarized light from a laser, can be used instead of the lidar system shown either attached to the machine main body or appending from a robotic arm.

The acoustic transceivers and the acoustic transducer extended tip are commercially available as a part of the "SNAP" sonic navigation and positioning system, manufactured by Imetrix, Cataumet, Mass., and which accurately correlate the vehicle's position by triangulating the relative position of the deployed acoustic transceivers, using the multiple acoustic transducer extended tips on the machine. The in-water components of the system comprise two or more vehicle acoustic transducer extended tips the signals of which are incorporated into a tether interface with signals from on-board depth and rate sensors. The signals are sent to a remotely located integrated controller for processing via the vehicle's umbilical with a visual display and various readouts at a operator controlled console the result. In the preferred embodiment the SNAP system is integrated with a commercially available computer based information storage and management program developed exclusively for ROV's, named MISSION MANAGER, manufactured by C-MAP Systems, Inc., Park City, Utah, although in alternate embodiments other navigation and positioning systems may be incorporated with other software data management programs to achieve the desired result.

A commercially available sonar transducer array suitable for use in the present invention is the Acoustic Barnacle Imaging System (ABIS), which is manufactured by the Applied Physics Laboratory, University of Washington, Seattle Wash. It has the capability of imaging individual barnacles with azimuthal resolution of 2 CM at 244 CM and will ensonify a 152 CM wide swath 244 CM in front of the array, which is a 36 degree field of view. In an alternate embodiment the top of this array has a position and heading sensor or multiple dual axis inclinometers attached which give accurate indications of the position of the sonar array with respect to the plane of the seafloor. In an alternate embodiment other types of sonar transducer arrays and sonar configurations may be used instead of or in addition to the ABIS for navigation and long distance detection of underwater structures and the sonar system may also be mounted in a fixed position on or adjacent the ROV.

Figure 25A:
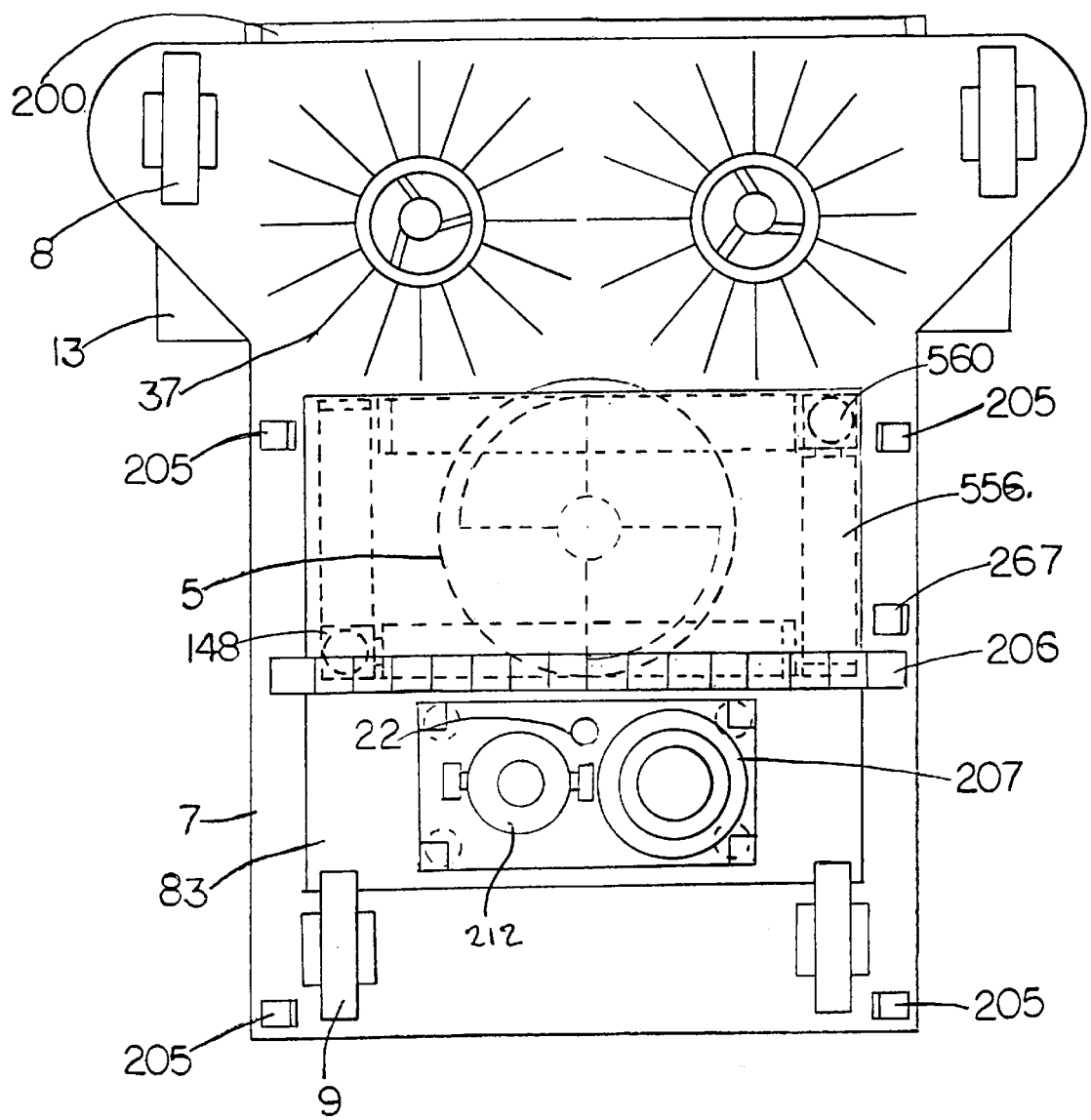
FIG. 25A shows a view from underneath of the inspection vehicle.

FIG. 25A shows a view of the inspection vehicle embodiment from underneath, where a front wheel 8, of which there may be several, is placed to the side and slightly in front of a hull cleaning brush 37 of which there may be a multiplicity. The brushes used in this embodiment are commercially available and, in a preferred embodiment, the two front brushes are counter rotating, with the third brush turning in either direction as is preferred. In alternate embodiments, the hull cleaning brush may be replaced with another form of growth removal method, such as a sonic growth removal mechanism, which produces a supersonic waveform in the water which dislodges marine growth from the hull of a ship. Suitable equipment of this type is comercially available from Pulsed Power Technologies, Inc., Spring Valley, Calif. A rolling acoustic emissions sensor 205, of which there can be a multiplicity, is found just outside the edge of a suction guard 83, which assists in redirecting the suction and water flow towards the hull cleaning brushes, assisting in keeping the roller free of debris from the cleaning operation. Also shown is an eddy current NDT array 206. Located between the body of the vehicle and the suction guard at the edge is a submersible generator 560, which is mounted on an angle drive 148 which is attached to an impeller blade 556, of which there may be a multiplicity by a rotor, which is shown elsewhere in this specification and which spins in response to water flowing past it being drawn through the impeller. In the drawing, several of these arrangements are shown with each of the angle drives having two output shafts with rotors and impeller blades attached on two sides of the impeller aperture, although the angle drive may have only one output shaft and rotor if so desired, and the submersible generator may also be located adjacent the base of the skirt of the machine, thereby responding to an ambient flow under the skirt by rotation.

An improved liquid-gas interface sensor 207 has a TV camera 22 mounted on its surface. The improved sensor, which is immune to ambient electromagnetic noise and temperature variations and which is highly sensitive to the sonic returns in the wavelengths required utilizes a sonic emitter or transmitter 212 and a detector 207. In a preferred embodiment, a detector as disclosed in U.S. Pat. No. 5,339,289 to Erickson, hereby incorporated herein by reference, is utilized as the detector for this application. An additional sonic sensor located on the opposite side of the sonic transmitter has been found to increase the accuracy of the sensor when in the proximity of the liquid/gas interface. In alternate embodiments, the remote acoustic emissions sensor 200 shown in FIGS. 24, 25A, 25C, 26A, 26B, 32 and 33 can be replaced with multiple sonic sensors of this design on the present invention. In alternate embodiments, the laser emitter for this detector may be remotely located and its light emissions transmitted to the proximity of the detector mirror by means of a fiberoptic cable. In still other alternate embodiments the detector and elements thereof may assume other forms and embodiments.

A rolling ultrasonic coating thickness sensor 267 is also found on the periphery of the suction guard. In an alternate embodiment, the rolling sensor may be replaced by a non-rolling type ultrasonic thickness sensor commonly known in the art. A suitable sensor for this application is available from Matec Instruments, Hopkinton, Mass. In alternate embodiments, the sensors which are mounted on the suction guard may be mounted on its periphery, and if so desired, the sensors which are mounted peripheral to this structure may be instead mounted on it. In the drawing, the rolling acoustic emissions sensors are also located adjacent the rearmost portions of a back wheel 9, of which there may be a multiplicity and may be located elsewhere on the machine as is preferred. For example, the ultrasonic coating thickness sensor or the acoustic emissions sensor may be mounted on the wheel itself with a slip ring connection to signal transmission means, or may be mounted on a bracket appending from the propulsion gear casing of the wheel.

Figure 25B:
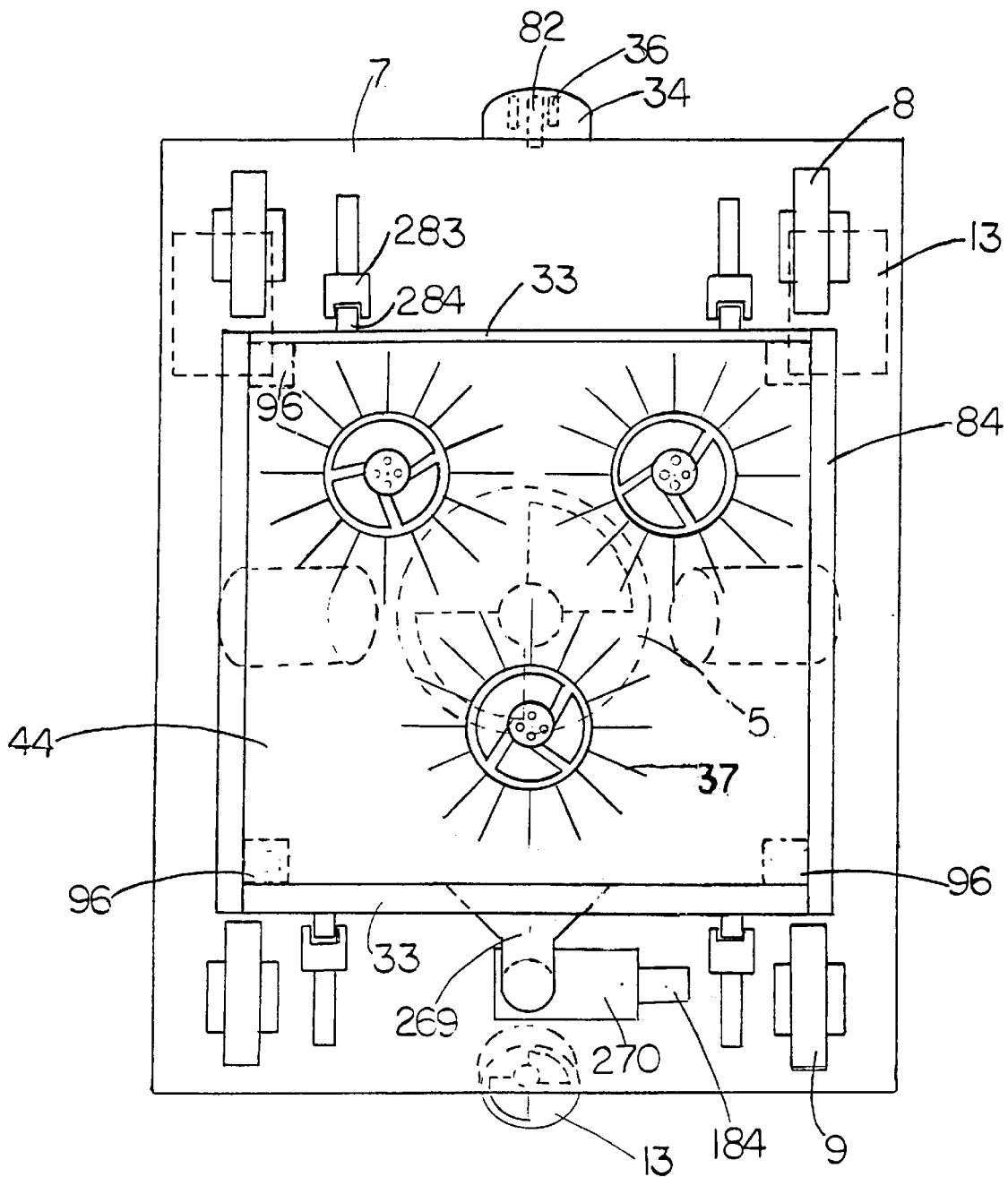
FIG. 25B shows a view from underneath of another embodiment of the inspection vehicle incorporating an evacuable enclosure and additional hull cleaning brushes.

Turning now to FIG. 25B, which is a view from the underside of an alternate embodiment which is well adapted to the underwater hull cleaning task which scavenges and filters the waste discharge, in which the machine body has attached to the underside an evacuable enclosure 44 of which there may be a multiplicity and which has a side seal 84 of which there also may be a multiplicity, and which can be a rolling seal similar to that shown in FIG. 16. Across the front and back of the evacuable enclosure is a rubber seal 33 of which there may also be a multiplicity, and in alternate embodiments may be replaced by a roller similar to that shown in FIG. 20 or other seal configuration. At each corner of the evacuable enclosure is found a load cell 96 to which is attached a spring pressure activating ram 52 which appends from the machine body or a suction guard and is connected to a coil spring 53 on the evacuable enclosure. The evacuable enclosure has appending from its periphery an alignment tab 284 which is held in place by an alignment bracket 283, of which there may be a multiplicity to moveably secure the evacuable enclosure as it is held against a structure by the spring pressure activating rams. Raw water for the hull cleaning operation is fed to the evacuable enclosure by means of a raw water intake duct 269, which has a gate valve 270 attached to control the water flow, which is operated by a motorized controller controlled motor 184, which uses closed loop position and velocity control, and can be operated by a servo, stepper, or other motorized controller and may also be robotically controlled if so desired.

Figure 25C:
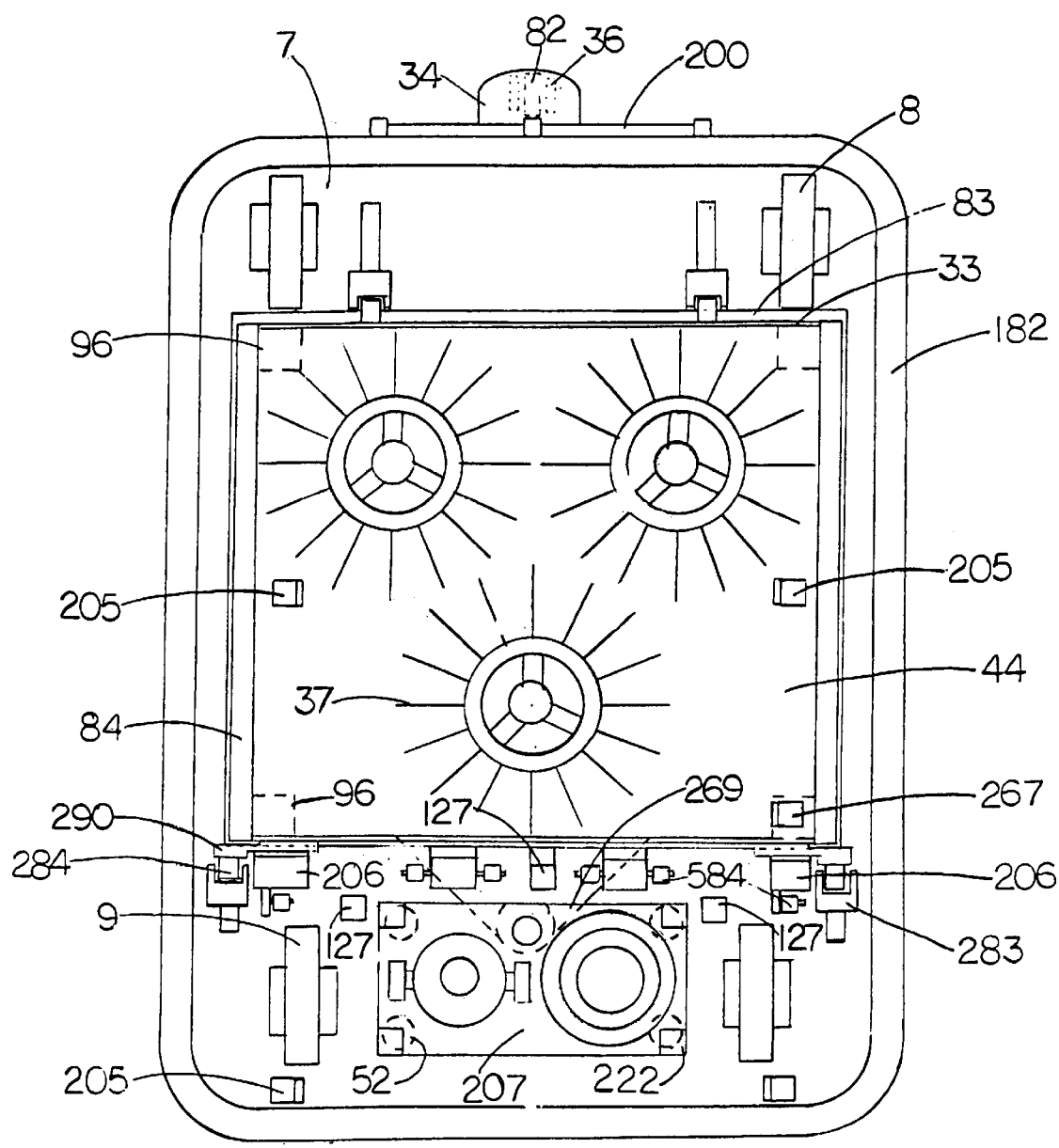
FIG. 25C shows a view from underneath of the preferred embodiment of the present invention.

Turning now to FIG. 25C which shows a view from underneath of the preferred embodiment of the present invention, which Is a hull cleaning machine with inspection tools and sensors attached, where an offset bracket 290 appends from the rear and to the side of the evacuable enclosure on each rear corner and is attached to the alignment tabs, an expandable seal 182 is located at the periphery of the machine body to allow adjustment of the gap between the machine body and the structure which the machine is traveling on, a spring pressure activating ram 52 is attached to the interior of the machine body and at each corner of the liquid gas interface sensor, and a replaceable tip 222, of which there may be a multiplicity is connected to the structure facing surfaces of the liquid gas interface sensor to act as an adjustable standoff. In each corner of the evacuable enclosure is found a load cell 96, which has attached at the back a spring pressure activating ram 52 which is affixed to the suction guard. In an alternate embodiment, the evacuable enclosure is eliminated and the expandable seal is used to reduce the water flow at the same time increasing suction attraction to the substrate. Immediately behind the evacuable enclosure and attached to it by a bracket is an eddy current NDT array 206, which is composed of several individual sensors spaced uniformly apart and each has attached a spacer wheel 584, which is a rolling wheel attached to an axle extending from a bracket on the sensor, of which there can be multiplicity and which may be made from either plastic, metal or other strong material, which may be attached either at the sides, front or back of the sensor and is used to provide a constant stand-off distance from the substrate for the sensor, and may be interchangeable in diameter to allow several sensitivities of the sensor, which is distance sensitive from the substrate in resolution. In alternate embodiments, this wheel assembly can be replaced by a sliding rigid bar, slide or other type of rigid or flexible stand off device, or the sensor may rest directly on the substrate with no stand off device incorporated or may be rigidly attached to the machine or enclosure. Suitable commercially available sensors for this eddy current metal thickness and flaw detection and sensing application are available from Honeywell Magnetic Products, Plymouth, Minn., and several sensors, with either digital or analog outputs are available. If a digital unit is used, in one embodiment it can be connected to a remotely located or on board computer with an analysis, storage and display software program for signal processing and display of the output signal. If an analog signal unit is selected the output signal can be input to a programmable logic controller where the signal is digitized and passed to a remotely located data logger for a readout, and in both cases the signal is nulled, with any anomalies or signal irregularities being recorded, thereby recording any divergence from a constant signal generated by a sensed magnetic field induced in the substrate metal by a proximally located electromagnet 127, of which there may be a multiplicity, and which may be either attached to the back of the evacuable enclosure as shown by the center electromagent or may be rigidly attached to the body of the vehicle as shown by the magnets located near the sides of the evacuable enclosure. The sensor requires a 6–15 VDC input and requires a stepdown or other transformer on the vehicle for this, and the semiconductor processor portion of the sensor is enclosed in a suitably waterproofed enclosure on the vehicle in the preferred embodiment, although in alternate embodiments may be remotely located with suitable signal transmission circuitry and amplifiers incorporated in the system. In the preferred embodiment the sensor, of which there can be a multiplicity in an array, is sprung with a coil spring and is slidingly attached to the back of the evacuable enclosure on a linear slide or other means so that it is extended by the spring until the spacer wheel contacts the work surface and measurements may be taken whenever the enclosure is lowered to the substrate, and with the evacuable enclosure may be raised to facilitate rapid transits over the work surface if desired. Typically these sensors are 15 CM apart and spaced 2½ to 5 CM from the substrate by the stand off wheels, although any distance can be used for either of these measurements in alternate embodiments, and as shown in FIG. 25A may be more closely spaced to permit a closer stand off distance which increases resolution of the measurements. Although not shown in FIG. 25A, proximal electromagnets may be either located near the array or incorporated into it to provide the requisite magnetic induction in the substrate metal. In alternate embodiments the eddy current NDT array is separately affixed to the machine body remotely from the evacuable enclosure and may be either fixed or movable using rams or other devices. In alternate embodiments, other non-destructive testing sensors such as shear wave ultrasonic sensors may be used, or other types of eddy current NDT arrays may be substituted. In an alternate embodiment, another commercially available product can be substituted, named "Lizard Matscan" electro magnetic array scanning crack detection system, and available from Milistrong, Ltd., Portsmouth, Hampshire, England, and which can be adapted to the analog to digital conversion process for an array configuration.

Figure 25D:
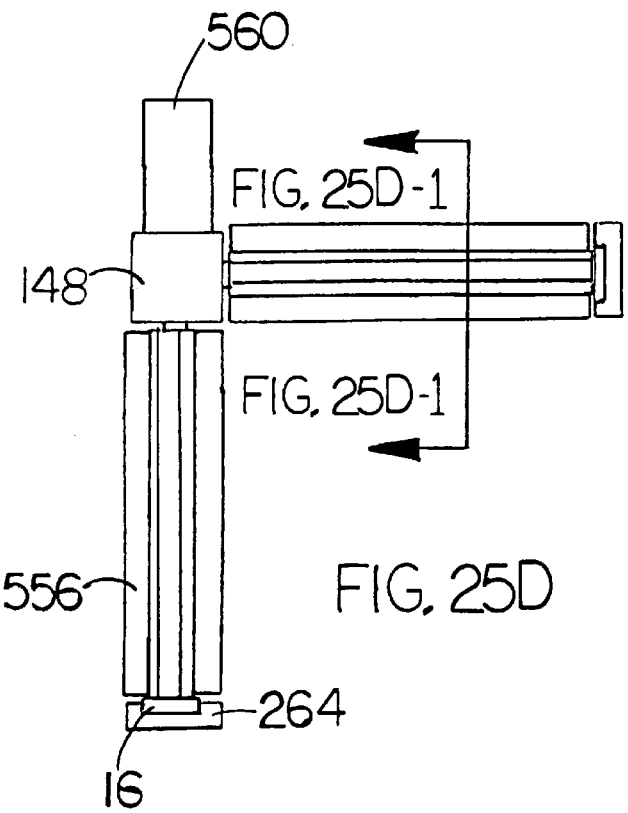
FIG. 25D is a plan view of the submersible generator system employed in the present invention, with FIG. 25D-1 showing a cross sectional view of the impeller vane arrangement.
Figures 1, 25D:
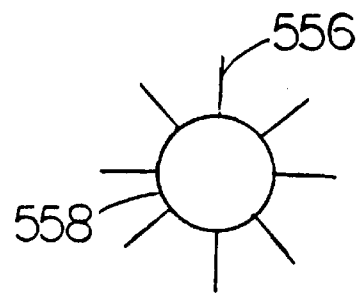

Turning now to FIG. 25D, which is a plan view of the submersible generator system employed in the present invention, which is an intrinsically safe system for explosive sites, such as that encountered in oil spills and inside cargo and ballast tanks on liquid petroleum cargo ships, where a submersible generator is connected to an angle drive which may be either a multiple output shaft type as shown, or may be a single shaft with a rotor 558 attached to the shaft, and a bearing secreted in a bracket 264 attached at its distal end. Section AA shows the rotor with a multiplicity of impeller blades attached, which spin in response to water movement past the rotor and blades. Unlike prior art submersible generators that are powered exclusively by flow of fluid through hoses from a fluid power generating source such as a motor driven hydraulic pump, and stationary paddle wheel power generators which are driven by the natural flow of bodies of water, the submersible generator of the present invention moves with the vehicle and does not require pressurized fluid suppply hoses since it is powered by the fast moving flow of water through the suction chamber.

Figure 25E:
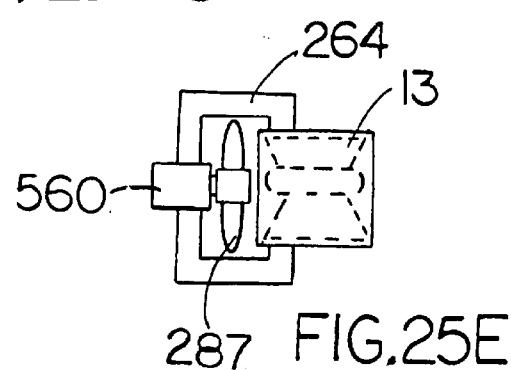
FIG. 25E shows a side view of a thruster with the submersible generator of the present invention connected to an attached bracket in an alternate embodiment.

Turning now to FIG. 25E, which shows a side view of a thruster with the submersible generator of the present invention connected to an attached bracket in an alternate embodiment, where a thruster 13 has attached a bracket 264 to which a submersible generator 560 is attached, which has connected to the output shaft a propeller blade 287, of which there can be a multiplicity, and which is directly in the path of a flow of unrestricted water adjacent the thruster. The propeller used on the submersible generator may also be a ring thruster if so desired.

Turning now to FIG. 26A which shows a side cross sectional view of the inspection vehicle of FIG. 24 and FIG. 25A, where a robotic arm has appending from it a sonar transducer array 34 with a lidar camera-forward looking and a laser emitter, the entire assembly or various components of which can also be used on the preferred embodiment of the present invention shown in FIGS. 25C and 26B. A bolt tightness monitor 275 is attached to the rear robotic arm and is used for verifying the tightness of underwater robotic and diver made bolt-up connections. A suitable commercially available device for this application is the DT500B Automatic Ultrasonic Measurement of Bolt Axial Force, available from Hitachi Construction Machinery, Ltd., Tokyo, Japan. The signals from the sensor of this device are digitized by an analog to digital converter located in the electronics enclosure 261 and sent via an attached umbilical with signal transmission wires to a remotely located computer with a digital to analog converter which converts the signal before passing it to the display and processing portions of the system. Near the front of the machine is a hull cleaning brush which is retractable and has an impeller attached on the back to assist in scavenging the debris from the hull cleaning operation, and which is partially enclosed by an impeller fence 208. This assembly is attached to a motor 69 of which there may be a multiplicity which has a hull cleaning motor guide 209 of which there may be a multiplicity attached. These guides slide in a slot in a slotted guide 211 of which there may be a multiplicity and is held in place by a motor guide bracket 210 of which there may also be a multiplicity. The hull cleaning brush assembly is forced down to the work surface by a ram 40 and held there as long as the operation continues. In an alternate embodiment, the machine body has a multiplicity of impellers mounted in it's interior, which creates suction for the machine by creating a low pressure area underneath the entire machine body. In another alternate embodiment, a single or multiple impellers can be mounted externally on the machine body and create a low pressure area underneath its own periphery by being mounted in close proximity to the substrate, and thereby transferring the suction to the machine body by its attachment to it, supplanting the impeller used inside the machine body. A submersible generator 560 is attached to an angle drive 148 which is connected to a impeller blade 556, of which there can be a multiplicity, and which is attached to a rotor 558, the assembly of which is located adjacent the fluid entrance between the impeller and the suction guard under the machine body and spins in response to unrestricted fluid movement passing over its surface, thereby generating electricity in an ambient flow without walls or other guidance structures such as hoses to direct the flow of water. In this intrinsically safe embodiment, the primary power source is a remotely located hydraulic power system, which provides a flow of pressurized hydraulic fluid through hoses which power the impeller of the vehicle. In alternate embodiments where the vehicle is not required to be intrinsically safe, the impeller may be powered by AC electricity or pneumatics. In alternate embodiments, a supply of electrical power to power various sensors on the vehicle may be delivered in an intrinsically safe manner by fiberoptic cables transmitting light pulses from a remotely located source which are converted to electrical signals at the vehicle by a detector. Suitable systems of this type are commercially available from NT International, Minneapolis, Minn.

Turning now to FIG. 26B, which is a side cross sectional view of the preferred embodiment of the present invention, where a hull cleaning effluent discharge hose 273 is connected to a discharge neck 272, which is connected to a peripheral vane pump 554, and has a flow meter 271 in line to monitor the effluent flow rate. This assembly is connected to the top of a discharge chamber 274, which is connected thru the brush impellers to the evacuable enclosure. Inside the evacuable enclosure between the brushes is located a TV camera and a separate light 174 for illumination, although this is optional, as many underwater TV cameras are available with onboard lighting which supersedes the need for a separate lighting source. In this disclosure whenever a TV camera is shown without a companion lighting source it is assumed that it is integral with the camera, although separate lighting may be provided if so desired. Behind the evacuable enclosure is found a sonic transmitter 212. At the rear of the machine is found a telescoping neck 291, in which a sliding tubular section of the raw water intake duct slides inside this attachment to the evacuable enclosure when raising or lowering the hull cleaning assembly. It can have seals around its periphery to assist in watertight integrity while the hull cleaning operation is progressing. A load cell 96 is found at the base of each of the coil springs on the evacuable enclosure to measure applied loads as the machine progresses in the cleaning operation. In the preferred embodiment, the spring pressure activating rams which apply pressure to the coil springs are double acting rams, having both extension and retraction movements controllable from a remotely located operators console. This feature enables higher speed transiting along the hull of a ship or oil industry structure with the evacuable enclosure retracted when desired. In addition, the rams each have an adjustable bypass valve connected which limits the allowable overpressure inside the ram in response to forces from an uneven substrate pressing upwards on the evacuable enclosure, causing the ram to retract as the air or fluid is vented until the overpressure is relieved, thereby allowing the machine to progress without losing traction or jamming the evacuable enclosure against the work surface. Depressions in the work surface are reacted to differently by the rams. On the intake side of the ram, the input pressure is controlled by a remotely controlled, adjustable pressure regulator and remains constant as the rams automatically extend in response to a drop in reaction force pushing upwards by the evacuable enclosure as it follows the contours of a depression in the substrate, thereby maintaining constant pressure on the evacuable enclosure.

The evacuable enclosure may be used as either a movable or stationary air or gas filled chamber in alternate embodiments by the simple plumbing of an air source into the interior and incorporation of a quartz pressure differential sensor and flow control valve. In these embodiments the hull cleaning task can be replaced by underwater welding, thermal spraying, or painting tasks, or for visual inspections in zero visibility conditions. The rolling seal shown in FIG. 16 is specifically well adapted to the sealing application required for moving the ROV as the task continues forward on a surface. In addition, the evacuable enclosure may be used as a suction chamber for evacuating large amounts of sediment or overburden from an underwater site when connected to a pump or other suction producing methods. These are important attributes and can facilitate greatly increased quality to the above mentioned tasks when completed in underwater conditions.

The effluent discharge hose can be either a 10 cm. diameter hose for light marine growth such as marine grass and algae or a 15 cm. diameter hose for heavy shell and barnacle growth removal. The hose may be longer than 300 ft. in length and is connected to a remotely located hydraulic submersible pumping system which pumps the effluent to a filtration system at varying rates, depending on the type and density of the marine growth. At the pump intake may be a pressure sensor leading to a gauge which indicates gage pressure inside the hose at this location. The relative pressure drop resulting from increasing the submersible pump speed can thus be monitored which will assist in matching the pump speed to the effluent discharge rate from the hull cleaning machine. The pump may be suspended by floats at the surface of the water and is connected by hydraulic hoses to a hydraulic power unit. Suitable commercially available pumping systems for this application are manufactured by John E. McCausland, Inc., Jacksonville, Fla. The discharge hose from the submersible pump is connected to a filtration system which removes the solids from the effluent stream prior to discharging the clear, filtered water into a storm drain or other suitable disposal method for uncontaminated water. A suitable commercially available internally fed rotary screen filter, of which a multiplicity can be used, is available from The Schlueter Company, Janesville, Wis., which removes solids as small as 255 microns in size. In alternate embodiments, other forms of filtration may be used, such as ionic, centrifugal, or other methods as are common in the art. In addition, assists such as air lifts, eductors and hull cleaning machine mounted water pumps may be incorporated into the present invention to assist or replace the water movement method used.

Turning now to FIG. 26C, which is a side view of an alternate embodiment of the present invention, showing an evacuable enclosure which is held in a raised position by an evacuable enclosure wheel 310, of which there may be a multiplicity on the sides or ends of the evacuable enclosure, and which act to maintain the evacuable enclosure in a constant, measured position relative to the substrate on which the machine is traveling. In this embodiment, the periphery of the evacuable enclosure may have affixed an expandable seal to regulate the volume of water passing under the seal into the evacuable enclosure. The wheels may either be free wheeling or may be powered as desired. Two separate mounting locations are shown for the submersible generating system, at the immediate interior of the lower skirt of the vehicle and on top of the suction guard. At the top of the vehicle is an exhaust deflector 586 which is a retractable, collapsable, flexible fabric hose which is reinforced with wire or other structurally rigid material such as plastic, and attached to a linear slide by a hinge 585, allowing it to be extended along the surface of the top of the vehicle and operable by a remotely controllable ram. This appurtenance retracts into a receptacle in the vehicle body when not in use by operation of the linear slide and ram, of which there may be a multiplicity, and is used to redirect the exhaust flow from the machine rearwardly and thereby assists in the forward propulsion of the vehicle through a volume of water when operating in high currents, surge, or when towing a long length of umbilical or other loads, and may be retracted when the vehicle reaches its destination and attaches itself to a ship hull or other structure. In alternate embodiments this structure can be a fixed or retractable rigid guide which can be retracted into the vehicle body or externally out of the impeller exhaust stream and extended into operating position by rams, slides, or other mechanical means to direct the flow, or the impeller itself may be able to be pointed in a rearward facing direction by incorporation of gimbals, rams, or other mechanical devices to angle the impeller to direct the exhaust flow in a given direction. In another embodiment a slide, gate valve or other closure device is positioned at the top of the impeller on the machine body in combination with tunnels or other rearward facing flow devices in or on the machine body to deflect the flow in a rearward direction to facilitate increased thrust, and the tunnels may have venturis, other types of narrow or restrictive orfices or coanda slots incorporated to enhance the thrust effect.

Figure 26D:
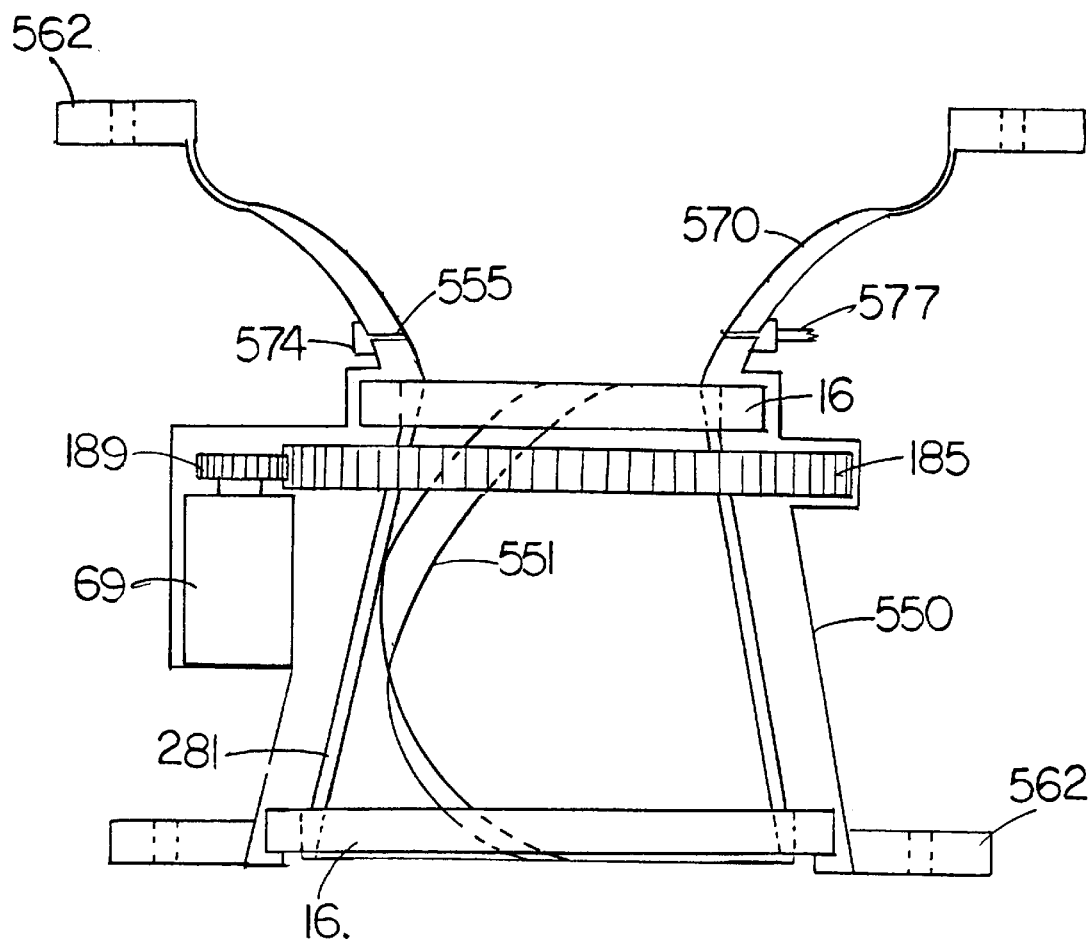
FIG. 26D is a side cross section view of a peripheral pump with coanda slots and with interior peripheral vanes spiraling through its interior and the arrangement of the motor and gear used for driving the pump.

Turning now to FIG. 26D, which is a side cross section view of a peripheral vane pump with coanda slots and with interior peripheral vanes spiraling through its interior and the arrangement of the motor and gear used for driving the pump. The motor in the preferred embodiment is a hydraulic motor, although electric or pneumatic motors may be used instead, as well as mechanical levers, and rotating shafts or other mechanical devices can be used to turn the pump. Starting at the top of the drawing, a flange 562 appends from an entrance body 570 which has a blowing slot 555 penetrating it and encircling it, and is enclosed by a receiver ring 574 which is rigidly affixed to the pump and has attached a supply hose 577 which is connected to a remotely located source of pressurized water or air. A bearing 16 sits in a seat in a pump body 550 and encloses an impeller casing 281 which encloses and is attached rigidly to a multiplicity of a vane 551, which is a metal, flat strip, one edge of which extends inwardly toward the center of the impeller casing, while the distal edge is rigidly affixed to the interior of the impeller casing wall, and the vane is spiral wound within the impeller casing as it advances from the entrance to the discharge opening of the pump. The individual pump impellers may be configured to spiral with either more or less turns inside the pump than is shown in the drawing. In alternate embodiments, the edge of the vane may be angled either toward or away from the direction of rotation within the interior of the impeller casing to bias it towards or away from the rotation and influence the pump's output characteristics. In the preferred embodiment, the pump has eight vanes incorporated, although in other embodiments more or less vanes may be incorporated and the vanes may extend into the center of the aperture in the impeller casing either farther or less far than shown in the drawings. The pump may be made to rotate either in the clockwise or counter-clockwise direction and may be used to pump water or air in the reverse direction through the pump from the discharge side to the intake side if so desired. A ring gear 185 is attached to the impeller casing and engages with a motor drive gear 189 which is attached to a motor 69 which is secured and fastened to the pump body and which supplies rotative force to rotate the gear and impeller casing. The ring gear used in the this configuration may be replaced with other types of gears or other motion producing devices as are known in the art.

Figure 26E:
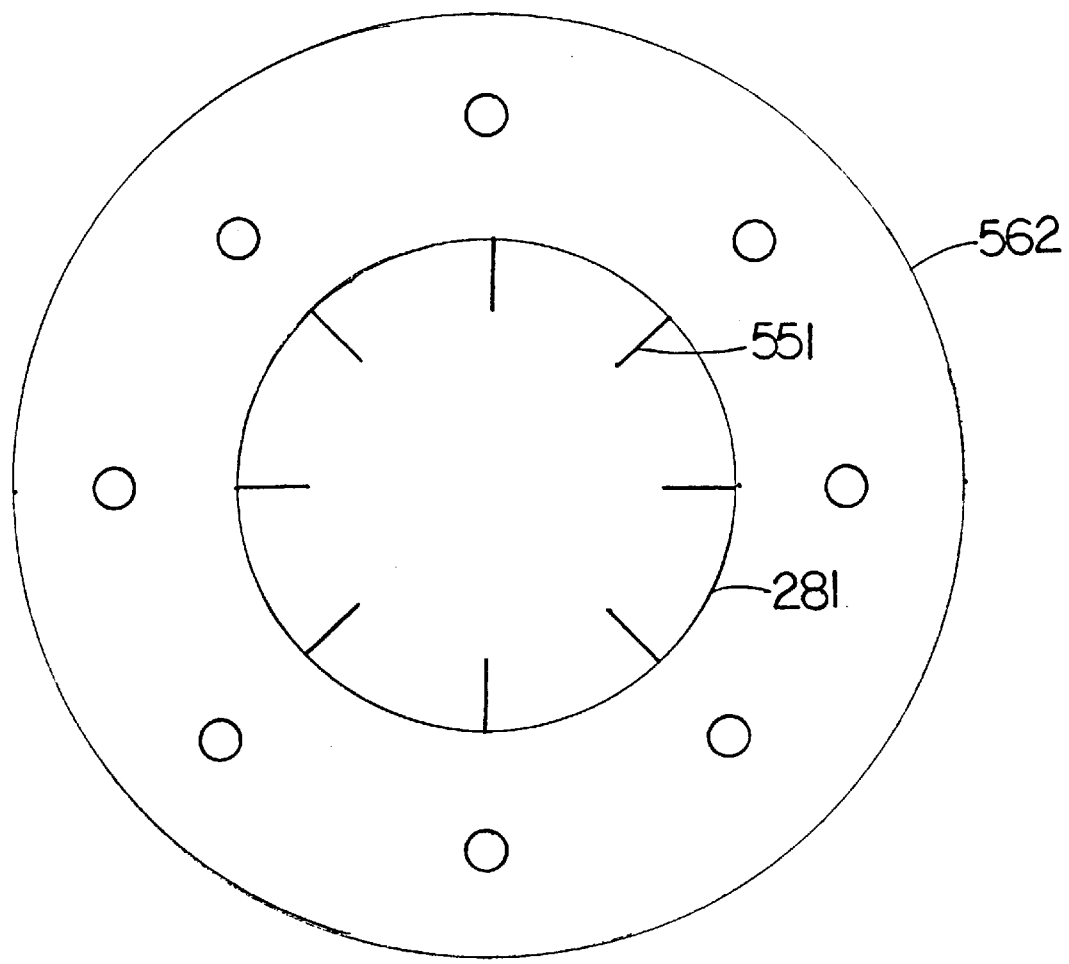
FIG. 26E is an end view of the pump shown in FIG. 26D, showing the vane spacing and arrangement and gear configuration.

Turning now to FIG. 26E, which is an end view of the opening of the discharge side of the pump shown in FIG. 26D, showing the vane spacing and arrangement and flange configuration. The pump and vane design permits the pumping of slurrys with high solids content by creating a spinning collumn of water which isolates the solids in the center of the collumn, and at the same time introduces either a coanda flow of water for fluid lubrication or air for gas lubrication for the mixture as it advances through the pump. The blade contours and coanda slots are illustrated schematically, and not shown in detail, since various blade and coanda slot details are well know in the art of pump design for increasing pump throughput and increasing thrust.

Figure 26F:
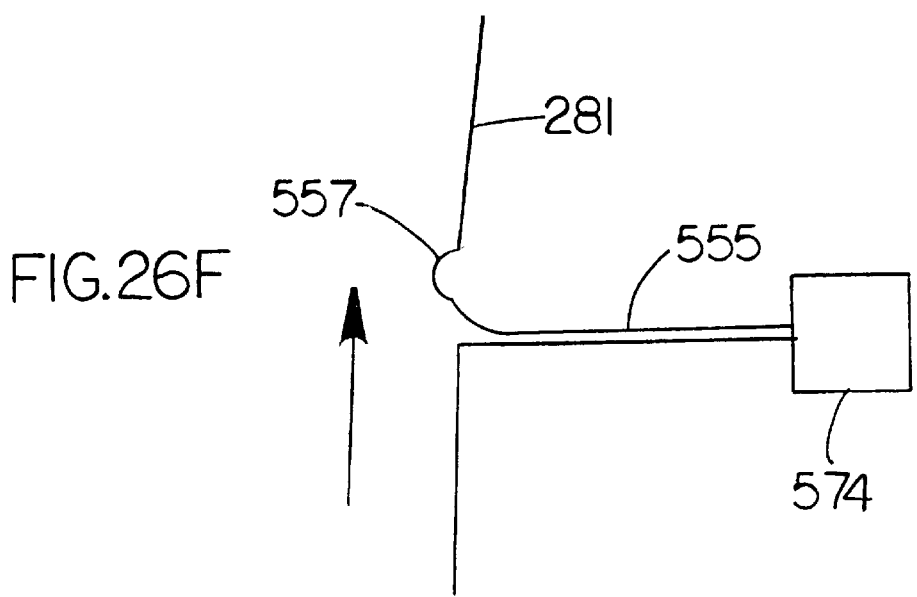
FIG. 26F is a side cutaway view of an interior wall of an impeller casing, showing an alternate embodiment of a coanda bulb, detailing the coanda blowing slot and coanda bulb shapes.

Turning now to FIG. 26F, which is a side cutaway view of an interior wall of a pump with a coanda blowing slot, showing an alternate bulb design where a coanda bulb 557 is evidenced as a projection from the wall of the impeller casing, and which directs a flow of fluid around its periphery in the direction of flow.

Turning now to FIG. 26G, which is a plan view of three discharge chambers for hull cleaning brushes each connected to a peripheral vane pump as shown above as used in a hull cleaning operation, where a discharge chamber 274, which communicates with and directs the fluid flow from a hull cleaning brush 37 is connected to a peripheral vane pump 554 which pumps a slurry into a discharge duct 559 of which a multiplicity converge and which has at the neck a supply hose 577 which is connected to a receiver ring 574 which is connected to a coanda blowing slot which penetrates the wall of the pipe. This assembly terminates in a flange which connects to a hull cleaning effluent discharge hose 273. In alternate embodiments, the coanda effect elements may be deleted from the system in the spirit of the present invention.

Figure 26H:
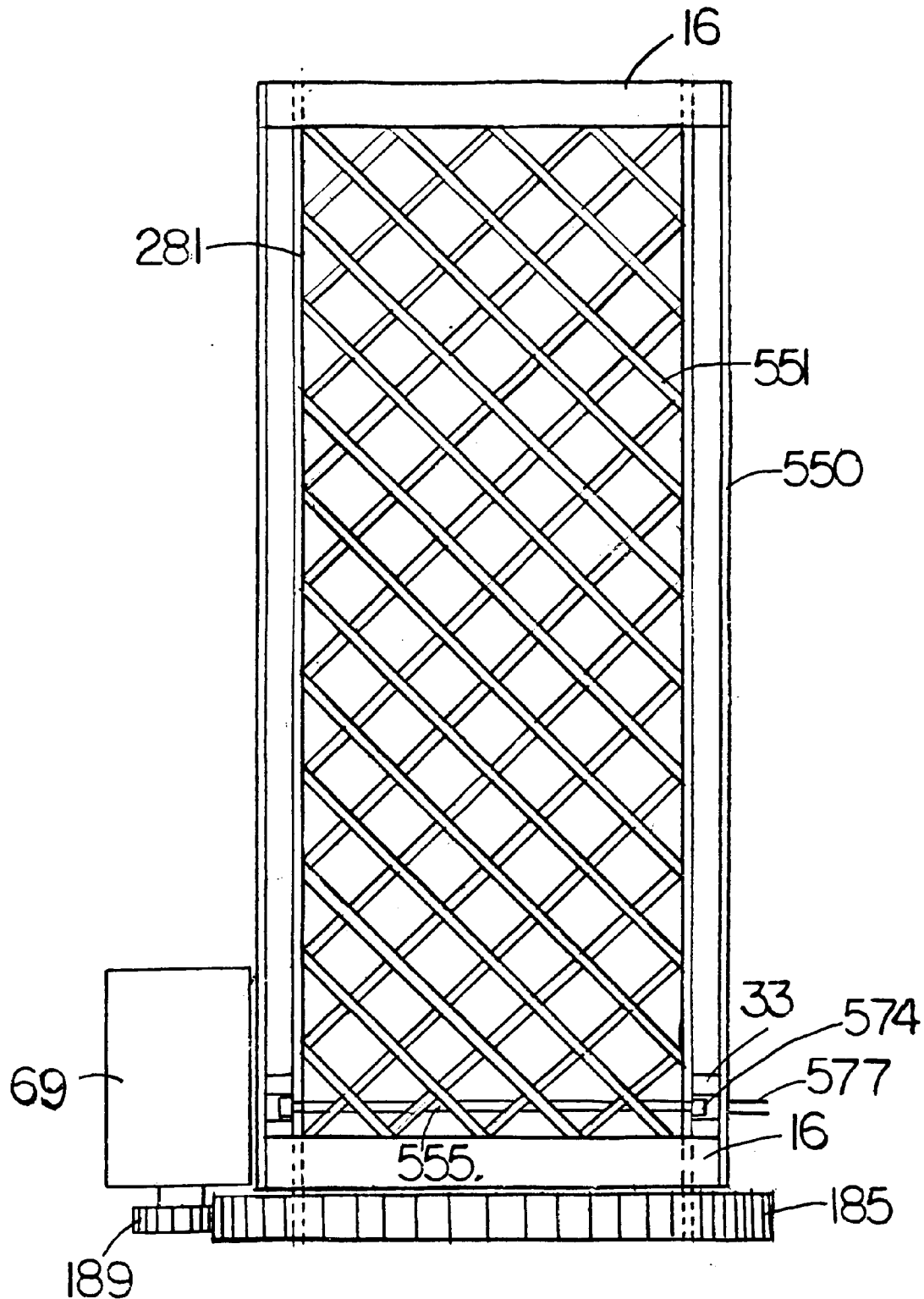
FIG. 26H is an alternate embodiment of the pump shown in FIG. 26D, but reconfigured to have parallel sides, showing a cross sectional view of the pump interior and vanes.

Turning now to FIG. 26H, which is a cross sectional view of an alternate embodiment of the pump shown in FIG. 26D, but with the sides of the pump reconfigured to have parallel sides, where an impeller casing 281 turns inside a bearing 16 at each end, which can also be a bushing in alternate embodiments, and which is enclosed by a pump body 550, which secures the bearings in seats. A ring gear 185 encircles and is securely fastened to the impeller casing and is turned by a motor 69 which is attached to a motor drive gear 189. Inside the impeller casing is found a multiplicity of a vane 551 which spirals as it advances along the inner wall of the impeller casing and is securely affixed to it. Near the ring gear is found a supply hose 577 which is connected to the pump body and penetrates it to supply air or fluid to a receiver ring 574, which is attached to the impeller casing and a blowing slot 555 which penetrates the impeller casing is connected to it and receives a supply of air or water from the supply hose which is supplied by a remotely located source of air or water. The supply hose is connected to an orifice in the pump body which penetrates it and immediately opposite it and connected to the outside of the impeller casing is the receiver ring, which is a structurally strong ring encircling the impeller casing and securely fastened to it, and which has a multiplicity of holes through its wall through which fluids and gases pass into a blowing slot encircling the impeller casing. On each side of the receiver ring between the impeller casing and pump body is found a rubber seal 33, which maintains pressure for the gas or fluid to be distributed into the coanda blowing slot. This embodiment of the pump can be used in place of the embodiment shown in FIG. 26D, and in other embodiments the walls of the pump may be configured to converge at the exit rather than diverge or remain parallel as shown in FIGS. 26D and 26H.

Figure 27:
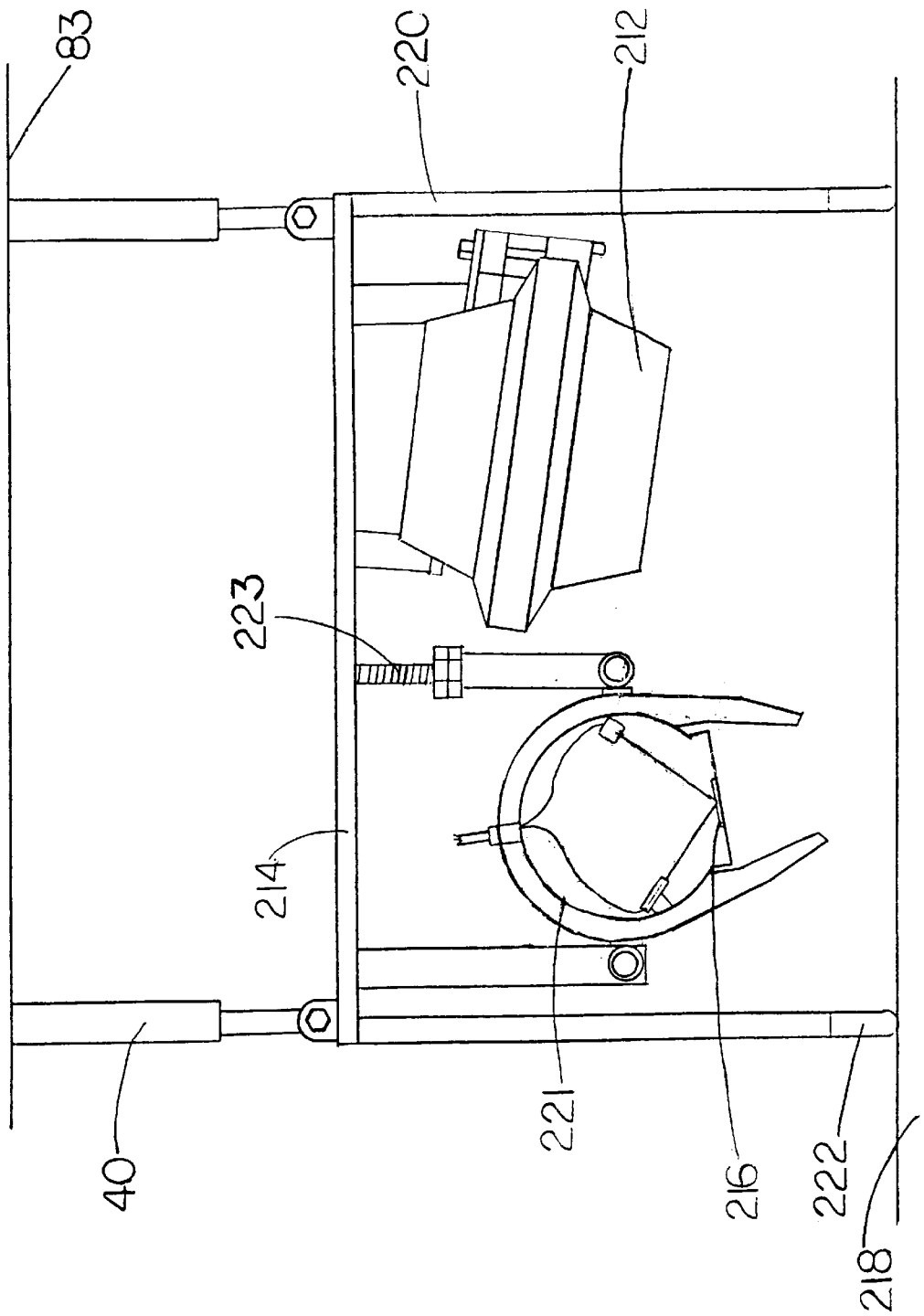
FIG. 27 is a side view of the preferred embodiment of the liquid-gas interface sensor of the present invention.

Turning now to FIG. 27, which is a side view of the liquid-gas interface sensor of the present invention, in which an interface detector mounting plate 214 supports and is attached to a sonic transmitter 212 and a sonic sensor 221, which angle of incidence is adjusted by a detector adjuster 223. The sonic sensor has in the front a hydrophone receiver 216 which receives return signals from a ship hull 218 or similar partially flooded structure. The sensing unit is precisely located at a user variable distance by a projection 220 of which a multiplicity can be used, by changing the length of the replaceable tip in use for specific applications.

Figure 28:
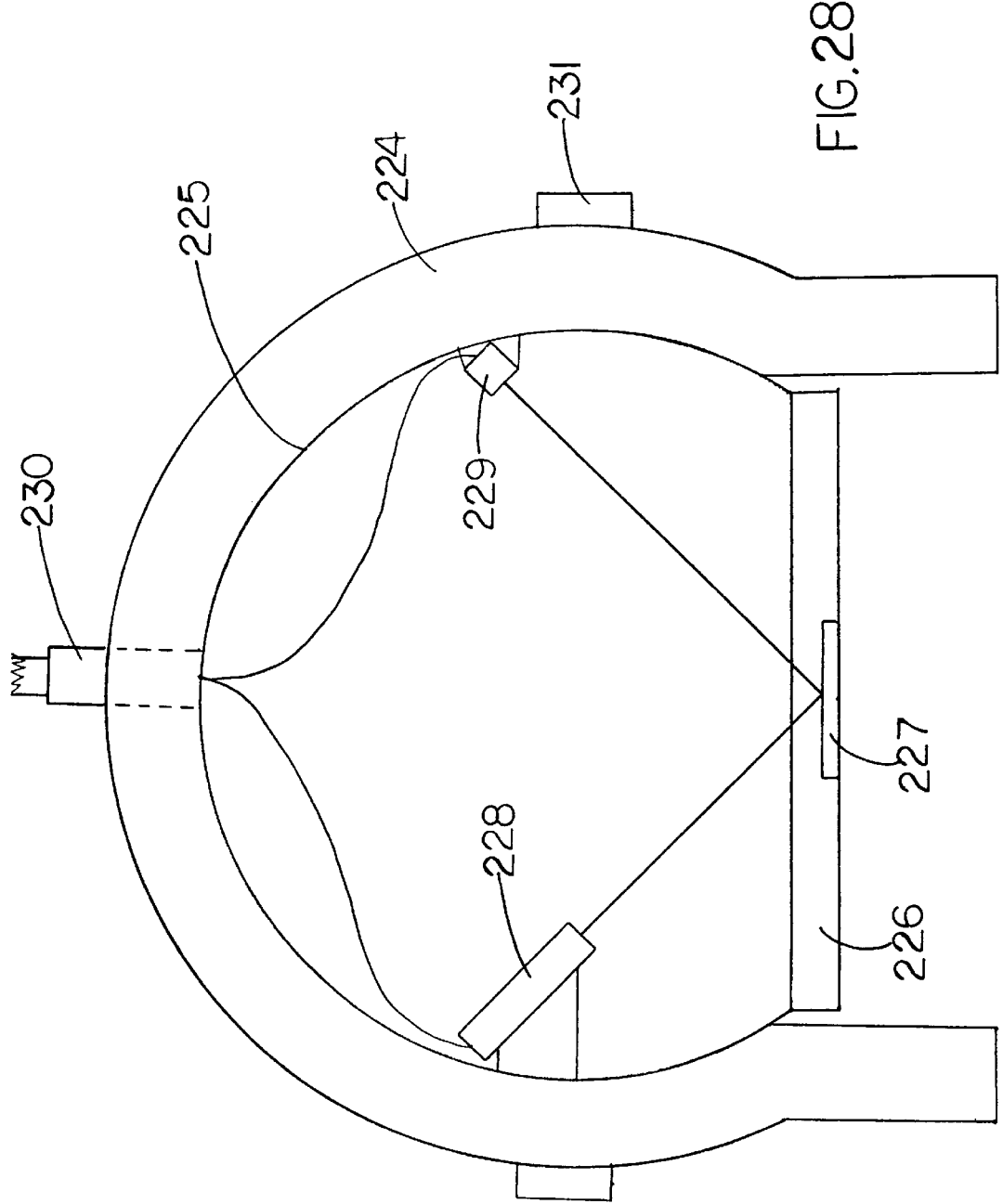
FIG. 28 is a detailed side view of the sensor element of the liquid-gas interface sensor of the present invention.

Turning now to FIG. 28, which is a cross sectional side view of the sonic sensor used in the preferred embodiment of the liquid-gas interface detector of the present invention, in which a syntactic foam shroud 224 encloses a pressure shell 225 of steel, titanium or other suitable strong, non-corrosive immersion compatible material, which has a front diaphragm 226 which has mounted a mirror 227 which reflects signals from a laser emitter 228 to a detector 229. The signals for this function penetrate the pressure proof pressure shell using a waterproof connector 230. A sonic mounting plate 231 of which there may be a multiplicity, is attached to the syntactic foam shroud by conventional means and is used to fasten the sonic sensor to the detector mounting plate.

Figure 29:
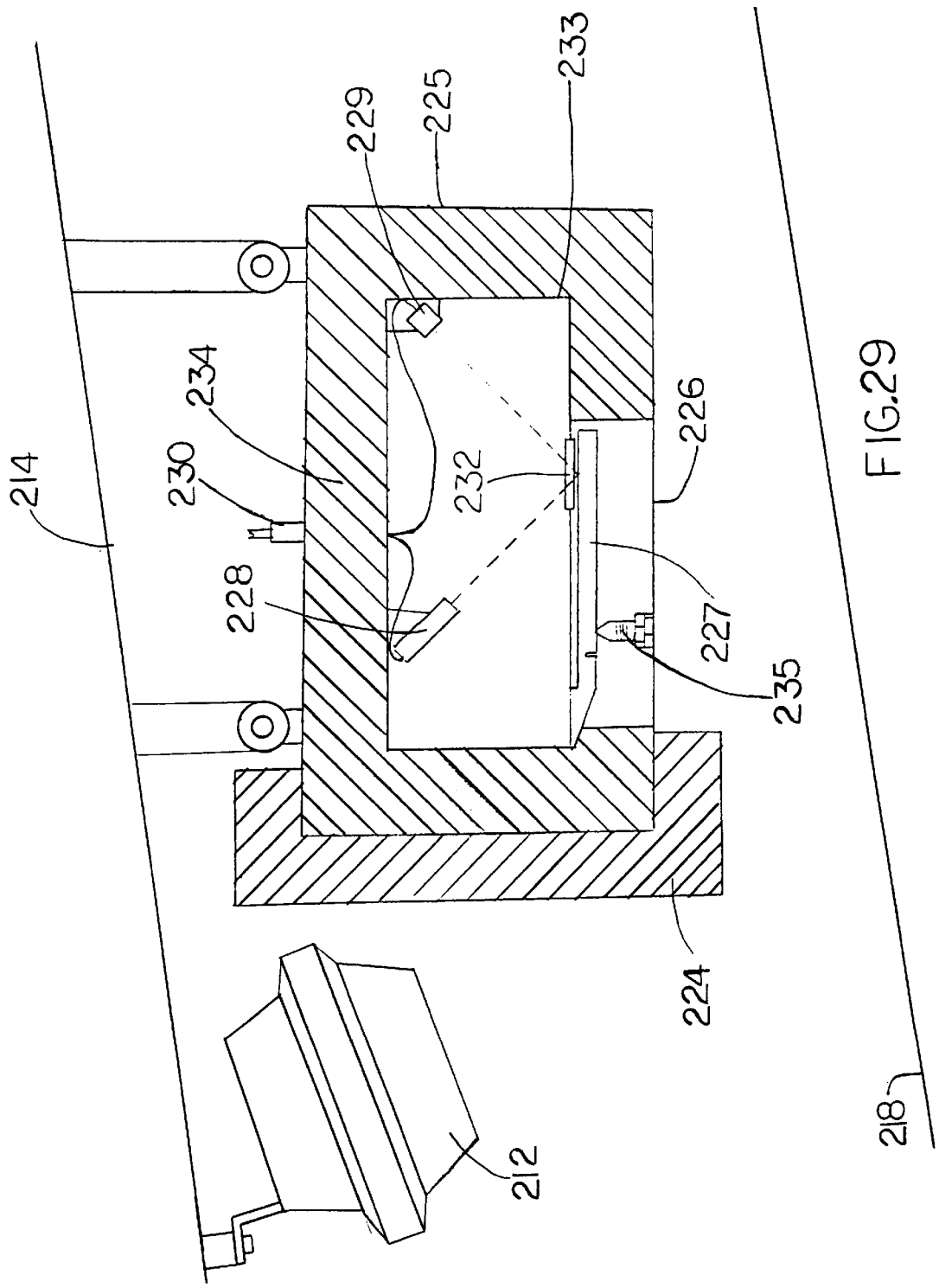
FIG. 29 is a detailed side view of an alternate embodiment of the sensor element of the liquid-gas interface sensor of the present invention.

Turning now to FIG. 29, which is a cross sectional side view of an alternate embodiment of the sonic sensor of the liquid-gas interface detector, in which a lens 232 is affixed to the wall of an inner enclosure 233 which is partially encased in polyurethane foam 234 which isolates it from the ambient sound frequencies, and a adjustable post 235 transmits sounds to the mirror which is mounted on the inside of the pressure shell. A layer of syntactic foam shields the exposed pressure shell from the sonic emissions of the sonic transmitter.

Figure 30:
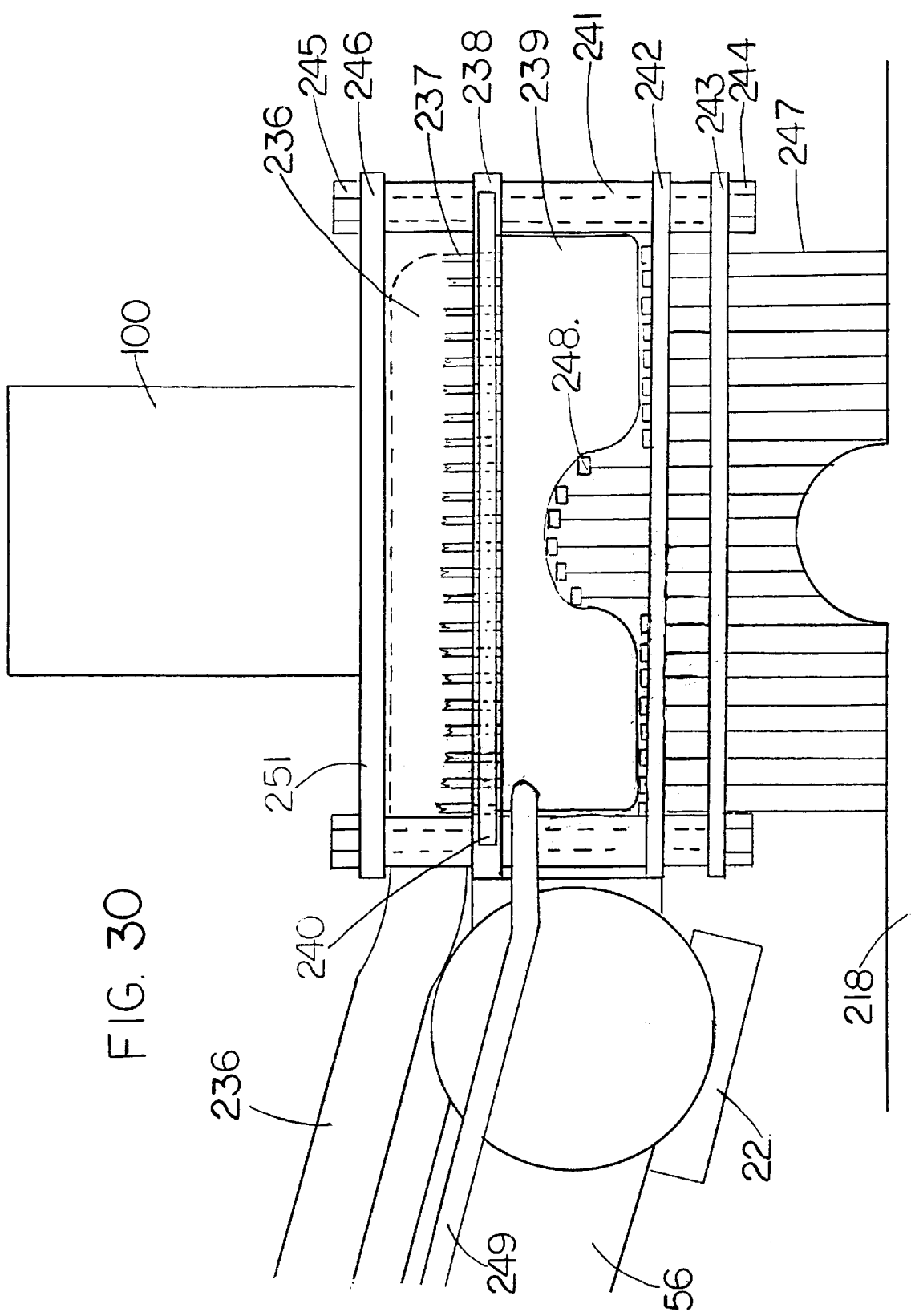
FIG. 30 is a side view of a 3-D measuring tool connected to a robotic arm.

Turning now to FIG. 30, which is a side cross sectional view of the mechanical 3-D measurement tool 251, of the present invention, where a fiberoptic bundle 236 has individual fibers which each serve as a fiberoptic sensor 237, by coupling each with an optical lens and fixedly attaching same to a sensor alignment plate 238, and which emit and receive return signals thru a transparent fluid filled bag 239, which is fastened to the sensor alignment plate by a bag fastening plate 240, and which space is maintained by a spacer tube 241. An upper alignment plate 242, which holds a multiplicity of a measuring pin 247, which are also aligned by a lower alignment plate 243, which is secured by a bolt 244, and a nut 245, and at the top of the device is a position sensor mount 246. The individual fiberoptic sensors each sense reflected light from each individual pin head 248, and the pressure in the fluid filled bag can be varied to suit preferences by a water supply hose 249.

Figure 31:
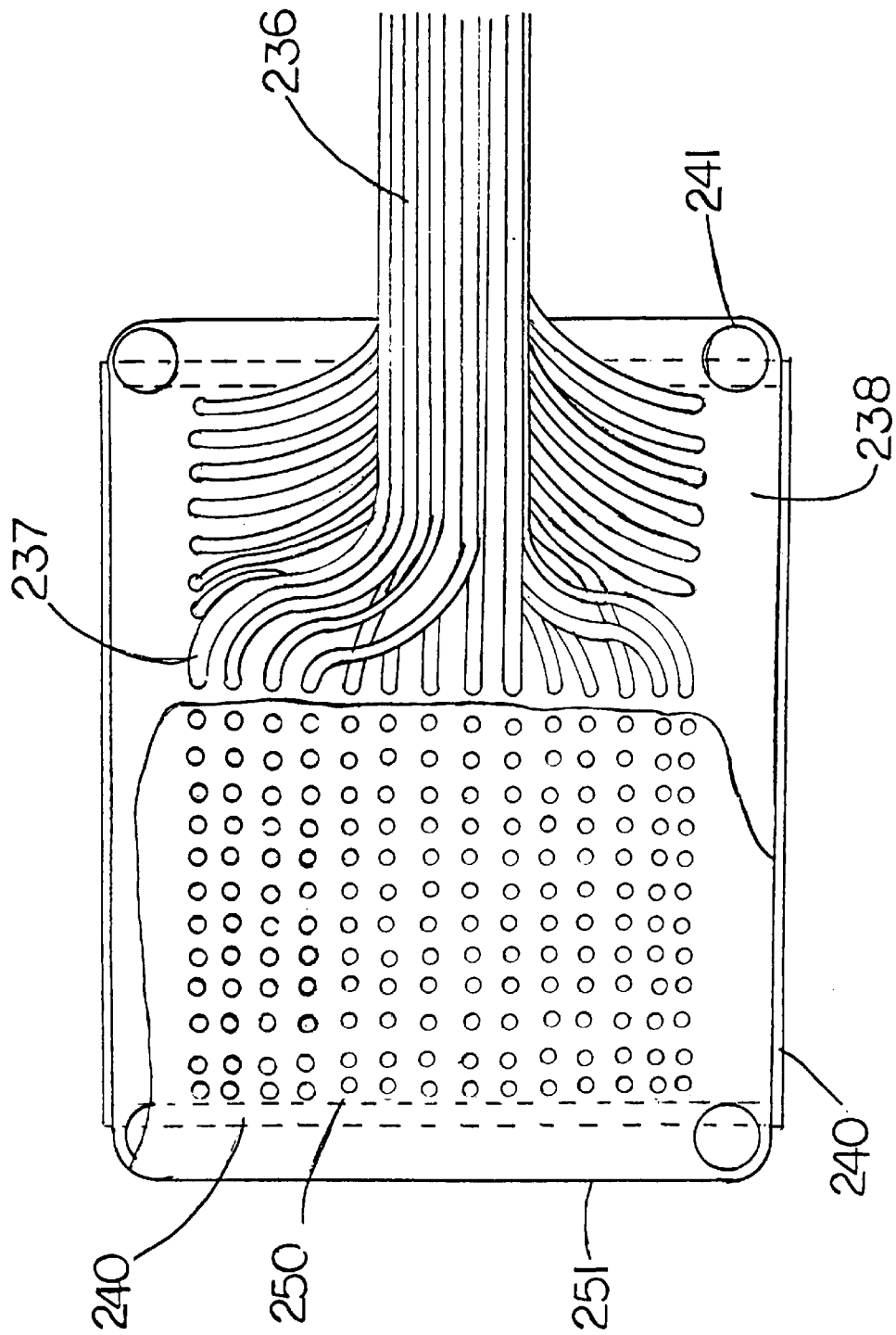
FIG. 31 is a top view of the 3-D measuring tool with the fiberoptic bundle exposed with a cutaway view of the alignment holes for the fiberoptic cables.

Turning now to FIG. 31, which is a top cutaway view of the 3-D measuring tool of the present invention with the position sensor mount removed to show the individual fibers branching out from the fiberoptic bundle, and particularly to show each individual alignment hole 250 for the individual fibers.

Figure 32:
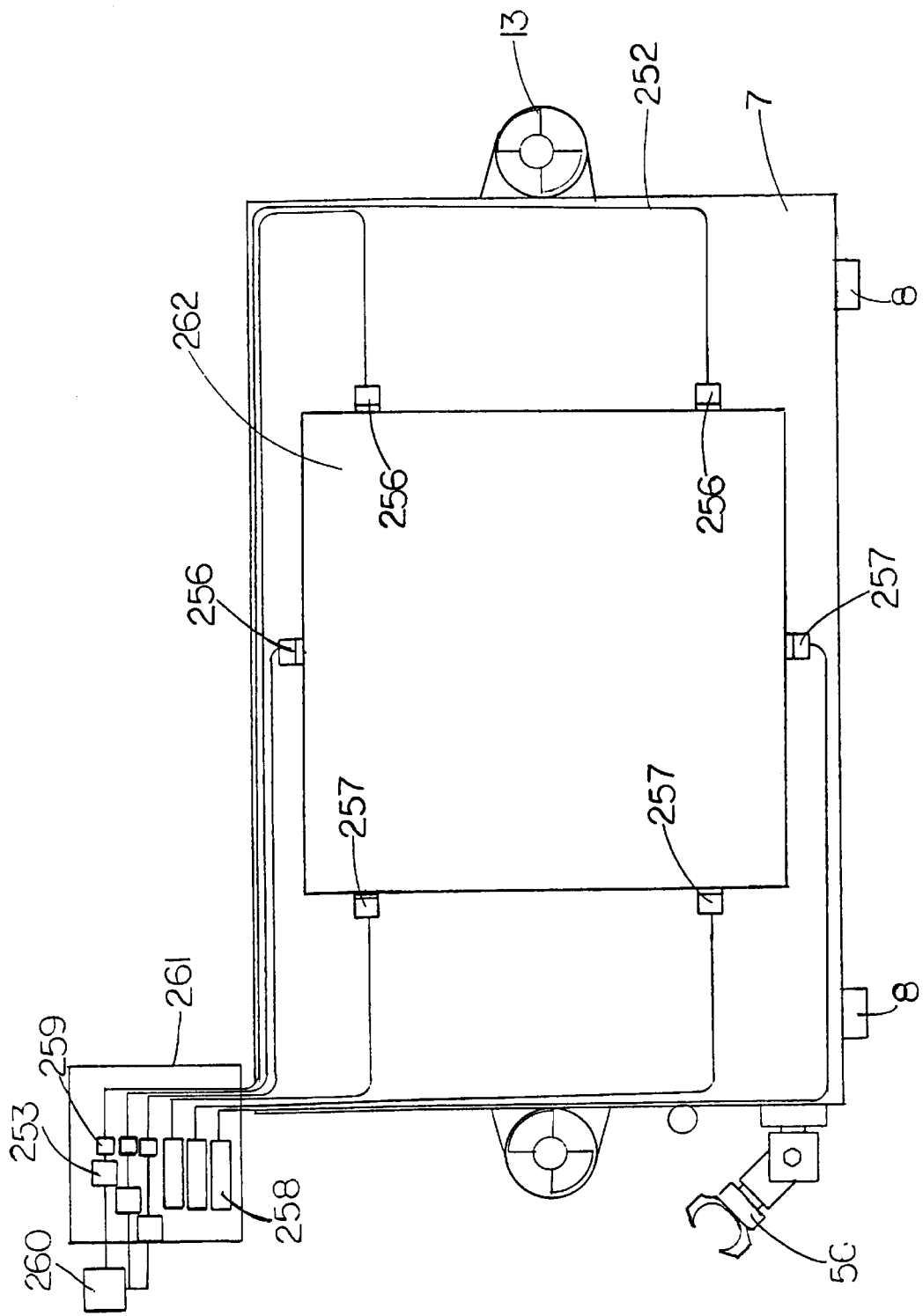
FIG. 32 is a view of the front of the hull inspector-cleaner, detailing the structure and layout of the remote acoustic emissions detector.

Turning now to FIG. 32, which is a front view of the present invention showing details of the construction of the remote acoustic emissions detector of the present invention. A suitable acoustic emissions sensing system for use in the present invention is described in U.S. Pat. No. 5,298,964 to Nelson et al, hereby incorporated herein by reference. Such a system would be adapted for use in the underwater medium by suitable waterproofing of components and incorporation of electronics into appropriate waterproof enclosures. In the drawing, a fiberoptic cable 252 connects a prism-polarizer 256 to a detector 259 of which there may be a multiplicity each of which may be connected to an analog to digital converter 253 which sends a digital signal to a remotely located computer 260 for processing and evaluation. the detector and other electronics are enclosed in a electronics enclosure 261 along with a light emitting diode 258 of which there may be a multiplicity. Each light emitting diode sends a light signal thru a fiberoptic fiber to a collimator-polarizer 257 which transmits the light pulse thru a photoelastic sensing element 262 for collection by the opposing prism-polarizer. Other accoustic emmission systems may also be used.

Figure 33:
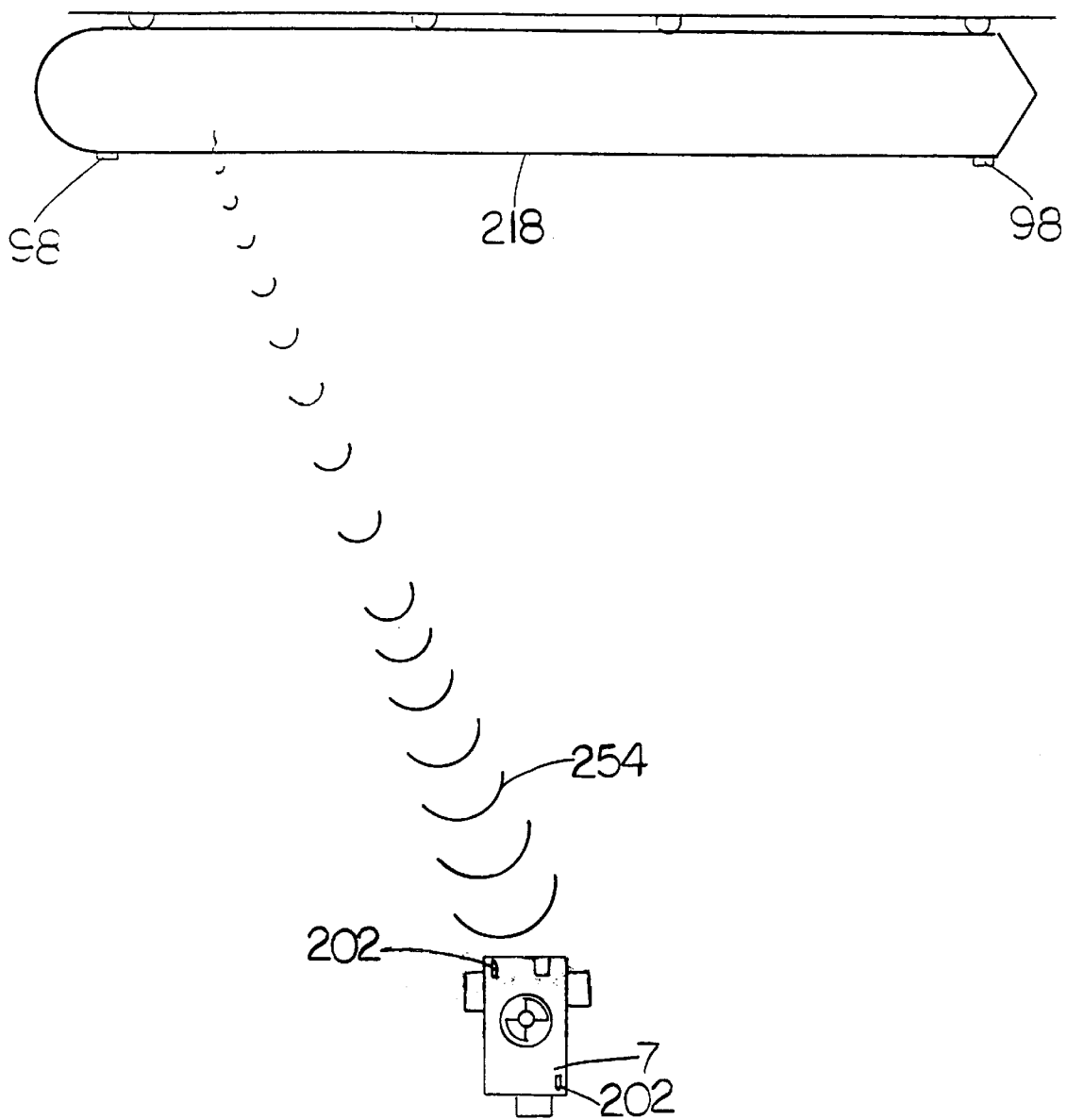
FIG. 33 is a plan view of a hull inspector-cleaner ROV remotely detecting the sonic signature of a structural defect in a ship as the vessel is being loaded at a dock.

Turning now to FIG. 33, which is a plan view of a remote acoustic emissions sensing activity where a sound wave 254 is sensed by the remote acoustic emissions sensing system shown in FIG. 32, and the relative position of a defect indicative acoustic emission is triangulated by the use of multiple acoustic transceivers placed on the ships hull, as shown in the drawing, and sensed by the machine's onboard acoustic transducer extended tip, which is shown in FIG. 24. A commercially available underwater navigation and positioning system suitable for use in a preferred embodiment of the present invention is the Sonic Navigation And Positioning System, which is manufactured by Imetrix, Cataumet, Mass.

Figure 34A:
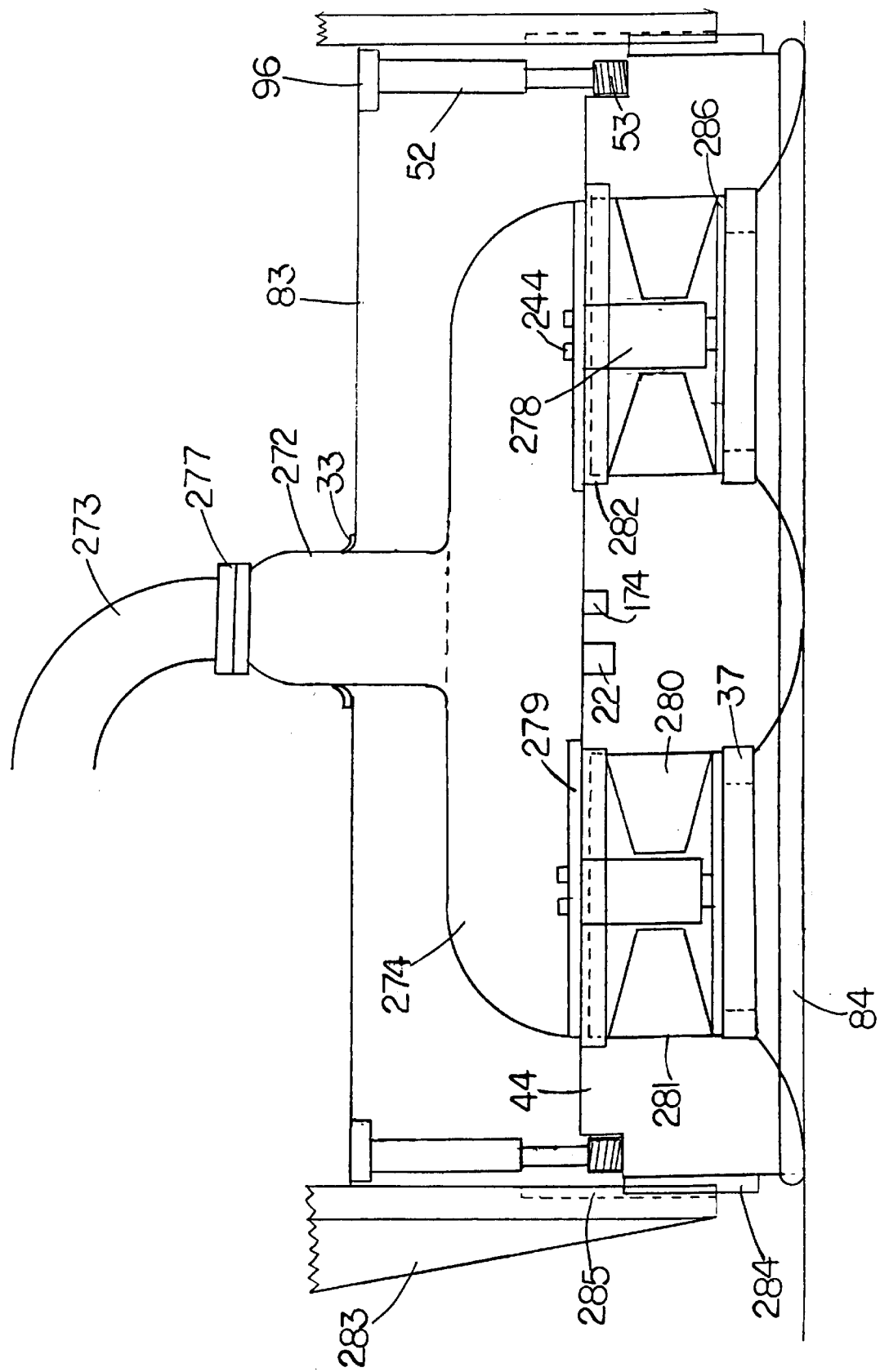
FIG. 34A is a side cross sectional view of the preferred embodiment of the hull cleaning system of the present invention, showing details of the construction of the brush chambers and pumps, and 34B is a side pictorial view of a hull cleaning operation in progress, showing details of the layout and configuration of the scavenging and filtration functions.

Turning now to FIG. 34A, which is a side cross sectional view of the hull cleaning system arrangement of an alternate embodiment where no pumps are incorporated in the evacuable enclosure or discharge neck, with the brush impellers providing the motive force for fluid movement, and the hull cleaning effluent discharge hose is connected to a swivel 277 at the top of the discharge neck. A drive motor 278, of which there can be a multiplicity, drives the hull cleaning brush and impeller, and is secured to the evacuable enclosure by a motor bracket 279. The drive motor turns a mounting plate 286 which is attached to the top of the hull cleaning brush and an impeller casing 281 containing a brush impeller 280. The impeller casing is enclosed at the top by a casing shroud 282. The impeller casing can also have a seal at the top to eliminate water leakage from the interior of the impeller casing if so desired and may also have a water lubricated bearing or bushing at the bearing surfaces interface with the casing shroud. The evacuable enclosure is attached in a movable manner to alignment brackets at the front and back, which have a guide slot 285 in which an alignment tab on the evacuable enclosure fits, enabling the evacuable enclosure, brush and impeller assembly to be retracted or extended at will.

Figure 34B:
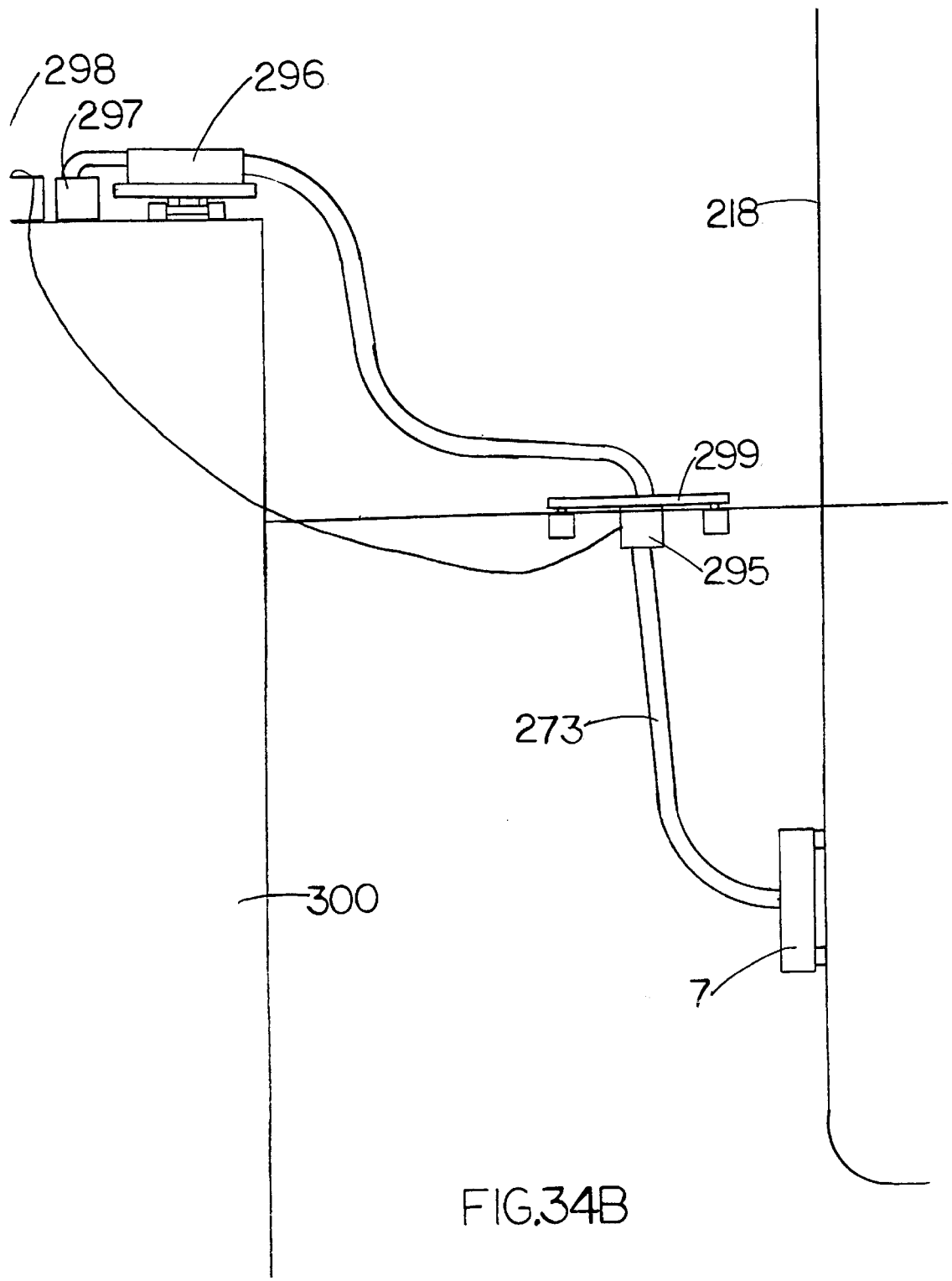
FIG. 34C is a side cross sectional view of the hull cleaning system arrangement of an alternate embodiment showing details of the construction of the brush chambers and pump where a single peripheral vane pump is attached to and penetrates the evacuable enclosure.

Turning now to FIG. 34B, which is a side view of a hull cleaning operation, where a machine body 7 is adhering to the side of a ship, and has extending outward and upward a hull cleaning discharge hose which is connected to a floating submersible pump 295, which is suspended from a float 299 on the surface of the water. The effluent discharge hose continues upward to a rotary screen filter 296, where the solids are separated and discharged into a solids receptacle 297. The floating submersible pump is powered by a hydraulic power pack 298, which has suitable hose connections to the submersible pump. In alternate embodiments, the pump arrangement may be replaced by an air lift arrangement or an eductor, which may be located either on the machine body or at any suitable location along the hose. In addition, other types of pumps may be used in the spirit of the invention. The pump, rotary screen filter and other elements may be located on a supply boat or other vessel of choice to facilitate operations offshore.

Figure 34C:
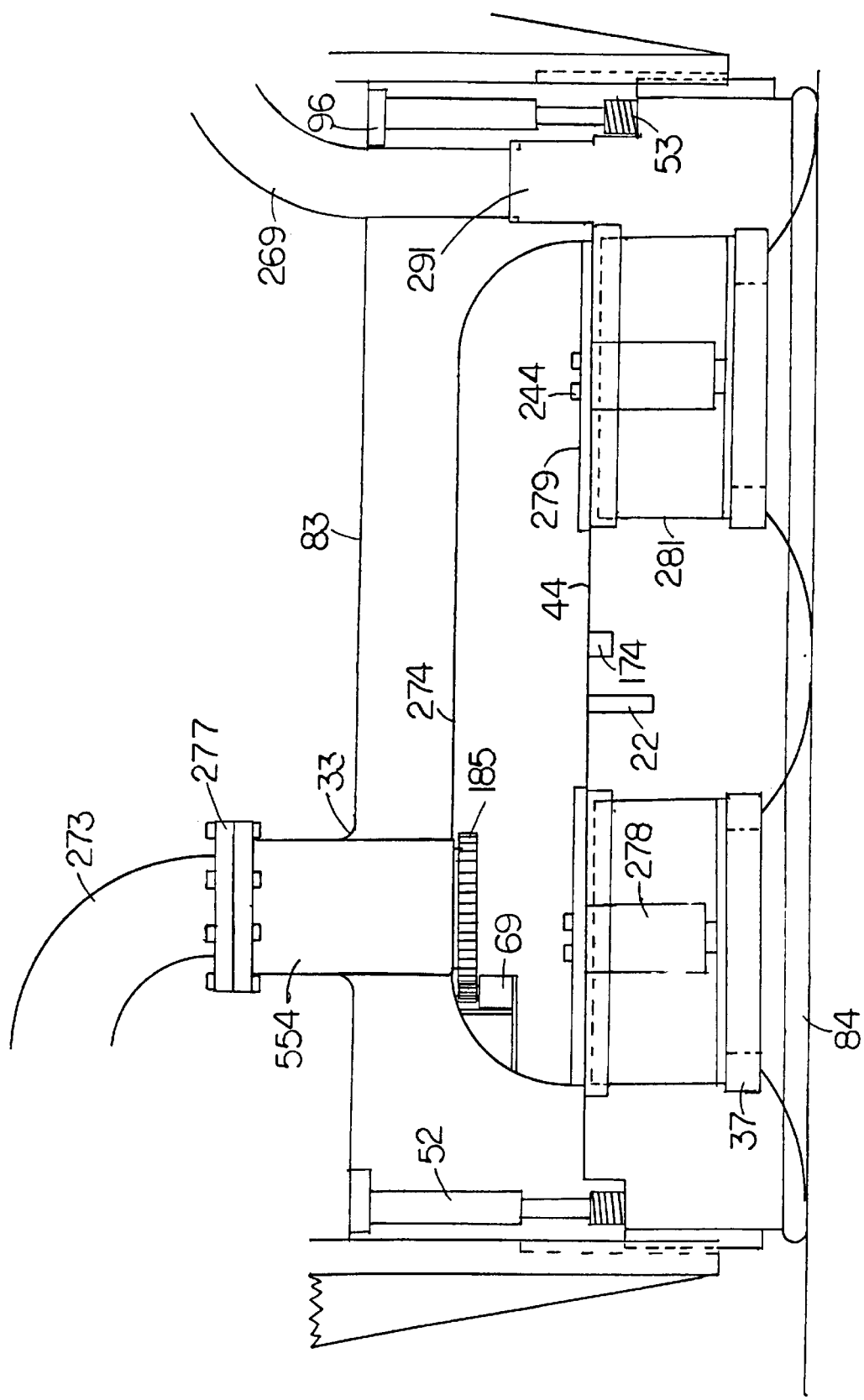

Turning now to FIG. 34C, which is a side cross sectional view of the hull cleaning system arrangement of an alternate embodiment where a single peripheral vane pump is attached to and penetrates the evacuable enclosure, and is attached directly to the hull cleaning effluent discharge hose by a flange, and which is the sole source of motive force for pumping the evacuable enclosure, with no impellers attached to the brushes in this embodiment.

Figure 35C:
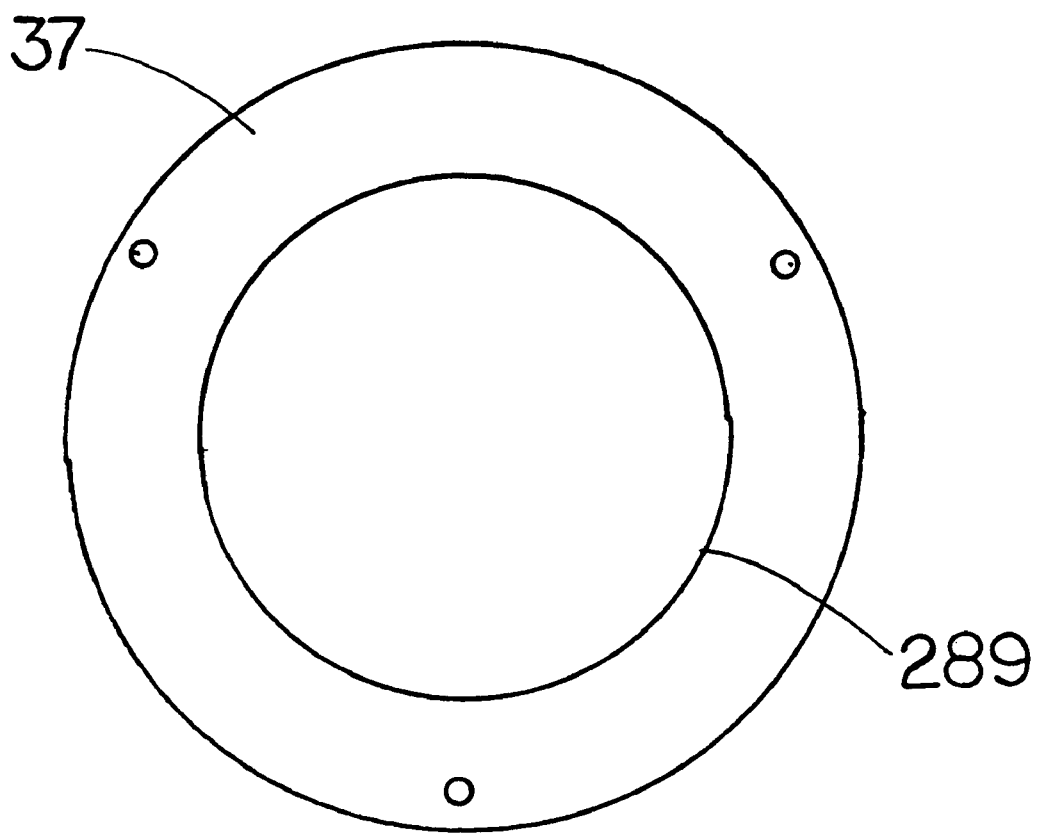
FIG. 35A shows a side exploded view of the preferred embodiment of the hull cleaning system, 35B shows a top view of the mounting plate for the hull cleaning brush, and 35C shows a top view of the brush backing plate, showing a large central aperture.

Turning now to FIGS. 35A, 35B, and 35C, where in 35A an exploded side view of the hull cleaning brush and impeller arrangement is shown, showing an attached gate valve at the impeller discharge which is used in conjunction with a flowmeter to control the flows of each brush into the discharge chamber, thus equalizing the flows from each brush if required by specific circumstances, such as recurrent plate curvatures which evidence themselves more on one side of the hull cleaning machine as it makes a pass along a specific area of the hull, creating a larger suction from one brush than from the others. 35B shows a mounting plate 286 as seen from the top, showing the relative placement of the mounting bolt holes for the brush. This element can be manufactured to be integral with the impeller and casing, or can be secured to them by conventional securement means. In the preferred embodiment, the mounting plate is welded to the impeller casing in a permanent securement. 35C shows a plan view of the brush body showing an aperture 289 which is centrally located, and showing mounting holes for the mounting plate. The impeller blades may be configured for clockwise or counterclockwise rotation, as is preferred. In a preferred embodiment the impeller has a central aperture and a peripheral drive ring, and is driven by a hydraulic or pneumatic motor. In other embodiments, other impeller configurations may be used.

Figure 36:
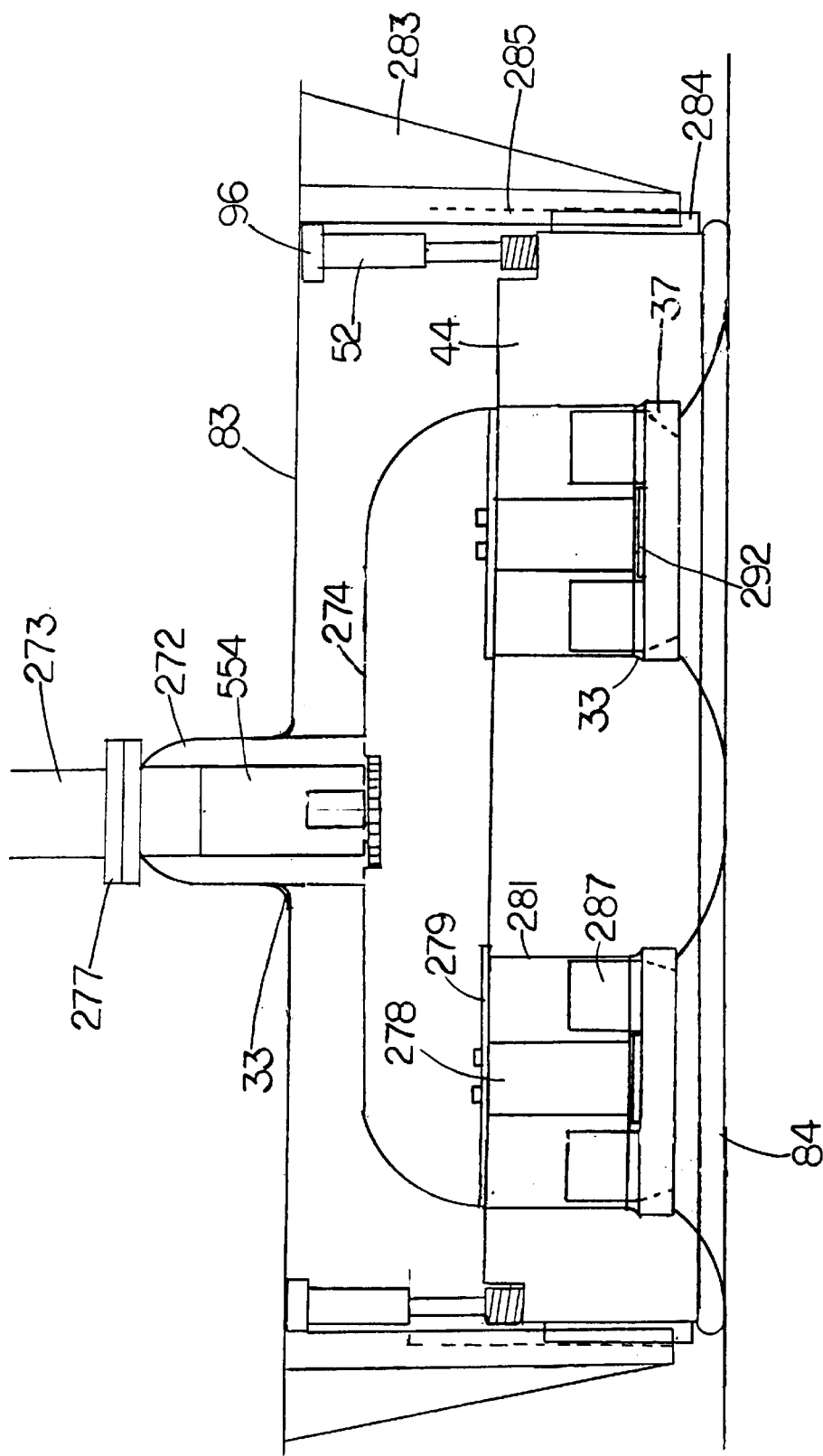
FIG. 36 shows a side cross sectional view of an alternate embodiment of the hull cleaning system of the present invention.

Turning now to FIG. 36, which is a side cross sectional view of an alternate embodiment of the hull cleaning brush and impeller arrangement, and which although it is substantially similar in structure to the preferred embodiment, it has several important differences. The impeller is attached directly to the brush in this configuration, and has a propeller blade 287, of which there are a multiplicity. The brush is attached to the drive motor by a drive motor flange 292, which has threaded holes for bolts or a similar conventional attachment means. The impeller casing is not attached to the impeller, does not turn and is secured in a fixed manner to the evacuable enclosure at the motor bracket. The base of the impeller casing has a rubber seal which contacts the top surfaces of the brush as it turns, thereby preventing water flow from the outside. The impeller blades can be configured to draw water in either the clockwise or counterclockwise direction, as is preferred, and may either be conventional propeller blades as shown or a ring blade type of configuration. A single peripheral vane pump 554 is located inside the discharge neck and assists the brush impeller blades in pumping fluid flows.

Figure 37:
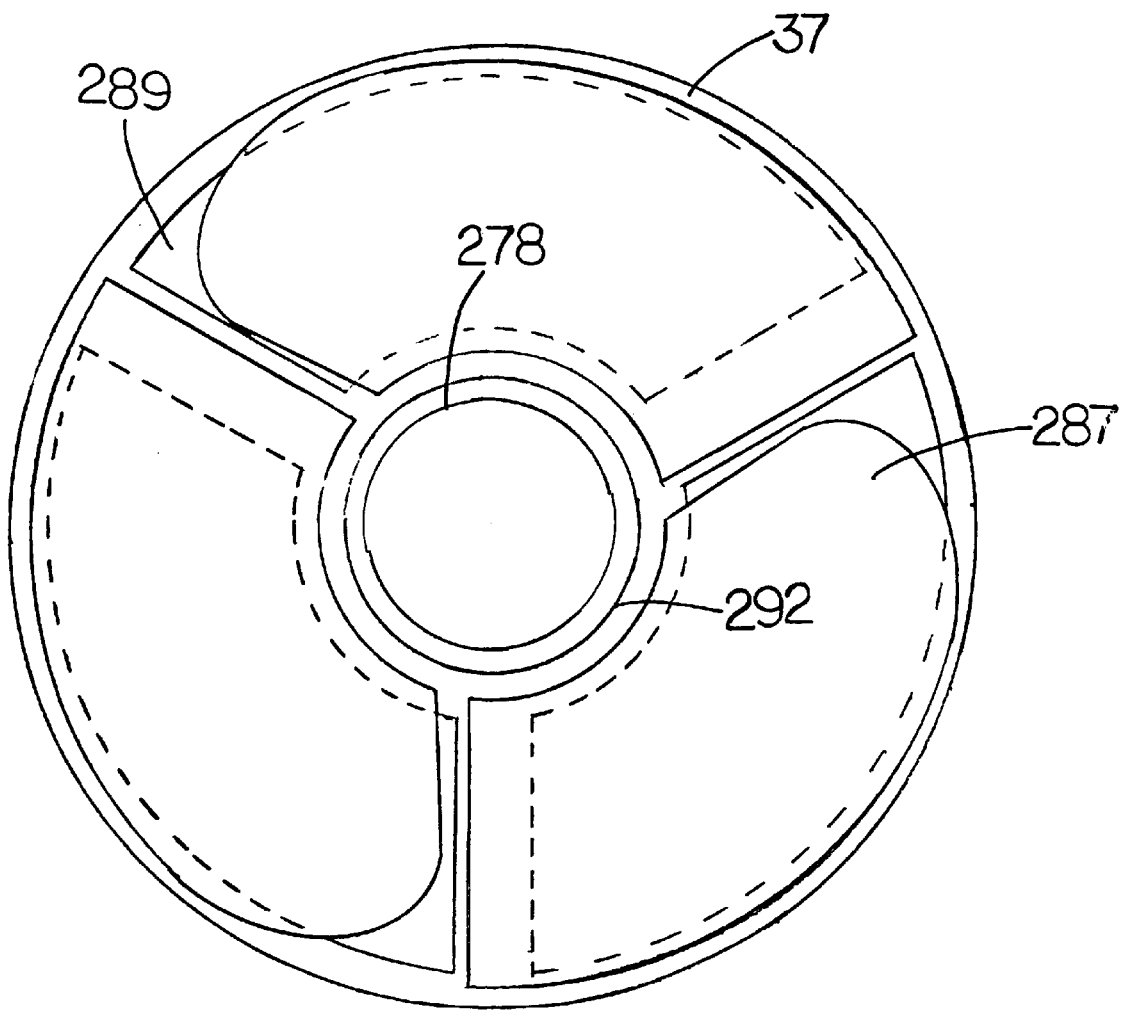
FIG. 37 shows a top view of the brush mounted propeller blades shown in the embodiment of FIG. 36.

Turning now to FIG. 37, which is a plan view of a hull cleaning brush of the embodiment shown in FIG. 36, which shows the layout of the apertures and blades. In this Figure, the blade turns clockwise to produce the desired water flow, although counterclockwise rotation may be used by designing the blades for this direction of rotation. In alternate embodiments other impeller designs may be incorporated into the present invention without departing from the spirit of the invention. The speed of the brushes may be varied to produce more or less water flow as is desired for specific applications.

Turning now to FIG. 38, which is a side view of the ROV in an embodiment adapted to attach itself to cylindrical structures in a design similar to that shown in FIG. 2, and which is well adapted for excavation beneath buried pipelines underwater, where the machine body 7 is attached to a pipe 10 which is resting on soil 582, and the ROV has attached a robotic arm 56, of which there may be a multiplicity, and which may be attached to an airlift 580, which is used for removal of soils and other overburden from submarine surfaces, and which is supplied with a supply of air through an air hose from a remotely located source in the conventional manner used in airlifting operations. the supply air hose for the airlift is not shown in the drawing, but the construction and design will be well known to those with average skill in the art. In other embodiments the airlift may be replaced by an eductor, and may also have various rotating and vibratory digging appurtenances incorporated or attached, and the ROV may also have attached to a robotic arm a jet nozzle 74, which is connected to a remotely located or onboard source of pressurized water and is capable of being directed towards the overburden to remove same. Additionally, TV cameras, sonar systems, and other imaging means such as clear water flows with TV cameras may be incorporated to provide guidance for the soil removal operation and the ROV may be moved along and around the circumference of the pipe to completely remove all overburden from underneath it in preparation for underwater welding operations or other repairs or inspections as are required. The robotic arms may be located on the top, sides front and back, at the base of the skirt of the vehicle, or underneath the skirt of the vehicle if so desired in other embodiments, and either the jet hose or the airlift may be deleted if so desired in the spirit of the embodiment and invention.

CONCLUSION, RAMIFICATIONS, AND SCOPE OF INVENTION

Thus the reader will see that the hull cleaning and inspection device of the present invention provides a reliable, versatile and precision underwater tool for inspections, diagnostic surveys and environmentally safe hull cleaning operations, as well as providing a stable work platform for precision tasks such as underwater welding and cutting and excavation around pipelines.

While my above description contains many specificities, these should not be construed as limitations on the scope of the invention, but rather as an exemplification of one preferred embodiment thereof. Many other variations are possible. For example, having removed the evacuable enclosure in advance, the present invention may be used: as a delivery vehicle, to place a cofferdam or repair plate for damage to the hull of a ship in service by the employment of several robotic arms to manipulate the plate, or for deployment and securement to the hull of a ship of an oil cargo salvage device for drilling into a ships' hull, then pumping the liquid cargo to a waiting ship or barge, or may be configured as a hull adhering tunneling machine for large ship salvage operations; it can be connected to a suction hose for silt removal from intake structures of dams, powerplants, cooling tower sump basins and other industrial structures. The present invention can be fitted with tools to accomplish tasks which create a reaction, such as chiseling of metal and concrete structures, chain and rotary sawing, and excavating using a backhoe attachment, each reaction of which the present invention is well suited to compensate for. In addition, it can have incorporated a hinged door arrangement similar to a hood or trunk of an automobile on the top of the body at the front and rear portions of the vehicle with a latch and seals, enabling access to the interior components for adjustments or repairs without turning the vehicle over.

Utilizing the evacuable enclosure as a movable dry environment, the machine can be used to enable underwater sandblasting and painting in a dry environment, or alternatively for thermal arc spraying of a submerged structure, with the thermal sprayer being located either in the evacuable enclosure or secured to a robotic arm, a robotic arm or other automation may be located inside the evacuable enclosure to enable hyperbaric cutting and welding operations. The evacuable enclosure may be configured as a fluid and soil suction device used for excavating under offshore pipelines with jets, airlifts, eductors, roto-tillers and other digging and soil movement equipment. The evacuable enclosure may also be used as an environmental containment structure for in-service tasks such as sandblasting and painting of overhead bulkheads in ship liquid cargo tanks with an elongated body embodiment of the ROV supporting and controlling the upraised evacuable enclosure which is movable. The present invention may also be configured as a rescue and ship entry vehicle for salvage operations in heavy sea conditions, using an embodiment of the ROV carrying an evacuable enclosure which is a sealed box with an entry door for personnel transfer and friction stud welders around its periphery for attachment to the engine room shell plating of a stranded ship.

What is claimed is:

1. An underwater self-propelled robotically operated vehicle capable of being navigated through a volume of water and of adhering itself to an underwater surface and traversing along said surface comprising:

a main body having an interior suction chamber with an open bottom end and a top end with an opening therethrough;

a motor driven impeller disposed in said suction chamber to draw water through said open bottom end and expel it through said opening to create a negative pressure suction force at said bottom end sufficient to adhere said main body to said underwater surface and maintain said main body thereon when adhered thereto;

an expandible and contractible member surrounding said suction chamber open end to selectively vary the pressure differential between the interior and exterior of said suction chamber;

roller means rotatably mounted on said main body for movably supporting said main body on said underwater surface and moving said main body relative thereto; and thruster means on said body for propelling said main body through a volume of water and moving it relative to said underwater surface when adhered thereto.

2. The vehicle according to claim 1, further comprising adjustable suspension means connecting said roller means to said main body for adjustably positioning said main body relative to said underwater surface when adhered thereto and moving relative thereto.

3. The vehicle according to claim 1, wherein said roller means has a flexible endless loop belt tread mounted thereon to engage said underwater surfaces when said main body is adhered to said underwater surface.

4. The vehicle according to claim 1, wherein said roller means is motor driven.

5. The vehicle according to claim 1, wherein said roller means includes magnetic means for maintaining said roller means engaged on said underwater surface by magnetic attraction.

6. The vehicle according to claim 1, further comprising a motor driven movable ballast on said main body having an adjustably movable counterweight to assist in stabilizing said main body when being propelled and adhered to said underwater surface.

7. The vehicle according to claim 1, further comprising a buoyancy tube on said main body enclosed at each end with air and water inlet and outlet means at each enclosed end and valve means connecting said inlet and outlet means with sources of air and water under pressure;

a piston slidably disposed in said buoyancy tube in fluid sealing relation therewith and dividing said buoyancy tube into chambers of variable volume;

said valve means being selectively controlled to allow intake and exhaust of air or water into and out of each said chamber to move said piston to selective positions in said buoyancy tube and thereby provide buoyancy or ballast in said chambers on either side of piston.

8. The vehicle according to claim 1, further comprising a hydraulically operated submersible electrical generator mounted on said main body for providing a source of electrical power for electrical components associated with said main body.

9. The vehicle according to claim 1, further comprising a deflector mounted at said suction chamber top end adjacent said opening for directing expelled water in a rearward direction relative to said main body to assist in propelling said main body and through a volume of water and moving said main body relative said underwater surface when adhered thereto.

10. The vehicle according to claim 1, further comprising a fluorometer sensor-emitter and fluorometer attached to said main body connected with processing means for detecting and displaying information relative to fluorescence in hydrocarbons in the underwater environment and on said underwater surface.

11. The vehicle according to claim 1, further comprising a three dimensional terrain mapping and remote surface configuration and size detector means for measuring and detecting surface configurations, sizes and shapes in the underwater environment and on said underwater surface.

12. The vehicle according to claim 1, further comprising an electromagnetic eddy current NDT array and eddy current crack detector means associated with said main body adapted to engage said underwater surface and connected with processing means for detecting and displaying information relative to size and location of structural irregularities in said underwater surface.

13. The vehicle according to claim 1, further comprising acoustic emission sensor means on said main body connected with processing means for detecting and measuring remotely originating acoustic emissions through a volume of water relative to remotely located structural irregularities on submerged marine structures and ships.

14. The vehicle according to claim 1, further comprising at least one remotely controlled articulated manipulating arm secured at a first end to said main body and having a second end adapted to receive objects and to move said objects relative to said underwater surface.

15. The vehicle according to claim 14, further comprising gripping means at said manipulating arm second end for gripping objects and force sensors connected therewith for detecting gripping forces applied by and transmitted to said manipulating arm.

16. The vehicle according to claim 14, further comprising torch means mounted on said manipulating arm second end to be moved by said arm relative to said underwater surface.

17. The vehicle according to claim 14, further comprising a sonar transducer array mounted on said manipulating arm second end to be moved by said arm in selective positions relative to said main body and connected with sonar image processing means for locating, detecting, and displaying an image of submerged objects.

18. The vehicle according to claim 14, further comprising camera means mounted on said manipulating arm second end to be moved by said arm in selective positions relative to said main body and connected with image processing means for locating, detecting, and displaying an image of submerged objects.

19. The vehicle according to claim 14, further comprising evacuation and conduit means mounted on said manipulating arm second end to be moved by said arm in selective positions relative to said main body for excavating soil and other overburden from the vicinity of said underwater surface.

20. An underwater self-propelled robotically operated vehicle capable of being navigated through a volume of water and of adhering itself to an underwater surface and traversing along said surface comprising:

a main body having an interior suction chamber with an open bottom end and a top end with an opening therethrough;

a motor driven impeller disposed in said suction chamber to draw water through said open bottom end and expel it through said opening to create a negative pressure suction force at said bottom end sufficient to adhere said vehicle to said underwater surface and maintain said vehicle thereon when adhered thereto;

thruster means on said body for propelling said vehicle through a volume of water;

an enclosure having a top wall, a peripheral side wall, an open bottom end, and seal means on said open bottom end;

said enclosure mounted on said main body for movement relative to said main body for selective engagement of said seal means on said underwater surface; and vent means in fluid communication with the interior of said enclosure for evacuating fluid from said enclosure.

21. The vehicle according to claim 20, further comprising extension and retraction means connecting said enclosure with said main body for extending and retracting said enclosure relative to said main body and to said underwater surface and to selectively engage said seal means on said underwater surface.

22. The vehicle according to claim 20, further comprising motor driven brush means rotatably mounted in said enclosure adapted to engage and clean said underwater surface.

23. The vehicle according to claim 22, further comprising impeller and conduit and pump means connected with said brush means for conducting water from said enclosure.

24. The vehicle according to claim 20, further comprising a liquid-gas interface sensor in said enclosure connected with processing means for detecting and displaying information relative to the liquid-gas interface on said underwater surface.

25. The vehicle according to claim 20, further comprising an acoustic emissions sensor means attached to said enclosure and connected with respective signal processing means for measuring and displaying information relative to structural irregularities on said underwater surface.

26. The vehicle according to claim 20, further comprising effluent filtration means and conduit connected with said enclosure and with pumping means for conducting effluent water therethrough and removing solids from the effluent stream and discharging the filtered water to a remote location.

27. The vehicle according to claim 26, wherein said pumping means is a motorized peripheral vane pump with an impeller having coanda slots that is connected with a source of pressurized fluid.

\* \* \* \* \*